United States Patent
Newman, Jr. et al.

(10) Patent No.: US 10,342,103 B2
(45) Date of Patent: Jul. 2, 2019

(54) CONTROL DEVICE WITH MULTIPLE FEEDBACK TYPES

(71) Applicant: Lutron Technology Company LLC, Coopersburg, PA (US)

(72) Inventors: Robert C. Newman, Jr., Emmaus, PA (US); Shan Shi, Hellertown, PA (US); Jaykrishna A. Shukla, Mays Landing, NJ (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 15/789,933

(22) Filed: Oct. 20, 2017

(65) Prior Publication Data
US 2018/0114434 A1    Apr. 26, 2018

Related U.S. Application Data

(60) Provisional application No. 62/411,286, filed on Oct. 21, 2016, provisional application No. 62/438,003, filed on Dec. 22, 2016.

(51) Int. Cl.
| | |
|---|---|
| *G08C 17/02* | (2006.01) |
| *G05B 15/02* | (2006.01) |
| *H05B 37/02* | (2006.01) |
| *E06B 9/38* | (2006.01) |

(52) U.S. Cl.
CPC ......... *H05B 37/0272* (2013.01); *G05B 15/02* (2013.01); *G08C 17/02* (2013.01); *H05B 37/0218* (2013.01); *H05B 37/0227* (2013.01); *E06B 9/38* (2013.01); *G08C 2201/12* (2013.01);

(Continued)

(58) Field of Classification Search
CPC ............... G08C 17/02; G08C 2201/12; G08C 2201/50; G08C 2201/70; G05B 15/02; H05B 37/0272

See application file for complete search history.

(56) References Cited

U.S. PATENT DOCUMENTS

| | | |
|---|---|---|
| 5,248,919 A | 9/1993 | Hanna et al. |
| 5,264,761 A | 11/1993 | Johnson |
| 8,009,042 B2 | 8/2011 | Steiner et al. |

(Continued)

FOREIGN PATENT DOCUMENTS

CN     2596671 Y     12/2003

*Primary Examiner* — Thomas D Alunkal

(74) *Attorney, Agent, or Firm* — Condo Roccia Koptiw LLP

(57) ABSTRACT

A load control system may include control devices for controlling electrical loads. The control devices may include load control devices, such as a lighting device for controlling an amount of power provided to a lighting load, and controller devices, such as a remote control device configured to transmit digital messages for controlling the lighting load via the load control device. The remote control device may communicate with the lighting devices via a hub device. The remote control device may detect a user interface event, such as a button press or a rotation of the remote control device. The remote control device or the hub device may determine whether to transmit digital messages as unicast messages or multicast messages based on the type of user interface event detected. The remote control device, or other master device, may synchronize and/or toggle an on/off state of lighting devices in the load control system.

26 Claims, 26 Drawing Sheets

(52) U.S. Cl.
CPC ..... *G08C 2201/50* (2013.01); *G08C 2201/70* (2013.01)

(56) References Cited

U.S. PATENT DOCUMENTS

| | | | |
|---|---|---|---|
| 8,199,010 B2 | 6/2012 | Sloan et al. | |
| 8,228,184 B2 | 7/2012 | Blakeley et al. | |
| 8,330,638 B2 | 12/2012 | Altonen et al. | |
| 8,410,706 B2 | 4/2013 | Steiner et al. | |
| 8,451,116 B2 | 5/2013 | Steiner et al. | |
| 8,471,779 B2 | 6/2013 | Mosebrook | |
| 8,950,461 B2 | 2/2015 | Adams et al. | |
| 9,049,756 B2* | 6/2015 | Klusmann | H05B 37/0218 |
| 9,115,537 B2 | 8/2015 | Blair | |
| 9,208,965 B2 | 12/2015 | Busby et al. | |
| 9,368,025 B2 | 6/2016 | Carmen, Jr. | |
| 9,418,802 B2 | 8/2016 | Romano et al. | |
| 9,520,247 B1 | 12/2016 | Finnegan et al. | |
| 9,583,288 B2 | 2/2017 | Jones et al. | |
| 9,799,469 B2 | 10/2017 | Bailey et al. | |
| 9,959,997 B2 | 5/2018 | Bailey et al. | |
| 2006/0055582 A1* | 3/2006 | Wendt | G08C 17/02 341/175 |
| 2007/0103326 A1* | 5/2007 | Moninski | G08B 5/36 340/635 |
| 2008/0111491 A1 | 5/2008 | Spira | |
| 2008/0258650 A1* | 10/2008 | Steiner | H05B 37/0254 315/291 |
| 2009/0128361 A1* | 5/2009 | Lee | H04Q 9/00 340/12.22 |
| 2011/0006879 A1* | 1/2011 | Lambrou | G07C 9/00309 340/5.64 |
| 2012/0286940 A1 | 11/2012 | Carmen, Jr. et al. | |
| 2013/0030589 A1 | 1/2013 | Pessina et al. | |
| 2013/0110195 A1* | 5/2013 | Fletcher | A61N 1/36075 607/46 |
| 2014/0132475 A1 | 5/2014 | Bhutani et al. | |
| 2014/0177469 A1* | 6/2014 | Neyhart | H04L 12/2807 370/254 |
| 2014/0265568 A1 | 9/2014 | Crafts et al. | |
| 2015/0077021 A1 | 3/2015 | Smith et al. | |
| 2015/0351205 A1 | 12/2015 | Clark et al. | |
| 2015/0371534 A1* | 12/2015 | Dimberg | G08C 17/02 340/12.5 |
| 2015/0382436 A1* | 12/2015 | Kelly | G08C 17/02 315/131 |
| 2016/0073479 A1 | 3/2016 | Erchak et al. | |
| 2017/0105176 A1 | 4/2017 | Finnegan et al. | |
| 2017/0255263 A1* | 9/2017 | Letendre | G06F 3/016 |
| 2018/0190451 A1 | 7/2018 | Scruggs | |

* cited by examiner

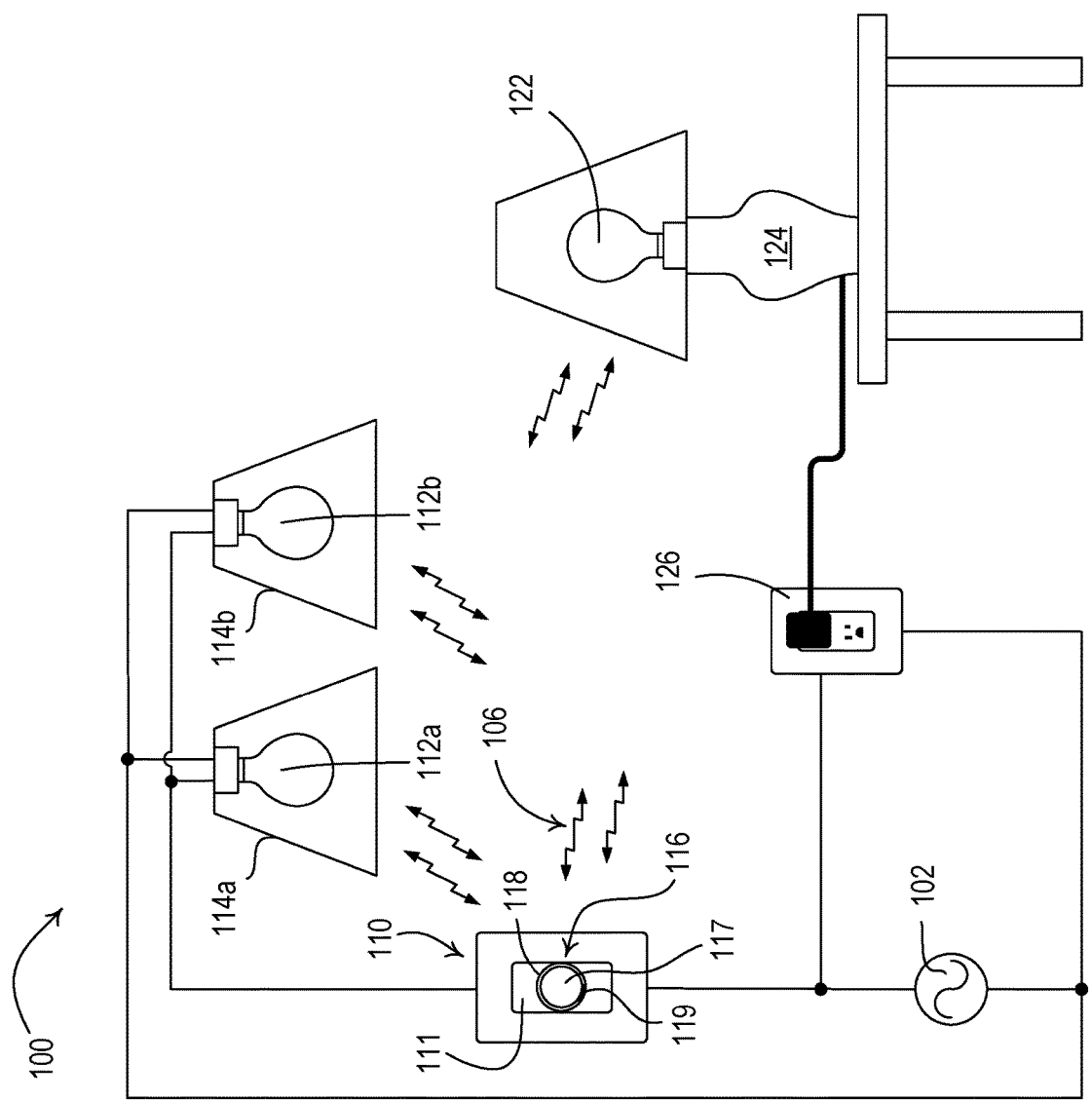

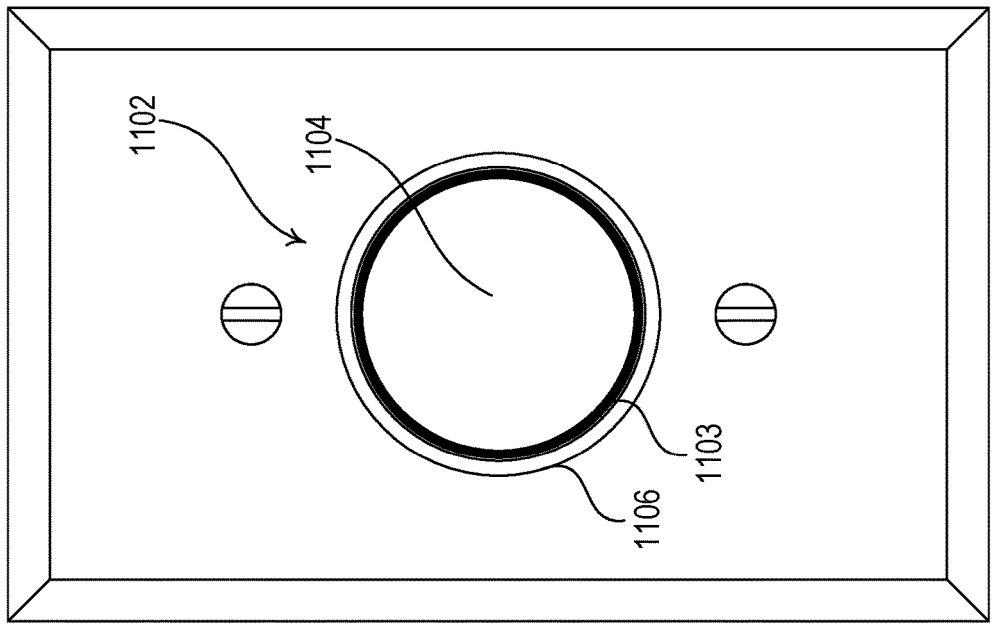
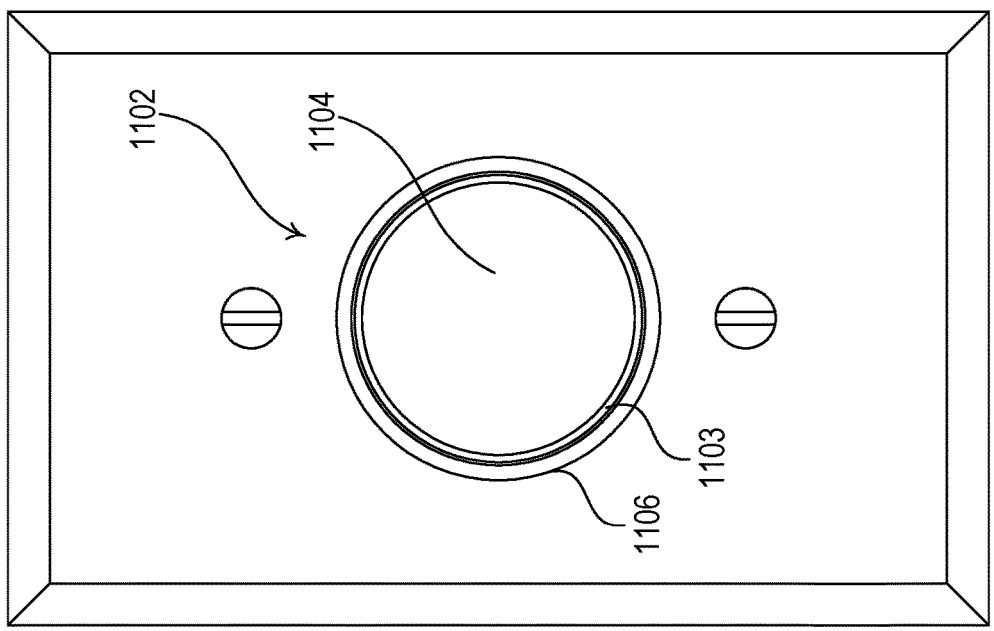

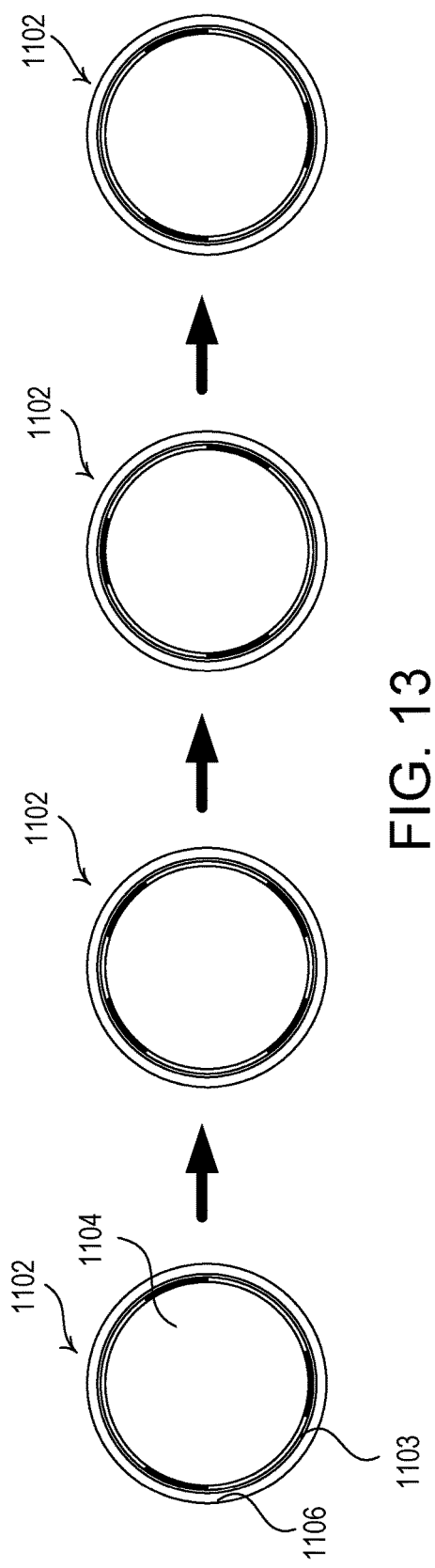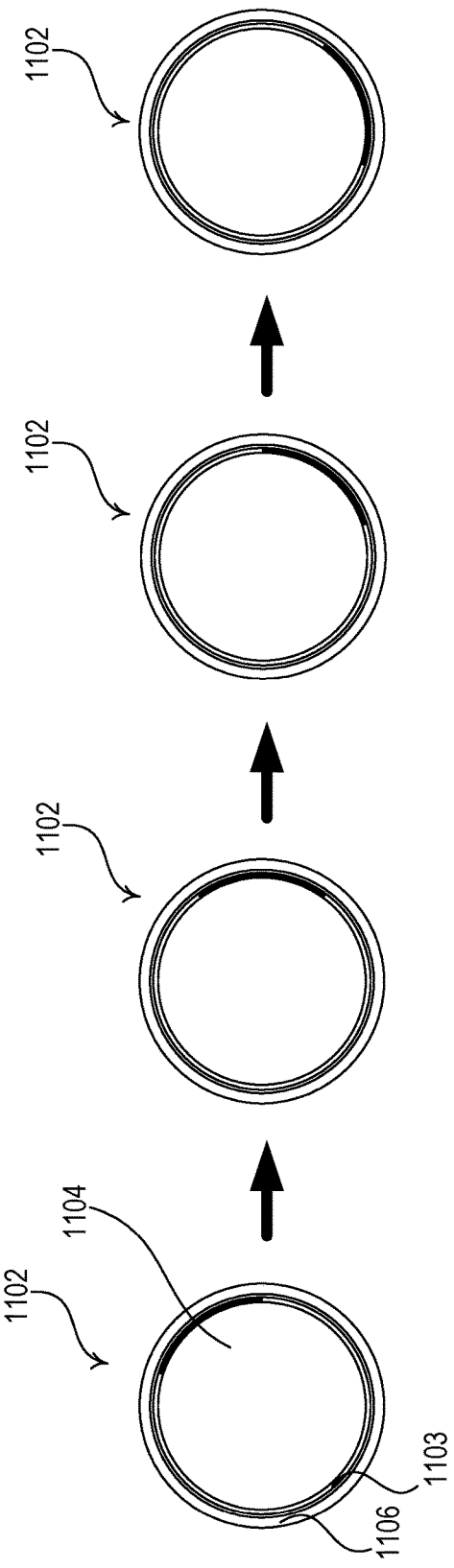

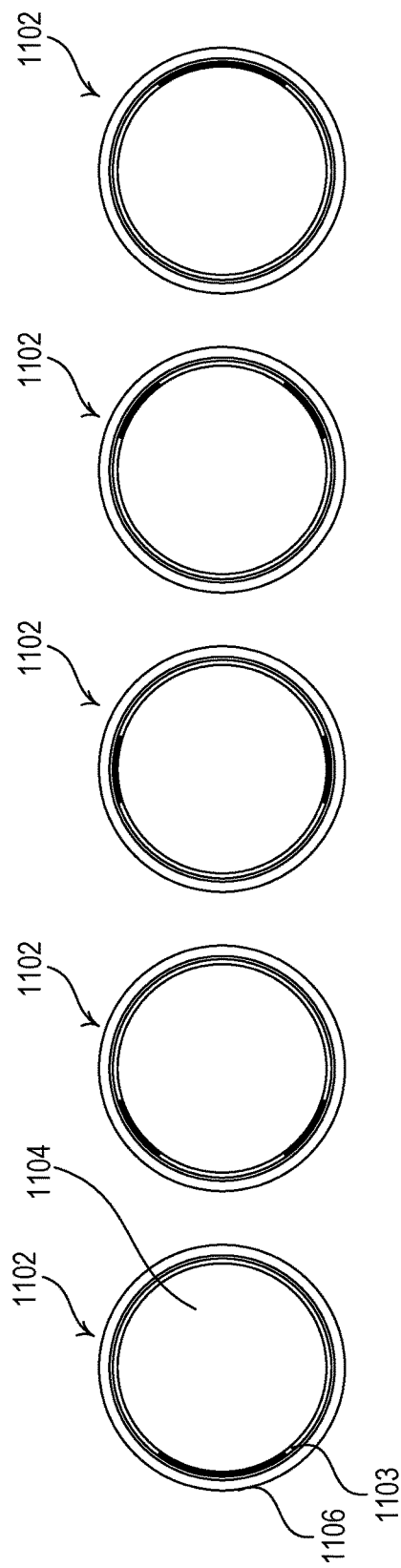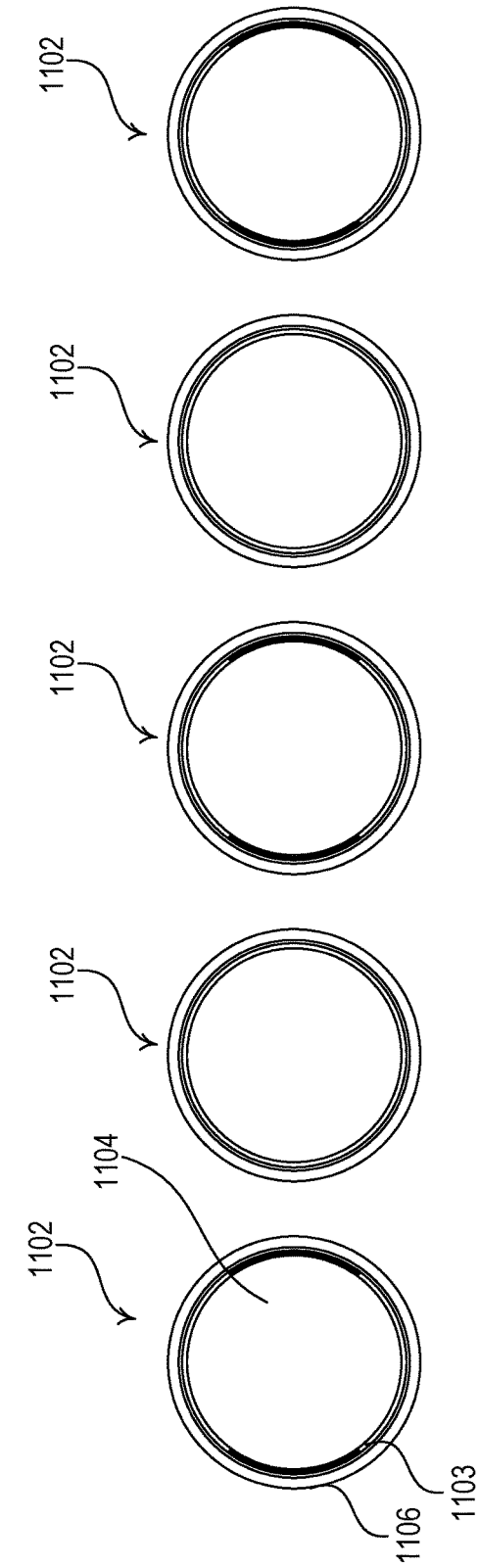

CONTROL DEVICE WITH MULTIPLE FEEDBACK TYPES

CROSS-REFERENCE TO RELATED APPLICATIONS

This application claims the benefit of U.S. Provisional Patent Application Nos. 62/411,286, filed Oct. 21, 2016, and 62/438,003, filed Dec. 22, 2016, the entire disclosures of which are incorporated by reference herein.

BACKGROUND

A user environment, such as a residence or an office building, for example, may be configured using various types of load control systems. A lighting control system may be used to control the lighting loads in a user environment. The lighting control system may include various devices, such as input devices and load control devices, capable of communicating via radio frequency (RF) communications. For example, a remote control device may be used to communicate with lighting devices (e.g., light bulbs) in the load control system to control the lighting level of the lighting devices. The devices may communicate in a network using RF communications, such as ZIGBEE® communications; BLUETOOTH® communications; or proprietary communications, such as CLEAR CONNECT™.

Lighting devices in the user environment may be collectively controlled by a common lighting control device that is capable of dimming the group of lighting devices or toggling the group of lighting devices on and off. One or more of the lighting devices in the system may be independently controlled by another lighting control device. This independent control of a subset of the lighting devices may cause some of the lighting devices to become out of sync with the rest of the group, such that some of the lighting control devices are turned "on," while others are turned "off." When the common lighting control device is actuated by a user to toggle the entire group of lighting devices (e.g., from on to off, or vice versa), the lighting devices that are out of sync with the others will remain out of sync. Each of the lighting devices will receive a multicast message that causes the lighting device to toggle from on to off or vice versa, such that the lighting devices that are in an "on" will be turned "off" and the lighting devices that are "off" will be turned "on." To get the lighting devices in the entire group back in sync, the user may be required to independently control the lighting devices that are out of sync.

The control device that is used for controlling the lighting devices may also be capable of controlling other types of electrical loads and/or load control devices in the user environment. Different types of electrical loads and load control devices may be controlled very differently. For example, lighting devices may be dimmed, HVAC systems may control temperature, motorized window treatments may be raised and lowered, etc. As many different types of electrical loads and/or load control devices may be controlled in the user environment, the status of these electrical loads and/or load control devices may be helpful for performing user control within the user environment. The status of the electrical loads and/or load control devices may not be easily determined from a single status indicator that is universal for the various types of electrical loads. Thus, a default indicator may cause confusion to the end user as to the actual status of an electrical load or load control device being controlled thereby.

SUMMARY

As described herein, a remote control device may transmit messages to control load control devices for controlling electrical loads (e.g., lighting devices, such as controllable lamps), and display feedback (e.g., visual feedback) that is dependent upon information regarding the load control devices to which the remote control device is associated. The remote control device may be part of a load control system that may include load control devices for directly controlling electrical power supplied to electrical loads, and controllers configured to transmit commands or signals to the load control devices to cause the load control devices to control the electrical loads. The load control devices may include a lighting device for controlling an amount of power provided to a lighting load, an audio device for controlling a speaker, a thermostat device for controlling a setpoint temperature of a heating, ventilation, and air conditioning (HVAC) system, a motorized window treatment, or other similar load control devices which control electrical loads in a system. The controllers may include remote control devices or sensor devices, such as occupancy sensors, daylight sensors, etc. The remote control device may be a retrofit remote control device capable of covering a switch installed on the wall-mounted load control device. The remote control device may communicate with the load control device via an intermediary device, such as a hub device. The hub device may communicate with the load control device and the remote control device via the same or different protocols.

The remote control device may comprise a status indicator (e.g., a visual indicator) that may be illuminated to provide the visual feedback. The status indicator may be a circular or linear light bar. The entire status indicator may be illuminated to provide the visual feedback (e.g., to a full intensity or an intensity between the full intensity and off). Different segments of the visual indicator may be illuminated to different intensities and/or colors to provide the visual feedback.

The remote control device may provide simple feedback and advanced feedback. The simple feedback may be provided in response to an actuation of a button or other user interface event at the remote control device to provide an indication that the input was received and the remote control device is responding to the received input (e.g., wireless transmitting a message to the load control devices). The advanced feedback may indicate a status (e.g., an on/off state, and/or an intensity level) of one or more of the load control devices. For example, a portion of the status indicator may be illuminated to provide an indication of the present intensity of one or more lighting devices. The remote control device may be configured to provide different types of visual feedback (e.g., different types of simple and advanced feedback) by, for example, adjusting the intensity and/or color of the illumination, changing the portions of the status indicator that are illuminated, and providing different animations.

The remote control device may decide on the type of visual feedback to provide based on information regarding the load control devices to which the remote control device is associated. The remote control device may be configured to decide to provide simple or advanced feedback based on the information regarding the load control devices. The remote control device may be configured to decide a type of simple or advanced feedback based on the information regarding the load control devices (e.g., different intensities, colors, illuminated segments, animations, etc.). The remote control device may be configured to obtain the information regarding the load control devices during configuration when the remote control device is associated with the load control devices and/or dynamically during normal operation as the remote control device is communicating with the load control devices (e.g., in response to an actuation of a button of the remote control device).

The remote control device may be configured to decide on the type of visual feedback to provide based on the type of load control devices associated to the remote control devices (e.g., lighting devices for adjusting lighting intensity level, audio devices for adjusting playback volume, temperature control devices, motorized window treatments, etc.). The remote control device may be configured to decide on the type of visual feedback to provide based on whether a master device (e.g., a hub device) is associated with the remote control device or not. The remote control device may be configured to decide on the type of visual feedback to provide based on the number of load control devices that are associated with the remote control device. The remote control device may be configured to decide on the type of visual feedback to provide based on the status of the load control devices (e.g., whether the load control devices are in sync or out of sync). The remote control device may be configured to decide on the type of visual feedback to provide based on the type of control that the remote control device is using to control the load control devices (e.g., absolute or relative control).

BRIEF DESCRIPTION OF THE DRAWINGS

FIGS. 1A and 1B depict examples of a load control system that may implement one or more message types for communicating digital messages.

FIGS. 11A-11D are front views of a remote control device with a status indicator (e.g., a visual indicator) that may be illuminated to provide feedback (e.g., visual feedback).

FIGS. 13-20 are front views of a remote control device with a status indicator that may be illuminated to provide feedback.

DETAILED DESCRIPTION

Figure 1B:
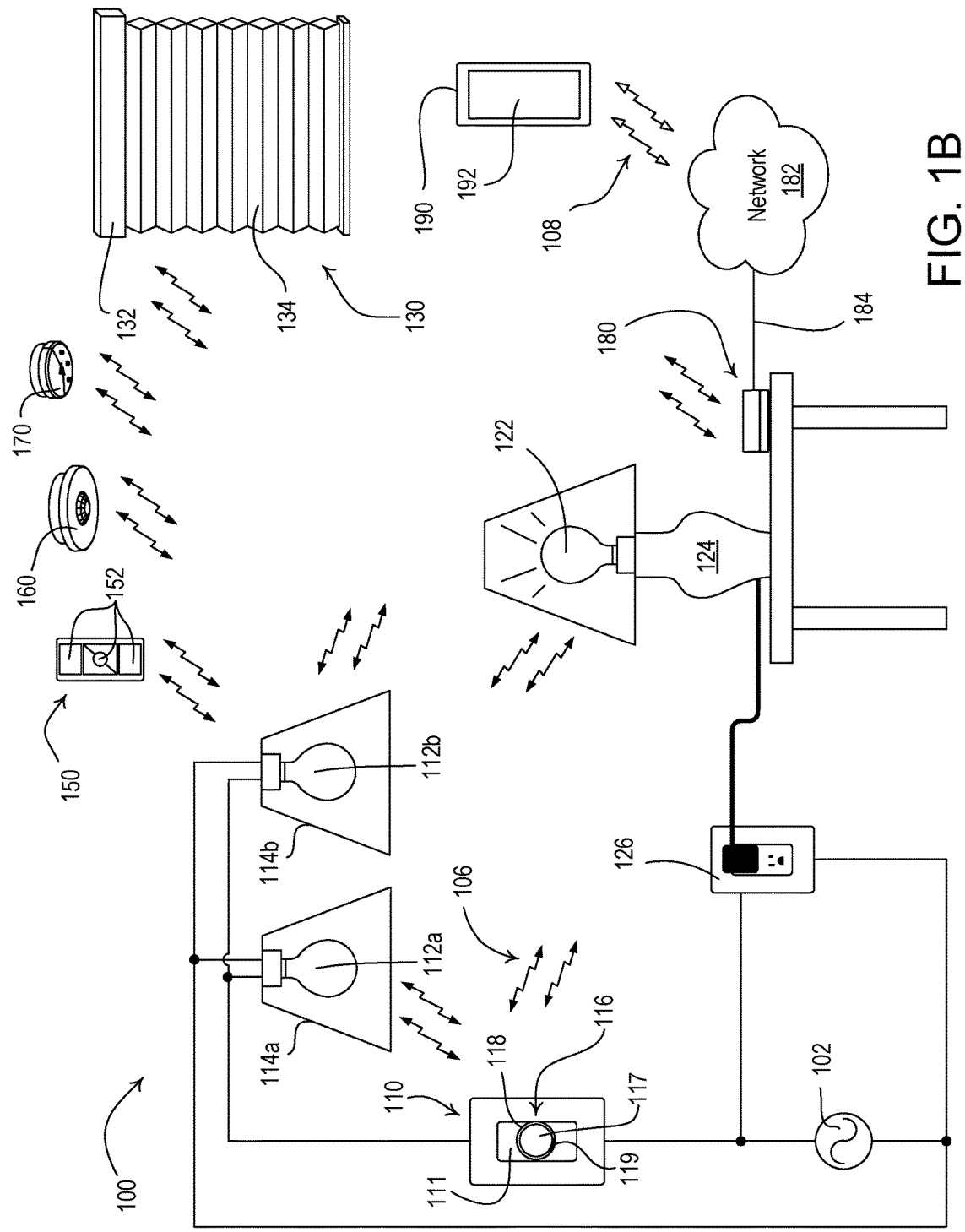

FIGS. 1A and 1B depict examples of a load control system 100 that may implement one or more message types for communicating messages (e.g., digital messages). As shown in FIG. 1A, the load control system 100 may include various control devices, such as controller devices and/or load control devices. The controller device may send digital messages to the load control device to cause the load control device to control an amount of power provided from an AC power source 102 to an electric load in the load control system 100.

Load control devices may control the electrical loads within a room and/or a building. Each load control device may be capable of directly controlling the amount of power provided to an electrical load in response to communication from a controller device. Example load control devices may include lighting devices 112a, 112b and/or lighting device 122 (e.g., a load control device in light bulbs, ballasts, LED drivers, etc.). The lighting devices may be a lighting load itself, or a device that includes the lighting load and a lighting load controller.

A controller device may indirectly control the amount of power provided to an electrical load by transmitting digital messages to the load control device. The digital messages may include control instructions (e.g., load control instructions) or another indication that causes the load control device to determine load control instructions for controlling an electrical load. Example controller devices may include a remote control device 116. The controller devices may include a wired or wireless device.

Control devices (e.g., controller devices and/or load control devices) may communicate with each other and/or other devices via wired and/or wireless communications. The control devices may communicate using digital messages in a wireless signal. For example, the control devices may communicate via radio frequency (RF) signals 106. The RF signals 106 may be communicated via an RF communication protocol (e.g., ZIGBEE®; near field communication (NFC); BLUETOOTH®; WI-FI®; a proprietary communication protocol, such as CLEAR CONNECT™, etc.). The digital messages may be transmitted as multicast messages and/or unicast messages via the RF signals 106.

The lighting device 122 may be installed in a plug-in device 124, such as a lamp (e.g., a table lamp). The plug-in device 124 may be coupled in series electrical connection between the AC power source 102 and the lighting device 122. The plug-in device 124 may be plugged into an electrical receptacle 126 that is powered by the AC power source 102. The plug-in device 124 may be plugged into the electrical receptacle 126 or a separate plug-in load control device that is plugged into the electrical receptacle 126 and configured to control the power delivered to the lighting device 122.

The lighting devices 112a, 112b may be controlled by a wall-mounted load control device 110. Though the lighting devices 112a, 112b are shown in FIG. 1A, any number of lighting devices may be implemented that may be supported by the wall-mounted load control device 110 and/or the AC power source 102. The wall-mounted load control device 110 may be coupled in series electrical connection between the AC power source 102 and lighting devices 112a, 112b. The wall-mounted load control device 110 may include a mechanical switch 111 (e.g., a previously-installed light switch) that may be opened and closed in response to actuations of a toggle actuator (not shown) for controlling the power delivered from the AC power source 102 to the lighting devices 112a, 112b (e.g., for turning on and off the lighting devices 112a, 112b). The lighting devices 112a, 112b may be installed in respective ceiling mounted downlight fixtures 114a, 114b or other lighting fixture mounted to another surface. The wall-mounted load control device 110 may be adapted to be wall-mounted in a standard electrical wallbox.

The remote control device 116 may be configured to transmit messages via the RF signals 106 for controlling the lighting devices 112a, 112b. The remote control device 116 may be a retrofit remote control device mounted over the toggle actuator of the mechanical switch 111. The remote control device 116 may be configured to maintain the toggle actuator of the mechanical switch 111 in the "on" position (e.g., by covering the switch when in the "on" position) to maintain the flow of power from the AC power source 102 to the lighting devices 112a, 112b. The remote control device 116 may comprise an actuation portion 117 that may be actuated (e.g., pushed in towards the mechanical switch 111) and a rotation portion 118 (e.g., a rotary knob) that may be rotated (e.g., with respect to the mechanical switch 111). Though a rotation portion 118 is disclosed, the remote control device 116 may include another type of intensity adjustment actuator, such as a linear slider, an elongated touch sensitive actuator, a rocker switch, separate raise/lower actuators, or another form of intensity adjustment actuator. The remote control device 116 may be battery-powered. In addition, the remote control device 116 may be mounted to another structure (e.g., other than the toggle actuator of the mechanical switch 111), such a as wall, may be attached to a pedestal to be located on a horizontal surface, or may be handheld. Further, the wall-mounted load control device 110 may comprise a wall-mounted remote control device that replaces the previously-installed mechanical switch 111 and may be configured to operate as the remote control device 116 to control the lighting devices 112a, 112b (e.g., by transmitting messages via the RF signals 106). Such a wall-mounted remote control device may derive power from the AC power source 102.

The lighting devices 112a, 112b may be turned on or off, or the intensity level may be adjusted, in response to the remote control device 116 (e.g., in response to actuations of the actuation portion 117 of the remote control device 116). For example, the lighting devices 112a, 112b may be toggled on or off by a toggle event identified at the remote control device 116. The toggle event may be a user event identified at the remote control device 116. The actuation portion 117 of the remote control device 116 may be actuated to toggle the lighting devices 112a, 112b on or off. The rotation portion 118 of the remote control device 116 may be rotated to adjust the intensities of the lighting devices 112a, 112b. The toggle event may be identified when the rotation portion 118 of the remote control device 116 is turned by a predefined amount or for a predefined time, and/or the actuation portion 117 of the remote control device 116 is actuated. The lighting level of the lighting devices 112a, 112b may be increased or decreased by rotating the rotation portion 118 of the remote control device 116 in one direction or another, respectively. Though shown as comprising a rotary knob in FIGS. 1A and 1B, the remote control device 116 may comprise a paddle switch that may be actuated by a user, a linear control on which a user may swipe a finger, a raise/lower slider, a rocker switch, or another type of control capable of receiving user interface events as commands.

The remote control device 116 may provide feedback (e.g., visual feedback) to a user of the remote control device 116 on a visual indicator, such as a status indicator 119. The status indicator 119 may provide different types of feedback. The feedback may include feedback indicating actuations by a user or other user interface event, a status of electrical loads being controlled by the remote control device 116, and/or a status of the load control devices being controlled by the remote control device 116. The feedback may be displayed in response to user interface event and/or in response to messages received that indicate the status of load control devices and/or electrical loads.

The status indicator 119 may include one or more light emitting diodes (LEDs) for providing feedback. The status indicator 119 may be a light bar included around the entire perimeter of the remote control device 116, or a portion thereof. The status indicator 119 may also, or alternatively be a light bar in a line on the remote control device 116, such as when the remote control device is a paddle switch or a linear control, for example.

Example types of feedback may include illumination of the entire status indicator 119 (e.g., to different levels), blinking or pulsing one or more LEDs in the status indicator 119, changing the color of one or more LEDs on the status indicator 119, and/or illuminating different sections of one or more LEDs in the status indicator 119 to provide animation (e.g., clockwise and counter clockwise animation for raising and lowering a lighting level). The feedback on the status indicator 119 may indicate a status of an electrical load or a load control device, such as a lighting intensity level for lights (e.g., lighting devices 112a, 112b, 122), a volume level for audio devices, a shade level for a motorized window treatment, and/or a speed for fans or other similar types of devices that operate at different speeds. The feedback on the status indicator 119 may change based on the selection of different presets. For example, a different LED or LEDs may be illuminated on the status indicator 119 to identify different presets (e.g., preset intensity levels for the lighting devices 112a, 112b, 122 and/or other preset configurations for load control devices).

The status indicator 119, or a portion thereof, may be turned on or off to indicate the status of one or more of the lighting devices 112a, 112b, 122. For example, the status indicator 119 may be turned off to indicate that the lighting devices 112a, 112b, 122 are in an off state. The entire status indicator, or portion thereof, may be turned on to indicate that the lighting devices 112a, 112b, 122 are in the on state. The portion of the status indicator 119 that is turned on may indicate the intensity level of one or more of the lighting devices 112a, 112b, 122. For example, when the lighting devices 112a, 112b, 122 are at a 50% intensity level, 50% of the status indicator 119 may be turned on to reflect the intensity level of the lighting devices 112a, 112b, 122.

The remote control device 116 may provide simple feedback or advanced feedback to the user on the status indicator 119. The remote control device 116 may decide between multiple types of advanced feedback or between multiple types of simple feedback. For example, this decision may be based on the type of load control device associated with the remote control device 116 (e.g., lights, HVAC, motorized window treatment, audio device, fan, etc.). The remote control device 116 may be configured to provide different type of visual feedback (e.g., different types of simple and advanced feedback) by adjusting the intensity and/or color of the illumination, changing the portions of the status indicator 119 that are illuminated, and providing different animations.

Figure 11D:
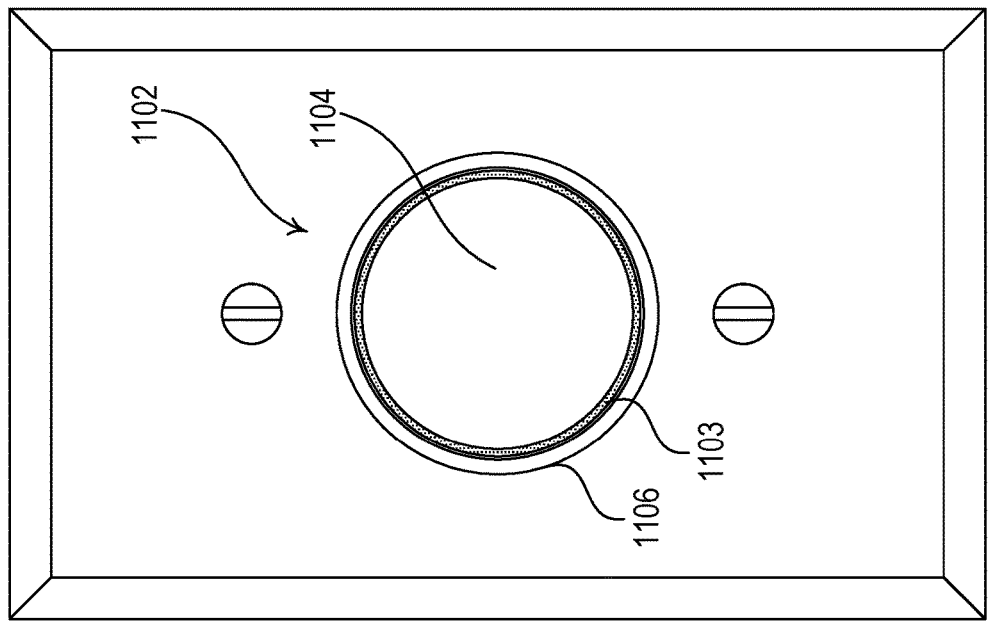
Figure 11C:
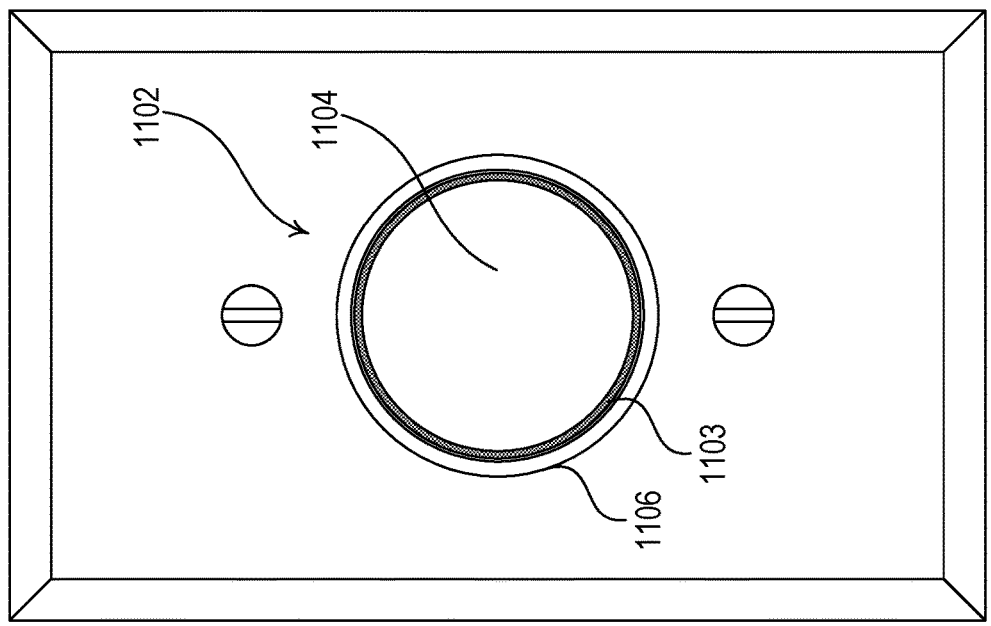

Simple feedback may be provided in response to actuations or other user interface event received at the remote control device 116. For example, simple feedback may indicate to a user that the remote control device 116 is operating correctly (e.g., in response to an actuation of the toggle button or a rotation). The simple feedback may illuminate or blink one or more LEDs in response to a button press. The simple feedback may indicate that the remote control device 116, or a button thereon, was actuated. The simple feedback may indicate that a command has been selected in response to user interface event. For example, the simple feedback may provide a blinking sequence in response to actuations of a toggle event. The simple feedback may provide a solid illumination of the status indicator 119 at different lighting levels in response to clockwise and counterclockwise rotations of the remote control device 116 (e.g., as shown in FIGS. 11C-11D). As the simple feedback may provide information that does not indicate the status of a load control device, the status indicator 119 may operate more as a visual indicator of other types of status or may not indicate a status of a device at all.

The remote control device 116 may provide advanced feedback based on knowledge of the state of a load control device, such that the feedback may provide the state information to the user. For example, rotations of the remote control device 116 can cause the visual feedback to track the light level of the lighting devices 112a, 112b, 122. The light level may be stored in the remote control device 116 (e.g., if there is one remote control device assigned to lighting devices 112a, 112b, 122 and lighting devices 112a, 112b, 122 may be controlled as a group from the dedicated remote control device 116) or may be received by remote control device 116 in response to query messages transmitted from the remote control device 116. For advanced feedback in response to a user interface event, such as a toggle event, the lights on the status indicator 119 may increase from off to an on light level when turning on the lighting devices 112a, 112b, 122, and decrease from the on light level to off when turning off the lighting devices 112a, 112b, 122.

The decision on type of feedback provided by the status indicator 119 may be made at the time of association of the remote control device 116 and stored at the remote control device 116. The decision on the type of feedback provided by the status indicator 119 may be made dynamically. For example, the type of feedback displayed via the status indicator 119 may change depending on the information determined in response to a query message sent to the lighting devices 112a, 112b, 122 or other load control devices. The query message may be sent in response to an actuation on the remote control device 116 and/or in response to a sensing circuit (e.g., an occupancy sensing circuit and/or a proximity sensing circuit) sensing an occupant near the remote control device 116. The remote control device 116 may wake up in response to an actuation and ping associated lighting devices 112a, 112b, 122 or other load control devices to determine a status of the electrical loads controlled by the associated load control devices.

The remote control device 116 may operate to provide different types of feedback (e.g., advanced feedback or simple feedback) based on information about the associated devices. For example, the remote control device 116 may provide different feedback on the status indicator 119 when associated with a master device than when not associated with the master device. The master device may be one of the lighting devices 112a, 112b, 122 or another load control device. The remote control device 116 may provide advanced feedback on the status indicator 119 when associated with a master device that is capable of providing the status of load control devices to the remote control device 116. The remote control device 116 may provide simple feedback on the status indicator 119 when not associated with a master device.

The remote control device 116 may provide different feedback on the status indicator 119 based on the number of load control devices associated with the remote control device 116. For example, the remote control device 116 may provide different feedback on the status indicator 119 when a single lighting device 112a is associated with the remote control device 116 than when multiple lighting devices 112a, 112b, 122 are associated with the remote control device 116. When a single load control device is associated with the remote control device 116, the remote control device 116 may provide advanced feedback on the status indicator 119. When multiple load control devices are associated with the remote control device 116, the remote control device 116 may provide simple feedback on the status indicator 119. Simple feedback may be provided when the remote control device 116 is associated with multiple load control devices, as the load control devices may be different types of devices may be currently controlled differently, may be at different levels (e.g., different intensity levels), and/or may be at levels that are unknown to the remote control device 116.

The remote control device 116 may provide different feedback on the status indicator based on whether the loads of the associated load control devices are in sync. When the loads are in sync (e.g., the same status is received for the associated load control devices), the remote control device 116 may provide advanced feedback on the status indicator 119. For example, in response to a toggle event or a rotation (e.g., a predefined distance or time in a direction) for controlling an intensity level of the lighting devices 112a, 112b, 122, the remote control device 116 may awaken from a sleep state and query the lighting devices 112a, 112b, 122 for their current state. The remote control device 116 may receive the current state (e.g., on/off state, lighting level, color, etc.) of the lighting devices 112a, 112b, 122 and determine that the lighting devices 112a, 112b, 122 are in the same state. The status indicator 119 on the remote control device 116 may indicate the status of the lighting devices 112a, 112b, 122 that is received in response to the query message. While the remote control device 116 remains awake, the status indicator 119 may reflect the updated status of one or more of the lighting devices 112a, 112b, 122 as the status changes. After a predefined period of time, the remote control device 116 may return to the sleep state. The status indicator 119 may be turned off in the sleep state to conserve battery power.

When the loads are out of sync (e.g., a different status is received for the associated load control devices), the remote control device 116 may provide simple feedback or advanced feedback on the status indicator 119. For example, in response to a toggle event or a rotation (e.g., a predefined distance or time in a direction) for controlling an intensity level of the lighting devices 112a, 112b, 122, the remote control device 116 may awaken from a sleep state and query the lighting devices 112a, 112b, 122 for their current state. The status indicator 119 on the remote control device 116 may indicate the status of one or more of the lighting devices 112a, 112b, 122 that is received in response to the query message. When the status of the lighting devices 112a, 112b, 122 are in sync, the remote control device 116 may provide advanced feedback such that the status indicator 119 on the remote control device 116 indicate the intensity level at which all of the lighting devices 112a, 112b, 122 are operating.

When the status of the lighting devices 112a, 112b, 122 are out of sync, the remote control device 116 may provide simple feedback on the status indicator 119. For example, the status indicator 119 on the remote control device 116 may reflect the current state of the lighting device 112a, 112b, 122 that is the first to respond to the query message, or the state of a particular lighting device 112a, 112b, 122 in the group. For example, in response to the query message for the current state of the lighting devices 112a, 112b, 122, the lighting device 112a may respond first that it is at a 10% intensity level. The status indicator 119 on the remote control device 116 may reflect the current state of the lighting device 112a on the status indicator 119. The group of lighting devices 112a, 112b, 122 may be the lighting devices that have been associated in memory with the remote control device 116, or otherwise stored in memory with a group identifier for being controlled together.

When the status of the lighting devices 112a, 112b, 122 are out of sync, the status indicator 119 may provide advanced feedback that represents the status of the group of lighting devices 112a, 112b, 122. For example, status indicator 119 may indicate the average intensity of the group of lighting devices 112a, 112b, 122 or the state of the majority of the lighting devices 112a, 112b, 122. The status indicator 119 may provide advanced feedback to indicate the state of the group of lighting devices 112a, 112b, 122 by lighting the entire status indicator 119 when a majority of the lighting devices 112a, 112b, 122 are in the on state, turning the status indicator 119 off when the majority of the lighting devices 112a, 112b, 122 are in the off state, lighting a portion of the status indicator 119 that identifies an average lighting level of the group of lighting devices 112a, 112b, 122, increasing an intensity of the status indicator 119 to a percentage that reflects the intensity of the lighting devices 112a, 112b, 122, etc.

When the status of the lighting devices 112a, 112b, 122 are out of sync, the status indicator 119 may provide simple or advanced feedback that indicates that the lighting devices 112a, 112b, 122 are out of sync. For example, the remote control device 116 may provide simple feedback by making the entire status indicator 119 lit, unlit, or flash to indicate that the lighting devices 112a, 112b, 122 are out of sync. The remote control device 116 may provide advanced feedback by blinking or pulsing the status indicator 119 while displaying the average intensity level of the lighting devices 112a, 112b, 122, by periodically transitioning the status indicator 119 between the intensity levels of the lighting devices 112a, 112b, 122, or by periodically transitioning the status indicator 119 between maximum and minimum intensity levels of the lighting devices 112a, 112b, 122. When the group of lighting devices 112a, 112b, 122 are out of sync, no feedback may be provided, a constant feedback indication may be provided, or feedback may be provided (e.g., flashing LEDs) that indicates that the group of lighting devices are out of sync.

The remote control device 116 may be configured to display feedback (e.g., simple feedback) in response to determining that one or more of the lighting devices 112a, 112b, 122 are "missing." For example, the remote control device may be configured to blink the entire status indicator 119 (e.g., in a particular color, such as red) and/or provide an animation to indicate that one or more of the lighting devices 112a, 112b, 122 are missing. The remote control device 116 may be configured to determine that one of the lighting devices 112a, 112b, 122 is missing, for example, in response to not receiving a response to a query message transmitted to that particular lighting device. For example, one of the lighting devices 112a, 112b, 122 may be "missing" if that lighting device has been removed from its fixture or lamp (e.g., unscrewed), is unplugged, is faulty, the corresponding light switch is turned off (e.g., light switch in a series is turned off, while others are on), and/or has reached end of life.

The feedback provided by the status indicator 119 may be automatically or dynamically updated according to different feedback modes during operation of the remote control device 116. For example, the status indicator 119 may provide different types of feedback based on the state of the lighting devices 112a, 112b, 122 and/or the number of lighting devices 112a, 112b, 122 that are associated with the remote control device 116. The remote control device 116 may provide advanced feedback on the status indicator 119 that indicates an intensity level of one or more lighting devices as a portion of the entire status indicator 119. The remote control device 116 may provide simple feedback that illuminates the entire status indicator 119. The simple feedback may be provided to illuminate the entire status indicator 119 to indicate one or more lighting devices in a group are in an on state, turn off the status indicator 119 to indicate that one or more lighting devices in the group are in the off state, and/or illuminate the status indicator 119 to different levels when raising or lowering intensity of one or more lighting devices in the group. The operation of different feedback modes may allow for more granular feedback of an individual load control device with which the remote control device 116 is associated, while preventing confusion that may be caused by providing feedback of a single device when the remote control device 116 is associated with multiple load control devices that are out of sync.

The remote control device 116 may provide advanced feedback if the load control devices (e.g., lighting devices 112a, 112b, 122) with which the remote control device 116 is associated are not associated with other remote control devices. The remote control device 116 may provide simple feedback if one or more of the load control devices (e.g., lighting devices 112a, 112b, 122) with which the remote control device 116 is associated are also associated with other remote control devices. This may allow for more granular feedback of a group of individual load control devices with which the remote control device 116 is associated, while preventing continuous updating or confusion when other remote control devices are controlling the multiple load control devices (e.g., lighting devices 112a, 112b, 122).

The remote control device 116 may transmit digital messages via the RF signals 106 to control the lighting devices 112a, 112b, 122. The remote control device 116 may be configured to adjust the intensities of the lighting devices 112a, 112b, 122 using absolute control in order to control the intensities of the lighting devices 112a, 112b, 122 to an absolute level (e.g., a specific level). For example, the remote control device 116 may transmit digital messages including a move-to-level command (e.g., a go-to-level or go-to command) that identifies a lighting level to which the lighting devices may change. The move-to-level command may include the amount of time over which the lighting level may be changed at the lighting devices. The move-to-level command may indicate an "on" event or an "off" event to turn the lighting devices 112a, 112b, 122 on or off, respectively. For example, the "on" event may be indicated with a 100% lighting level, or another preset lighting level. The "off" event may be indicated with a 0% intensity level. The lighting level for the "on" event and/or the "off" event may also, or alternatively, be stored at the lighting devices 112a, 112b, 122 and the lighting devices may change to the lighting level upon receiving an indication of the occurrence of the "on" event or "off" event at the remote control device 116. The digital messages may indicate an "on" event when the remote control device 116 is rotated a predefined distance or time in one direction. As an example, the remote control device 116 may transmit digital messages when the remote control device 116 is identified as being rotated for 100 milliseconds (ms). The digital messages may indicate an "off" event when the remote control device 116 is rotated a predefined distance or time in the opposite direction. The digital messages may indicate an "on" event or an "off" event when the remote control device 116 is pressed (e.g., when a button on the face of the remote control device is pressed or the remote control device 116 is pressed in). The "on" event or "off" event may be indicated in a digital message with a toggle command that indicates for the lighting devices 112a, 112b, 122 to toggle from "on" to "off," or vice versa.

In response to a user interface event (e.g., actuation, rotation, finger swipe, etc.) or a proximity sensing event (e.g., a sensing circuit sensing an occupant near the remote control device 116) at the remote control device 116, the remote control device 116 may determine a starting point (e.g., a dynamic starting point) from which the lighting level of one or more of the lighting devices 112a, 112b, 122 may be controlled. Each rotation of the rotation portion 118 may cause the remote control device 116 to determine the dynamic starting point from which control may be performed. In response to the user interface event and/or a proximity sensing event (e.g., a sensing circuit sensing an occupant near the remote control device 116), the remote control device 116 may query the lighting devices 112a, 112b, 122 for a current status (e.g., after awakening from sleep mode). The current status of one or more of the lighting devices 112a, 112b, 122 may be used to set the dynamic starting point from which the remote control device 116 may perform control. For example, the remote control device 116 may set the dynamic starting point of the rotation portion 118 to the current intensity level (e.g., on, off, 10%, 20%, etc.) of the first of the lighting devices 112a, 112b, 122 to respond to the query, or a predefined lighting device 112a, 112b, 122.

In another example, the remote control device 116 may set the dynamic starting point of the rotation portion 118 based on the intensity level of multiple lighting devices 112a, 112b, 122. The remote control device 116 may set the dynamic starting point of the rotation portion 118 to an average intensity level (e.g., on, off, 10%, 20%, etc.) of the lighting devices 112a, 112b, 122, or a common lighting intensity (e.g., on, off, 10%, 20%, etc.) of a majority of the lighting devices 112a, 112b, 122, for example. The remote control device 116 may set the dynamic starting point of the rotation portion 118 to a maximum level of the lighting devices 112a, 112b, 122 when the rotation portion 118 is being rotated clockwise to raise the intensity level of the lighting devices, or a minimum level of the lighting devices 112a, 112b, 122 when the rotation portion 118 is being rotated counterclockwise to lower the intensity level of the lighting devices, for example. The status indicator 119 may be illuminated as feedback to reflect the dynamic starting point to the user. For example, the remote control device 116 may illuminate a portion of the status indicator 119 that reflects the lighting intensity that is set as the dynamic starting point.

The remote control device 116 may calculate an increase or decrease in intensity level from the dynamic starting point based on the user interface event. For example, the remote control device 116 may calculate an increase or decrease in intensity level based on the distance or amount of time the rotation portion 118 is turned. The rotation from the point of the initial interaction by the user with the rotation portion 118 may be used to identify the increase or decrease in intensity level from the dynamic starting point. When the remote control device 116 includes a linear control, the remote control device 116 may calculate an increase or decrease in intensity level based on the distance or amount of time the user swipes a finger up or down on the linear control. The user's finger swipe from the point of the initial interaction by the user with the linear control may be used to identify the increase or decrease in intensity level from the dynamic starting point.

The updated intensity level may be calculated from the user's initial interaction and stored at the remote control device 116. The updated intensity level may be included in a move-to-level command that is transmitted from the remote control device 116 to the lighting devices 112a, 112b, 122 when the remote control device 116 is using absolute control.

The visual feedback displayed by the status indicator 119 may be provided in or derived from the information in the move-to-level command when the remote control device 116 is using absolute control. For example, the remote control device 116 may reflect the intensity level transmitted in the move-to-level command in the status indicator 119.

The remote control device 116 may transmit digital messages configured to increase the lighting level of the lighting devices 112a, 112b, 122 when the rotation portion 118 is rotated in a direction (e.g., clockwise). As previously mentioned, the remote control device 116 may be configured to adjust the intensities of the lighting devices 112a, 112b, 122 to an absolute level using absolute control. In addition, or alternatively, the remote control device 116 may be configured to adjust the intensities of the lighting devices 112a, 112b, 122 using relative control to adjust the intensities of the light devices 112a, 112b, 122 by a relative amount. For example, the remote control device 116 may transmit digital messages configured to decrease the lighting level of the lighting devices 112a, 112b, 122 when the remote control device 116 is rotated in the opposite direction (e.g., counterclockwise). The digital messages may include a move-with-rate command, which may cause the lighting devices 112a, 112b, 122 to change their respective intensity level by a predefined amount. The move-with-rate command may include the amount of time over which the lighting level may be changed at the lighting devices. The move-with-rate command may cause the lighting devices 112a, 112b, 122 to retain their relative or proportional intensity levels, and/or difference in respective intensity levels. The remote control device 116 may send digital messages to increase or decrease the lighting level by a predefined amount when rotated a predefined distance or for a predefined time. The amount of the increase or decrease may be indicated in the digital messages or may be predefined at the lighting devices 112a, 112b, 122.

The status indicator 119 may be controlled differently when the remote control device 116 is operating using relative control and when the remote control device 116 is operating using absolute control. The remote control device 116 may provide advanced feedback on the status indicator 119 when performing absolute control, as each of the load control devices (e.g., lighting devices 112a, 112b, 122) may be in sync. The remote control device 116 may provide a simple feedback when performing relative control, as each of the load control devices (e.g., lighting devices 112a, 112b, 122) may be out of sync. When using relative control, the status indicator 119 may not be illuminated to provide feedback of the intensity of the lighting devices 112a, 112b, 122. The status indicator 119 may be illuminated to different intensities when the remote control device 116 is raising and lowering the intensity level of the lighting devices 112a, 112b, 122. For example, the status indicator 119 may be illuminated to a first intensity (e.g., 66%) when raising the intensity level of the lighting devices 112a, 112b, 122 and a second intensity (e.g., 33%) when lowering the intensity level of the lighting devices 112a, 112b, 122. Alternatively, or additionally, the status indicator 119 may be illuminated to match the maximum intensity or the minimum intensity of the group of lighting devices 112a, 112b, 122.

The mode of control (e.g., relative control or absolute control) may be dynamically updated at the remote control device 116. For example, the remote control device 116 may change the mode of control depending upon the number of the lighting devices 112a, 112b 122 that are associated with the remote control device 116. The remote control device 116 may use the relative control when associated with a single lighting device. The remote control device 116 may use the absolute control when associated with multiple lighting devices. The mode of control may also, or alternatively, be updated based on whether the lighting devices 112a, 112b 122 are in sync or out of sync. The remote control device 116 may use the absolute control when the lighting devices 112a, 112b 122 are in sync. The remote control device 116 use the relative control when the lighting devices 112a, 112b 122 are out of sync.

The visual feedback provided by the status indicator 119 by be dynamically updated depending on the mode of control being used at the remote control device 116. The remote control device 116 may provide feedback according to the simple feedback mode when using relative control and according to the advanced feedback mode when using absolute control. For example, the advanced feedback mode may provide feedback that indicates an intensity level of one or more lighting devices as a portion of the entire status indicator 119. The simple feedback mode may provide simple feedback that illuminates the entire status indicator 119 to different levels when raising or lowering intensity.

The digital messages transmitted via the RF signals 106 may be multicast messages. For example, the digital messages including the move-to-level command may be transmitted as multicast messages. The multicast messages may include a group identifier for controlling the lighting devices 112a, 112b, 122 that are a part of the multicast group. The lighting devices 112a, 112b, 122 may be a part of the multicast group when they are associated with the group identifier (e.g., by having the group identifier stored thereon) for recognizing multicast messages transmitted to the group. The lighting devices 112a, 112b, 122 that are associated with the group identifier may recognize the multicast messages and control the corresponding lighting load according to the command in the multicast messages. The lighting devices 112a, 112b, 122 may forward the multicast messages with the group identifier for identification and load control by other lighting devices associated with the group identifier.

The group may be formed at commissioning or configuration of the load control system 100. The remote control device 116 may generate the group identifier and send the group identifier to the lighting devices 112a, 112b, 122 and/or a hub device when the remote control device 116 is in an association mode (e.g., entered upon selection of one or more buttons). The devices that store the group identifier may be part of the group of devices that are associated with the remote control device 116 and can respond to group messages.

The remote control device 116 may transmit the digital messages as multicast messages and/or unicast messages via the RF signal 106. For example, the digital messages including the move-with-rate command or the move-to-level command may be transmitted as unicast messages. Unicast messages may be sent from the remote control device 116 directly or via hops to each of the lighting devices 112a, 112b, 122. The remote control device 116 may individually send a unicast message to each of the lighting devices 112a, 112b, 122 with which the remote control device 116 is associated for performing load control. The remote control device 116 may have the unique identifier of each of the lighting devices 112a, 112b, 122 with which it is associated stored in memory. The remote control device 116 may generate a separate unicast message for each lighting device 112a, 112b, 122 and address the unicast messages to the lighting devices 112a, 112b, 122 independently. The unicast messages may also include the unique identifier of the remote control device 116. The lighting devices 112a, 112b, 122 may identify the unicast messages communicated to them by identifying their own unique identifier and/or a corresponding identifier of the remote that are stored in an association dataset. The lighting devices 112a, 112b, 122 may operate according to the instructions (e.g., load control instructions) in the digital messages comprising their own unique identifier and/or the unique identifier of an associated device, such as the remote control device 116.

The multicast messages may be communicated more efficiently from the remote control device 116, as a single message may be transmitted to multiple lighting devices, such as lighting devices 112a, 112b, 122, at once. The multicast messages may be more reliable, as the multicast messages may be repeated by a receiving device, such that devices that fail to receive the message due to interference or signal strength may receive the multicast message upon the message being repeated. The load control instructions in the multicast messages may also be received and implemented by multiple lighting devices, such as lighting devices 112a, 112b, 122, at the same time, or at nearly the same time with a minor delay due to differences in latency, as a single message is being received at a group of devices within the same wireless range. The difference in latency may be overcome by determining the latency at each of the lighting devices and compensating for the difference in latency at each lighting device by delaying the implementation of the load control instructions by the difference in latency. The load control instructions in the unicast messages may be received and implemented by multiple lighting devices 112a, 112b, 122 at different times, which may be caused by the difference in latency between the devices and/or the time to process and transmit each message, as a different message is being transmitted to each device in a wireless range.

The remote control device 116 may transmit digital messages that include move-with-rate commands (e.g., as unicast messages and/or multicast messages) to increase or decrease the lighting intensity level of the lighting devices 112a, 112b, 122 in predefined increments as the user turns the remote control device 116 a predefined distance or time in one direction or another. The remote control device 116 may continue to transmit digital messages to the lighting devices 112a, 112b, 122 as the user continues to turn the remote control device 116. For example, the remote control device 116 may identify a rotation of a predefined distance or for a predefined time and send one or more digital messages to instruct the lighting devices 112a, 112b, 122 to each increase by ten percent (10%). The remote control device 116 may identify a continued rotation of a predefined distance or time and send digital messages to instruct the lighting devices 112a, 112b, 122 to increase by ten percent (10%) again.

The remote control device 116 may also, or alternatively, send digital messages for a move-to-level command (e.g., "on" command, "off" command, toggle command, etc.) to turn on/off the lighting devices 112a, 112b, 122. The remote control device 116 may transmit one or more digital messages to the lighting devices 112a, 112b, 122 when an on event or an off event are detected. For example, the remote control device 116 may identify a rotation or actuation and send digital messages to instruct the lighting devices 112a, 112b, 122 to turn on/off. The remote control device 116 may operate by sending a move-with-rate command after turning on. For example, the remote control device 116 may identify a rotation of a predefined distance or time after turning on and send digital messages to instruct the lighting devices 112a, 112b, 122 to increase/decrease by a predefined intensity (e.g., ten percent (10%)).

Embodiments described herein are not limited to remote control devices, but other controller devices may also be used in the same, or similar, manner. For example, embodiments may include wired control devices and/or plug-in control devices that communicate digital messages as described herein.

FIG. 1B shows an example load control system 100 having other devices. For example, the load control system 100 may include other control devices, such as controller devices and/or load control devices. The load control devices may be capable of controlling the amount of power provided to a respective electrical load based on digital messages received from the controller devices, which may be input devices. The digital messages may include load control instructions or another indication that causes the load control device to determine load control instructions for controlling an electrical load.

Examples of load control devices may include a motorized window treatment 130 and/or the lighting devices 112a, 112b, 122, though other load control devices may be implemented. The controller devices may include a remote control device 150, an occupancy sensor 160, a daylight sensor 170, and/or a network device 190, though other controller devices may be implemented. The controller devices may perform communications in a configuration similar to the remote control device 116 as described herein. The load control devices may perform communications in a configuration similar to the lighting devices 112a, 112b, 122 as described herein.

The load control devices may receive digital messages via wireless signals, e.g., radio-frequency (RF) signals 106 (e.g., ZIGBEE®; NFC; BLUETOOTH®; WI-FI®; or a proprietary communication channel, such as CLEAR CONNECT™, etc.). The wireless signals may be transmitted by the controller devices. In response to the received digital messages, the respective lighting devices 112a, 112b, 122 may be turned on and off, and/or the intensities of the respective lighting devices 112a, 112b, 122 may be increased or decreased. In response to the received digital messages, the motorized window treatment 130 may increase or decrease a level of a covering material 134.

The battery-powered remote control device 150 may include one or more actuators 152 (e.g., one or more of an on button, an off button, a raise button, a lower button, or a preset button). The battery-powered remote control device 150 may transmit RF signals 106 in response to actuations of one or more of the actuators 152. The battery-powered remote control device 150 may be handheld. The battery-powered remote control device 150 may be mounted vertically to a wall, or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 15, 2012, entitled CONTROL DEVICE HAVING A NIGHTLIGHT, the entire disclosures of which are hereby incorporated by reference.

The remote control device 150 may be a wireless device capable of controlling a load control device via wireless communications. The remote control device 150 may be attached to the wall or detached from the wall. Examples of remote control devices are described in greater detail in U.S. Pat. No. 5,248,919, issued Sep. 28, 1993, entitled LIGHTING CONTROL DEVICE; U.S. Pat. No. 8,471,779, issued Jun. 25, 2013, entitled WIRELESS BATTERY-POWERED REMOTE CONTROL WITH LABEL SERVING AS ANTENNA ELEMENT; and U.S. Patent Application Publication No. 2014/0132475, published May 15, 2014, entitled WIRELESS LOAD CONTROL DEVICE, the entire disclosures of which are hereby incorporated by reference.

The occupancy sensor 160 may be configured to detect occupancy and/or vacancy conditions in the space in which the load control system 100 is installed. The occupancy sensor 160 may transmit digital messages to load control devices via the RF communication signals 106 in response to detecting the occupancy or vacancy conditions. The occupancy sensor 160 may operate as a vacancy sensor, such that digital messages are transmitted in response to detecting a vacancy condition (e.g., digital messages may not be transmitted in response to detecting an occupancy condition). The occupancy sensor 160 may enter an association mode and may transmit association messages via the RF communication signals 106 in response to actuation of a button on the occupancy sensor 160. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 170 may be configured to measure a total light intensity in the space in which the load control system 100 is installed. The daylight sensor 170 may transmit digital messages including the measured light intensity via the RF communication signals 106 for controlling load control devices in response to the measured light intensity. The daylight sensor 170 may enter an association mode and may transmit association messages via the RF communication signals 106 in response to actuation of a button on the daylight sensor 170. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The motorized window treatment 130 may be mounted in front of a window for controlling the amount of daylight entering the space in which the load control system 100 is installed. The motorized window treatment 130 may include, for example, a cellular shade, a roller shade, a drapery, a Roman shade, a Venetian blind, a Persian blind, a pleated blind, a tensioned roller shade systems, or other suitable motorized window covering. The motorized window treatment 130 may include a motor drive unit 132 for adjusting the position of a covering material 134 of the motorized window treatment 130 in order to control the amount of daylight entering the space. The motor drive unit 132 of the motorized window treatment 130 may have an RF receiver and an antenna mounted on or extending from a motor drive unit 132 of the motorized window treatment 130. The motor drive unit 132 may respond to digital messages to increase or decrease the level of the covering material 134. The motor drive unit 132 of the motorized window treatment 130 may be battery-powered or may receive power from an external direct-current (DC) power supply. Examples of battery-powered motorized window treatments are described in greater detail in commonly-assigned U.S. Pat. No. 8,950,461, issued Feb. 10, 2015, entitled MOTORIZED WINDOW TREATMENT, and U.S. Pat. No. 9,115,537, issued Aug. 25, 2015, entitled BATTERY-POWERED ROLLER SHADE SYSTEM, the entire disclosures of which are hereby incorporated by reference Digital messages transmitted by the controller devices may include a command and/or identifying information, such as a serial number (e.g., a unique identifier) associated with the transmitting controller device. Each of the controller devices may be associated with the lighting devices 112a, 112b, 122 and/or the motorized window treatment 130 during a configuration procedure of the load control system 100, such that the lighting devices 112a, 112b, 122 and/or the motorized window treatment 130 may be responsive to digital messages transmitted by the controller devices via the RF signals 106. Examples of associating wireless control devices during a configuration procedure are described in greater detail in commonly-assigned U.S. Patent Application Publication No. 2008/0111491, published May 15, 2008, entitled RADIO-FREQUENCY LIGHTING CONTROL SYSTEM, and U.S. Pat. No. 9,368,025, issued Jun. 14, 2016, entitled TWO-PART LOAD CONTROL SYSTEM MOUNTABLE TO A SINGLE ELECTRICAL WALLBOX, the entire disclosures of which are hereby incorporated by reference.

The load control system 100 may include a hub device 180 (e.g., a system bridge) configured to enable communication with a network 182, e.g., a wireless or wired local area network (LAN). The hub device 180 may be connected to a router via a wired digital communication link 184 (e.g., an Ethernet communication link). The router may allow for communication with the network 182, e.g., for access to the Internet. The hub device 180 may be wirelessly connected to the network 182, e.g., using wireless technology, such as WI-FI® technology, cellular technology, etc. The hub device 180 may be configured to transmit communication signals (e.g., RF signals 106) to the lighting devices 112a, 112b, 122 and/or the motorized window treatment 130 for controlling the devices in response to digital messages received from external devices via the network 182. The hub device 180 may communicate via one or more types of RF communication signals (e.g., ZIGBEE®; NFC; BLUETOOTH®; WI-FI®; cellular; a proprietary communication channel, such as CLEAR CONNECT™, etc.). The hub device 180 may be configured to transmit and/or receive RF signals 106 (e.g., using ZIGBEE®; NFC; BLUETOOTH®; or a proprietary communication channel, such as CLEAR CONNECT™, etc.). The hub device 180 may be configured to transmit digital messages via the network 182 for providing data (e.g., status information) to external devices.

The RF signals 106 may be transmitted via one or more protocols. For example, the remote control device 116 and the remote control device 150 may communicate digital messages to lighting devices 112a, 112b, 122 via another protocol (e.g., ZIGBEE®, BLUETOOTH®, etc.) than other devices. For example, the occupancy sensor 160, daylight sensor 170, and/or motorized window treatment 130 may communicate via a proprietary communication channel, such as CLEAR CONNECT™. The hub device 180 may format digital communications using the appropriate protocol for the device. The hub device 180 may communicate using multiple protocols.

The hub device 180 may operate as a central controller for the load control system 100, and/or relay digital messages between the control devices (e.g., lighting devices, motorized window treatments, etc.) of the load control system and the network 182. The hub device 180 may receive digital messages from a controller device and configure the digital message for communication to a load control device. For example, the hub device 180 may configure multicast messages and/or unicast messages for transmission as described herein. The hub device 180 may be on-site at the load control system 100 or at a remote location. Though the hub device 180 is shown as a single device, the load control system 100 may include multiple hubs and/or the functionality thereof may be distributed across multiple devices.

The load control system 100 may include a network device 190, such as, a smart phone (for example, an iPhone® smart phone, an Android® smart phone, or a Blackberry® smart phone), a personal computer, a laptop, a wireless-capable media device (e.g., MP3 player, gaming device, or television), a tablet device, (for example, an iPad® hand-held computing device), a WI-FI® or wireless-communication-capable television, or any other suitable network communication or Internet-Protocol-enabled device. The network device 190 may be operable to transmit digital messages in one or more Internet Protocol packets to the hub device 180 via RF signals 108, either directly or via the network 182. For example, the network device 190 may transmit the RF signals 108 to the hub device 180 via a WI-FI® communication link, a WIMAX® communications link, a BLUETOOTH® communications link, a near field communication (NFC) link, a cellular communications link, a television white space (TVWS) communication link, or any combination thereof. The RF signals 108 may be communicated using a different protocol and/or wireless band than the RF signals 106. For example, the RF signals 108 may be configured for WI-FI® communication or cellular communication, while RF signals 106 may be configured for ZIGBEE®, BLUETOOTH®, or a proprietary communication channel, such as CLEAR CONNECT™. In another example, the RF signals 108 and the RF signals 106 may be the same. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The network device 190 may include a visual display 192. The visual display 192 may include a touch screen that may include, for example, a capacitive touch pad displaced overtop the visual display, such that the visual display may display soft buttons that may be actuated by a user. The network device 190 may include a plurality of hard buttons, e.g., physical buttons (not shown), in addition to the visual display 192. The network device 190 may download a product control application for allowing a user of the network device 190 to control the load control system 100. In response to actuations of the displayed soft buttons and/or hard buttons, the network device 190 may transmit digital messages to the load control devices and/or the hub device 180 through the wireless communications described herein.

The operation of the load control system 100 may be programmed and configured using the hub device 180 and/or network device 190. An example of a configuration procedure for a wireless load control system is described in greater detail in commonly-assigned U.S. Patent Application Publication No. 2014/0265568, published Sep. 18, 2014, entitled COMMISSIONING LOAD CONTROL SYSTEMS, the entire disclosure of which is hereby incorporated by reference.

The lighting devices 112*a*, 112*b*, 122 may each be included in a group of lighting devices that are associated with a common control device, such as the remote control device 116. For example, each of the lighting devices 112*a*, 112*b*, 122 may store the unique identifier of the remote control device 116 during an association mode to enable the lighting devices 112*a*, 112*b*, 122 to be controlled by digital messages from the remote control device 116 that include control instructions. The hub device 180 may store the associations between each of the lighting devices 112*a*, 112*b*, 122 and the remote control device 116 during an association mode. The association information may be used by the hub device 180 for routing digital messages to the lighting devices 112*a*, 112*b*, 122, or the lighting devices 112*a*, 112*b*, 122 may receive digital messages from the remote control device 116 directly.

A subset of the lighting devices 112*a*, 112*b*, 122 may be associated with other controller devices (e.g., remote control device 150, occupancy sensor 160, daylight sensor 170, network device 190, etc.) that may be capable of turning the subset of the lighting devices 112*a*, 112*b*, 122 on and/or off. A subset of the lighting devices 112*a*, 112*b*, 122 may be controlled to a different intensity level than the other lighting devices. In an example, the lighting device 122 may be independently associated with the remote control device 150 and/or the network device 190. The lighting device 122 may be separately controlled by the remote control device 150 and/or the network device 190, such that the lighting device 122 may be turned on while the lighting devices 112*a*, 112*b* are turned off, or vice versa. In another example, the lighting device 122 may be separately controlled by the remote control device 150 and/or the network device 190, such that the lighting device 122 may be dimmed to a different intensity level than the lighting devices 112*a*, 112*b*.

As a subset of the lighting devices 112*a*, 112*b*, 122 may be independently controlled, the group of lighting devices 112*a*, 112*b*, 122 may be in an inconsistent state (e.g., on/off state or intensity level). For example, the lighting device 122 may be controlled to an "on" state by the remote control device 150 or the network device 190, while the lighting devices 112*a*, 112*b* are in an "off" state. Though lighting device 122 is provided in an opposite state in examples described herein, the on/off state of any of the lighting devices in a load control system 100 may be out of sync with others. The remote control device 116 may send a toggle command or an on/off command (e.g., an "on" command or an "off" command) to the group of lighting devices 112*a*, 112*b*, 122 to toggle the group of lighting devices 112*a*, 112*b*, 122 from an "on" state to an "off" state, or vice versa. The toggle command or the on/off command may be sent in a multicast message that is received at each of the lighting devices 112*a*, 112*b*, 122, or in unicast messages that are independently directed to each of the lighting devices 112*a*, 112*b*, 122. The toggle command or the on/off command may be communicated directly to the lighting devices 112*a*, 112*b*, 122, or via the hub device 180.

The lighting devices 112*a*, 112*b*, 122 may identify the toggle command received in the digital messages and toggle to the opposite state. In an example in which the lighting devices 112*a*, 112*b* are in the "off" state, the lighting devices 112*a*, 112*b* may identify the toggle command and turn to the "on" state. In the example in which the lighting device 122 is in the "on" state, the lighting device 122 may identify the toggle command received in the digital messages and toggle to the "off" state.

To synchronize the on/off state of the group of lighting devices 112*a*, 112*b*, 122, the remote control device 116, the remote control device 150, or the network device 190 may transmit a digital message including a direct command (e.g., an "on" command or an "off" command) to the lighting devices 112*a*, 112*b*, 122 to control all of the lighting devices 112*a*, 112*b*, 122 to the same state. In addition, to synchronize the on/off state of the group of lighting devices 112*a*, 112*b*, 122, the remote control device 116, the remote control device 150, or the network device 190 may transmit a digital message to a subset of the lighting devices that are out of sync with the other lighting devices to cause the subset of the lighting devices to change states (e.g., via a toggle command, an "on" command, or an "off" command). For example, in an example in which the lighting devices 112*a*, 112*b* are in the "off" state and the lighting device 122 is in the "on" state, the remote control device 116, the remote control device 150, or the network device 190 may transmit a digital message to the lighting device 122 to cause the lighting device 122 to change states (e.g., via a toggle command, an "on" command, or an "off" command), or transmit a digital message to the lighting devices 112*a*, 112*b* to cause the lighting devices 112a, 112b to change states (e.g., via a toggle command, an "on" command, or an "off" command).

The load control system 100 may be configured to automatically synchronize and/or toggle the on/off state of the group of lighting devices 112a, 112b, 122. The remote control device 116 may identify a toggle event and query the lighting devices 112a, 112b, 122 for their current on/off state. The query message may be sent as a multicast message, or individual unicast messages, to each of the lighting devices 112a, 112b, 122. The lighting devices 112a, 112b, 122 may return the current on/off state, which may be stored locally thereon.

The remote control device 116 may choose the command to send in response to the toggle event based on the current on/off state of one or more of the group of lighting devices 112a, 112b, 122. The remote control device 116 may identify whether the on/off state across the group of lighting devices 112a, 112b, 122 is consistent. If the on/off state across the group of lighting devices 112a, 112b, 122 is consistent, the remote control device 116 may send the toggle command, an "on" command (if the lighting devices are off), or "off" command (if the lighting devices are on) to the lighting devices 112a, 112b, 122 to toggle the on/off state of the group of lighting devices 112a, 112b, 122. If the on/off state across the group of lighting devices 112a, 112b, 122 is inconsistent, the remote control device 116 may send a direct command to all of the lighting devices 112a, 112b, 122 or a synchronization message to a subset of the lighting devices 112a, 112b, 122 to change the on/off state of the subset.

The direct command may be an "on" command or an "off" command. For example, where lighting device 122 indicates that the lighting device 122 is in an "on" state and lighting devices 112a, 112b indicate that the devices are each in the "off" state, the remote control device 116 may send either an "on" command or an "off" command to all of the lighting devices 112a, 112b, 122 to synchronize the on/off state across the lighting devices 112a, 112b, 122. The remote control device 116 may send the direct command in a unicast message to each of the lighting devices. The remote control device 116 may send the direct command in a multicast message to each of the lighting devices.

The synchronization message may include an "on" command or an "off" command. For example, where lighting device 122 indicates that the lighting device 122 is in an "on" state and lighting devices 112a, 112b indicate that the devices are each in the "off" state, the remote control device 116 may send an "off" command to the lighting device 122 or an "on" command to the lighting devices 112a, 112b to synchronize the on/off state across the lighting devices 112a, 112b, 122. The remote control device 116 may send the synchronization message as a unicast message to the lighting devices to be changed. The remote control device 116 may send the synchronization message as a multicast message that identifies the state of the devices that are intended to respond to the command in the synchronization message and leaves the on/off state of the other devices unchanged.

The synchronization message may include a toggle command directed to the subset of lighting devices to be toggled. For example, where the lighting device 122 indicates that the lighting device 122 is in an "on" state and the lighting devices 112a, 112b indicate that the devices are each in the "off" state, the remote control device 116 may send a toggle command to the lighting device 122 or a toggle command to the lighting devices 112a, 112b to synchronize the on/off state across the lighting devices 112a, 112b, 122. The remote control device 116 may send the synchronization message as a unicast message to the lighting devices to be changed. The remote control device 116 may send the synchronization message as a multicast message that indicates the devices in the on/off state (e.g., "on" state or "off" state) that are to respond to the on/off command in the message.

The remote control device 116 may send a synchronization message to change the on/off state of a preferred subset of lighting devices. The remote control device 116 may send the synchronization message to change the on/off state of the subset of devices having the lesser number of devices for which the on/off state is to be changed. The remote control device 116 may default to "turning off" a subset of lighting devices. For example, the remote control device 116 may query the lighting devices 112a, 112b, 122 and when one of the lighting devices 112a, 112b, 122 returns an "on" state indicating that the device is on (e.g., such as lighting device 122), the remote control device 116 may stop querying devices and send a synchronization message (e.g., via unicast or multicast) to the group of lighting devices 112a, 112b, 122 that includes an "off" command to tell the group of lighting devices 112a, 112b, 122 to turn off. The remote control device 116 may default to "turning on" a subset of lighting devices. For example, the remote control device 116 may query the lighting devices 112a, 112b, 122 and when one of the lighting devices 112a, 112b, 122 returns an "off" state indicating that the device is off (e.g., such as lighting devices 112a, 112b), the remote control device 116 may stop querying the devices and send a synchronization message (e.g., via unicast or multicast) to the group of lighting devices 112a, 112b, 122 that includes an "on" command to tell the group of lighting devices 112a, 112b, 122 to turn on.

The remote control device 116 may send a digital message after the synchronization message to toggle the group of synchronized lighting devices 112a, 112b, 122. The remote control device 116 may receive a response to the synchronization message that indicates the state of each of the devices, or each of the devices that changed state in response to the synchronization message. The response may be a state update message. The remote control device 116 may send a digital message after the synchronization message to toggle the group of lighting devices 112a, 112b, 122. For example, after the remote control device 116 toggles the on/off state of the lighting device 122 to the "off" state, the remote control device 116 may send an "on" command or a toggle command to the group of lighting devices 112a, 112b, 122. Such a command may be sent after the synchronization message is sent, or after receiving a response to the synchronization message, to toggle the entire group of lighting devices 112a, 112b, 122.

The remote control device 116 may send a synchronization message and wait for a subsequent toggle event. After receiving the toggle event, the remote control device 116 may query the group of lighting devices 112a, 112b, 122. When the group of lighting devices 112a, 112b, 122 are in a consistent state (e.g., "on" state or "off" state), the remote control device 116 may send a toggle command, or an "on" or "off" command, to toggle the on/off state of the group of lighting devices 112a, 112b, 122.

The remote control device 116 may maintain the next state command (e.g., "on" command or "off" command) to be sent from the remote control device 116 in response to the identification of the next toggle event. For example, the remote control device 116 may pre-store an "on" command after transmission of an "off" command, and pre-store an "off" command after transmission of an "on" command. When the toggle event is identified, the remote control device 116 may send the pre-stored state command (e.g., "on" command or "off" command).

The remote control device 116 may be a battery-powered remote control device that may enter a sleep mode to conserve battery power after a predetermined period of time has elapsed without receiving digital messages and/or user events. The remote control device may awaken from a sleep mode in response to a toggle event and may send the pre-stored "on" command or "off" command to the lighting devices 112*a*, 112*b*, 122. The pre-stored command may be sent under the assumption that the on/off state of the lighting devices 112*a*, 112*b*, 122 has been unchanged by other controller devices since the storing of the pre-stored command. If the on/off state of the lighting devices 112*a*, 112*b*, 122 has gone unchanged by other controller devices since the last command from the remote control device 116, or the on/off state of the lighting devices 112*a*, 112*b*, 122 has been returned to the on/off state indicated in the last command from the remote control device 116, the pre-stored command may toggle the on/off state of the lighting devices 112*a*, 112*b*, 122 upon the remote control device 116 identifying a toggle event and awakening to send the command. If the on/off state of some of the lighting devices 112*a*, 112*b*, 122 has been changed by other controller devices since the last command from the remote control device 116, the pre-stored command may act as a synchronization message for any of the lighting devices 112*a*, 112*b*, 122 that are out of sync. The lighting devices 112*a*, 112*b*, 122 that are already in the state indicated in the pre-stored command may be unresponsive to the pre-stored command.

The lighting devices 112*a*, 112*b*, 122 that change an on/off state in response to an "on" command or an "off" command may send a state update message to the remote control device 116 to indicate the change in on/off state. The remote control device 116 may receive the state update message from the lighting devices 112*a*, 112*b*, 122 that change state in response to the received "on" command or the received "off" command. The lighting devices that fail to change the on/off state in response to the command from the remote control device 116 may be unresponsive. For example, the remote control device 116 may send an "off" command to the lighting devices 112*a*, 112*b*, 122 and the lighting device 122 may update the on/off state to the "off" state. The lighting device 122 may send a response message to the remote control device 116 to indicate the change in state. The lighting devices 112*a*, 112*b* may be unresponsive, as they are already in the "off" state.

The remote control device 116 may stay awake to wait for an on/off state update from the lighting devices 112*a*, 112*b*, 122. The remote control device 116 may poll the lighting devices 112*a*, 112*b*, 122 while awake. The lighting devices 112*a*, 112*b*, 122 may indicate a state change to an "on" state or an "off" state and send the updated state to the remote control device 116. For example, as the lighting device 122 is indicated in FIG. 1B as being in the "on" state, the remote control device 116 may transmit an "off" command to the lighting device 122, and the lighting device 122 may change to the "off" state. The lighting devices 112*a*, 112*b*, 122 may have stored thereon the identifiers (e.g., group numbers) of the controller devices that have subscribed to request state change updates for on/off states. The lighting device 122 may send a state update message to the remote control device 116, which may be subscribed to receive the indication of the updated state. When the remote control device 116 receives the state update message, the remote control device 116 may assume that the operation was successful and may go to sleep. The state update message may be send from the lighting devices 112*a*, 112*b*, 122 as unicast messages. The remote control device 116 may stay asleep until a subsequent user event at the device.

The lighting devices 112*a*, 112*b*, 122 may already be in the indicated state received in the command from the remote control device 116. For example, the lighting devices 112*a*, 112*b* may be in the "off" state, as illustrated in FIG. 1B, when the lighting devices 112*a*, 112*b* receive the "off" command. The lighting devices 112*a*, 112*b* may fail to provide a state update message when a state change fails to be performed in response to the received command. If the remote control device 116 fails to receive a state update message from each of the lighting devices 112*a*, 112*b*, 122, the remote control device 116 may send the opposite on/off command (e.g., the "on" command). For example, when the remote control device 116 fails to receive a state update message from one of the lighting devices 112*a*, 112*b* (e.g., after a predefined period of time), the remote control device 116 may send the opposite on/off command (e.g., the "on" command) in a digital message (e.g., unicast or multicast message) to toggle the group of lighting devices 112*a*, 112*b*, 122. The opposite on/off command may be sent, as a toggle event was identified and a subset of the lighting devices failed to toggle in response to the toggle event.

The pre-stored command may operate as a predicted state change. The pre-stored command may attempt to predict the appropriate on/off state change to be sent in response to a toggle event in an effort to reduce latency caused by additional messages that may be sent if none of the lighting devices 112*a*, 112*b*, 122 changed state in response to the transmitted state command. As the remote control device 116 may be a battery-powered device, the remote control device 116 may be in a sleep mode and may miss the changes in on/off state of lighting devices.

The pre-stored command may be used to identify the on/off state at the lighting devices 112*a*, 112*b*, 122. The on/off state of the lighting device 122 may be identified by the state update message indicating that the lighting device 122 changed from the "on" state to the "off" state in response to the "off" command. The on/off state of the lighting devices 112*a*, 112*b* may be identified by the lack of response to the "off" command.

The remote control device 116 may respond to the failure to receive a state update message from a subset of the lighting devices 112*a*, 112*b*, 122. For example, the remote control device 116 may send an "off" command to the lighting devices 112*a*, 112*b*, 122 (e.g., in a unicast or multicast message). As the lighting device 122 may be in the "on" state, the lighting device 122 may change to the "off" state. The lighting device 122 may send a state update message to the remote control device 116. As the lighting devices 112*a*, 112*b* may already be in the "off" state, the lighting devices 112*a*, 112*b* may fail to send a state update message. The remote control device 116 may identify the failure to receive a response from the lighting device 112*a* and/or lighting device 112*b* and may send an opposite state command (e.g., the "on" command or toggle command) to the group of lighting devices 112*a*, 112*b*, 122. The opposite state command may be sent in a multicast message, or individual unicast messages, to the lighting devices 112*a*, 112*b*, 122 to toggle the group of lighting devices 112*a*, 112*b*, 122 together. The remote control device 116 may choose to send the opposite state command (e.g., the "on" command or toggle command), as the lighting devices 112*a*, 112*b* failed to change an on/off state in response to the toggle event.

The remote control device 116 may default to sending an "off" command or an "on" command in response to a toggle event. If the remote control device 116 receives a state update message from each of the group of lighting devices 112a, 112b, 122, the remote control device 116 may determine that the lighting devices 112a, 112b, 122 have been toggled and fail to send a subsequent on/off command to toggle the lighting devices 112a, 112b, 122. If the remote control device 116 fails to receive a state update message from a subset of the group of lighting devices 112a, 112b, 122, the remote control device 116 may determine that one or more of the lighting devices 112a, 112b, 122 failed to toggle and the remote control device 116 may send the opposite state command to toggle the group of lighting devices 112a, 112b, 122. When a lighting device 112a, 112b, 122 is out of sync, the first message sent by the remote control device 116 may act as a synchronization message. The next message may act to toggle the lighting devices 112a, 112b, 122.

The load control system 100 may be configured to control the group of lighting devices 112a, 112b, 122 based on a current state of one or more of the group of lighting devices 112a, 112b, 122, or a subset thereof. The remote control device 116 may identify a toggle event or a rotation event (e.g., a predefined distance or time in a direction) for controlling an intensity level of the lighting devices 112a, 112b, 122 and query the lighting devices 112a, 112b, 122 for their current state. The current state of the lighting devices 112a, 112b, 122 may include their on/off state and/or intensity level. The toggle event or the rotation event may cause the remote control device 116 to awaken from a sleep state. In addition, the remote control device 116 may be awakened from the sleep state in response to a sensing circuit (e.g., an occupancy sensing circuit and/or a proximity sensing circuit) sensing an occupant near the remote control device 116 (e.g., a proximity sensing event). In response to the toggle event, the rotation event, or the proximity sensing event, the remote control device 116 may attempt to query the lighting devices 112a, 112b, 122 with which the remote control device 116 is associated for their current state. The query message may request the on/off state (e.g., in response to a toggle event) and/or an intensity level (e.g., in response to a rotation) of the lighting devices 112a, 112b, 122. The query message may be sent as a multicast message, or individual unicast messages, to each of the lighting devices 112a, 112b, 122. The lighting devices 112a, 112b, 122 may return the current on/off state and/or intensity level, which may be stored locally thereon.

After sending the query message to the lighting devices 112a, 112b, 122 for their current state, the remote control device 116 may wait a predefined period of time for a response. Once the remote control device 116 receives a response to the query from any of the lighting devices 112a, 112b, 122, the remote control device 116 may perform control of the group of lighting devices 112a, 112b, 122 based on the received response. For example, the remote control device 116 may receive a response to the query message from lighting device 112a (e.g., the first lighting device from which the remote control device receives a response) and send a digital message to control the group of lighting devices 112a, 112b, 122 based on the response received from the lighting device 112a. In addition, the remote control device 116 may wait for responses from all of the lighting devices 112a, 112b, 122 before sending a digital message to control the group of lighting devices 112a, 112b, 122 based on the responses received from all of the lighting devices.

The query messages may be sent to the lighting devices 112a, 112b, 122 as a multicast message or as unicast messages. After sending the query message, the remote control device 116 may wait a predefined period of time for a response message. The response message from the lighting device 112a may be the first message received in response to the query message. After receiving the first response message from the lighting device 112, the remote control device 116 may stop waiting for the remaining lighting devices 112a, 122 to respond and may perform subsequent control based on the first response message received from the lighting device 112a. Performing control based on a first response to a query message may reduce time lag that may be caused by waiting for response messages from other devices.

The query message may be sent to the lighting devices 112a, 112b, 122 in sequence. For example, the query message requesting the current state of the lighting devices 112a, 112b, 122 may be sent as a unicast message to a first lighting device 112a of the group of lighting devices 112a, 112b, 122. The remote control device 116 may wait a predefined period of time for a response message from the lighting device 112a. If the remote control device 116 fails to receive a response message within the predefined period of time, the remote control device 116 may send a query message for the current state of a subsequent lighting device in the sequence. When a response message is received from a lighting device, the remote control device 116 may stop sending query messages to lighting devices and perform subsequent control based on the response message received from the lighting device.

If a current status is unreceived from one or more of the lighting devices 112a, 112b, 122 after the expiration of the predefined period of time or the completion of the sequence of lighting devices, the remote control device 116 may send another query message or start another sequence (e.g., up to a predefined number of times prior to performing control). When the remote control device 116 fails to receive a response to a query message for the current state of a lighting device (e.g., after the predefined number of times prior to performing control), the remote control device 116 may perform control of the lighting devices 112a, 112b, 122 based on a locally stored state of one or more lighting devices 112a, 112b, 122 (e.g., on/off state or intensity level) or send a default command (e.g., default on/off command or intensity level).

The remote control device 116 may use the on/off state of a lighting device to implement toggle logic for the group of lighting devices 112a, 112b, 122. For example, when the lighting device 112a responds to a query message indicating that the lighting device 112a is in the "off" state, the remote control device 116 may send a digital message to the group of lighting devices 112a, 112b, 122 to turn the group of lighting devices 112a, 112b, 122 to the "on" state. When the responding lighting device 112a is in the "on" state, the remote control device 116 may send a digital message to the group of lighting devices 112a, 112b, 122 to turn the group of lighting devices 112a, 112b, 122 to the "off" state. When the group of lighting devices 112a, 112b, 122 are in the same state, the group of lighting devices 112a, 112b, 122 may be controlled as a group. When the on/off state of the group of lighting devices 112a, 112b, 122 is out of sync, the on/off state of the lighting devices that are already in the state indicated in the digital message may go unchanged in response to the digital message from the remote control device 116.

The remote control device 116 may use the intensity level of a lighting device as a starting point (e.g., a dynamic starting point) upon which dimming is performed for the group of lighting devices 112a, 112b, 122. For example, in response to the query from the remote control device 116, the lighting device 112a may respond that it is at a 10% intensity level. The remote control device 116 may set the intensity level identified by the lighting device 122 as the dynamic starting point upon which control of the intensity for the group of lighting devices 112a, 112b, 122 may be performed. The remote control device 116 may identify a continued rotation for increasing the intensity level by an additional 20%. The remote control device 116 may add this 20% to the dynamic starting point of 10% that was indicated as the current intensity level of the lighting device 112a that responded to the previous query message from the remote control device 116. The remote control device 116 may send a digital message to the group of lighting devices 112a, 112b, 122 to control the group of lighting devices 112a, 112b, 122 to an absolute intensity level of 30%. The digital message may include a go-to-level command that is configured to control each of the lighting devices 112a, 112b, 122 to a 30% intensity level. Each of the lighting devices 112a, 112b, 122 may receive the digital message (e.g., as a unicast message or a multicast message) and be controlled to the absolute intensity level of 30%, unless the lighting device is already at the indicated intensity level. When the group of lighting devices 112a, 112b, 122 are in the same state, the group of lighting devices 112a, 112b, 122 may be controlled as a group. For example, the group of lighting devices 112a, 112b, 122 may be controlled together from 10% to 30%. When the state of the group of lighting devices 112a, 112b, 122 is out of sync, the lighting devices 112a, 112b, 122 may be controlled differently to reach the indicated intensity level. For example, the lighting devices 112a, 112b, 122 that are above the indicated intensity level may decrease in intensity to meet the indicated intensity level. The lighting devices 112a, 112b, 122 that are below the indicated intensity level may increase in intensity to meet the indicated intensity level. The lighting devices 112a, 112b, 122 that are already in the state indicated in the digital message may go unchanged in response to the digital message from the remote control device 116.

The lighting devices 112a, 112b, 122 may fade from one intensity level to another intensity level (e.g., be dimmed between intensity levels over a fade time and/or at a fade rate) in response to receiving a command. For example, the lighting devices 112a, 112b, 122 may be dimmed at a rate or over a period of time such that each of the lighting devices 112a, 112b, 122 that is not already at the indicated intensity level reaches the intensity level at the same time. For example, the remote control device 116 may send the go-to-level command with an amount of time or fade rate over which the lighting devices 112a, 112b, 122 are to be dimmed until the lighting devices 112a, 112b, 122 reach the indicated intensity level (e.g., different fade rates or fade times may be transmitted to each of the lighting devices 112a, 112b, 122). The lighting devices 112a, 112b, 122 may be dimmed over the indicated period of time to the intensity level indicated in the go-to-level command. When one or more of the lighting devices 112a, 112b, 122 are at different intensity levels, the lighting devices 112a, 112b, 122 may be sent unicast messages with different fade rates such that the lighting devices 112a, 112b, 122 at different intensity levels reach the intensity level indicated in the go-to-level command at the same time. The fade time may vary in a predetermined amount for each level the intensity may be increased or decreased.

The hub device 180 may operate as a master device that may be configured to monitor the state of slave devices, such as lighting devices 112a, 112b, 122, and determine the appropriate command to be transmitted in response to a user interface event based on the state of the slave devices. Though the hub device 180 may be described herein as being a master device for controlling a group of lighting devices, other control devices (e.g., one of the lighting devices 112a, 112b, 122, remote control device 150, occupancy sensor 160, daylight sensor 170, network device 190, motorized window treatment 132, a remote computing device, etc.) may be assigned as a master device that operates as described herein for the hub device 180. When a lighting device 112a, 112b, 122 is assigned as the master device, the lighting device 112a, 112b, 122 may already know its own state, but may monitor the state of other slave devices. Though other devices may operate as the master device, they may still communicate via the hub device 180.

The hub device 180, or another master device, may generate an appropriate command to synchronize the lighting devices 112a, 112b, 122 when the lighting devices 112a, 112b, 122 are out of sync. The master device may be configured with default commands that synchronize the lighting devices 112a, 112b, 122. For example, in response to a toggle command, the master device may determine that one or more of the lighting devices 112a, 112b, 122 are on and transmit an off command to put the lighting devices 112a, 112b, 122 in the off state. In response to a toggle command, the master device may determine that one or more of the lighting devices 112a, 112b, 122 are off and transmit an on command to put the lighting devices 112a, 112b, 122 in the on state.

The hub device 180, or another master device, may automatically synchronize and/or toggle the on/off state of the group of lighting devices 112a, 112b, 122. The remote control device 116 may identify a toggle event and send a digital message to the hub device 180 indicating that the toggle event has been identified. The digital message may include a toggle command, an "on" command, or an "off" command. The remote control device 116 may switch between the transmission of the "on" command and the "off" command each time the remote control device 116 identifies a toggle event. The digital message may include another indication that the remote control device 116 identified the toggle event. The hub device 180 may generate the commands to be sent for controlling the lighting devices 112a, 112b, 122 in response to the messages received from the remote control device 116 and/or the other controller devices in the load control environment.

The hub device 180 may keep track of the on/off state of each of the lighting devices 112a, 112b, 122 after being implemented in the load control system 100. Upon initial implementation into the load control system, the hub device 180 may query the lighting devices 112a, 112b, 122 for their current on/off state. The query message may be sent as a multicast message, or individual unicast messages, to each of the lighting devices 112a, 112b, 122. The lighting devices 112a, 112b, 122 may return the current on/off state, which may be stored locally thereon. The hub device 180 may identify commands communicated to the lighting devices 112a, 112b, 122 and maintain the current on/off state of the lighting devices 112a, 112b, 122 in memory. The digital messages that are communicated to the lighting devices 112a, 112b, 122 for controlling the on/off state may be monitored to determine the current on/off state, without sending an initial query message. The hub device 180 may be powered and/or awake at all times (e.g., at all times than the lighting devices 112a, 112b, 122 are also powered), such that the hub device is able to monitor the states of the lighting devices by listening to the messages transmitted by the lighting devices. In addition, the hub device 180 may enter a sleep mode and periodically wake up to transmit query messages to the lighting devices 112a, 112b, 122 to determine the on/off states of the lighting devices.

The hub device 180 may also, or alternatively, send a synchronization message to the lighting devices 112a, 112b, 122 to synchronize the group and identify an initial state for each lighting device 112a, 112b, 122. The synchronization message may include an "on" command or an "off" command instructing each of the lighting devices 112a, 112b, 122 to turn on or off, respectively. The lighting devices 112a, 112b, 122 that are in the opposite state may be toggled, while the lighting devices 112a, 112b, 122 that are already in the indicated on/off state may remain in the indicated state. The lighting devices that perform a change of on/off state may send a state update message to the hub device 180.

When the hub device 180 receives an indication of a toggle event from the remote control device 116, the hub device 180 may choose the command to send, or whether to send a command, to the lighting devices 112a, 112b, 122. The decision at the hub device 180 may be based on the current on/off state of the lighting devices 112a, 112b, 122. The hub device 180 may identify whether the on/off state across the group of lighting devices 112a, 112b, 122 is consistent. If the on/off state across the group of lighting devices 112a, 112b, 122 is consistent, the hub device 180 may send the toggle command, or an "on" command or "off" command, to the lighting devices 112a, 112b, 122 to toggle the on/off state of the group of lighting devices 112a, 112b, 122.

The hub device 180 may identify when the on/off state of the group of lighting devices 112a, 112b, 122 is inconsistent. For example, the hub device 180 may identify a digital message from the remote control device 150 or the network device 190 that causes the lighting device 122 to change in on/off state independent of the other lighting devices 112a, 112b. If the on/off state across the group of lighting devices 112a, 112b, 122 is inconsistent, the hub device 180 may send a synchronization message to a subset of the lighting devices 112a, 112b, 122 to change the on/off state of the subset in response to an identification of a toggle event. For example, when the hub device 180 identifies the lighting device 122 is in an "on" state and that lighting devices 112a, 112b are each in the "off" state, the hub device 180 may send an "off" command to the lighting device 122 or an "on" command to the lighting devices 112a, 112b to synchronize the on/off state across the lighting devices 112a, 112b, 122. The hub device 180 may send the synchronization message as a unicast message to the lighting devices to be changed. The hub device 180 may send the synchronization message as a multicast message that includes an identified state of the devices to be changed (e.g., lighting devices in an "on" state or an "off" state). The synchronization message may change the on/off state of the devices currently in an identified state and leave the on/off state of the other devices unchanged. The hub device 180 may send the toggle command in the synchronization message (e.g., as a unicast message) to the lighting devices to be changed.

The hub device 180 may send a synchronization message to change the on/off state of a preferred subset of lighting devices. The hub device 180 may send the synchronization message to change the on/off state of the subset of devices having the lesser number of devices for which the on/off state is to be changed, as such a change may be less noticeable and may cause less messages to be sent in some instances. The hub device 180 may default to "turning off" a subset of lighting devices. For example, when the lighting devices 112a, 112b, 122 are out of sync, the hub device 180 may send a synchronization message (e.g., via unicast or multicast) to the group of lighting devices 112a, 112b, 122 that includes an "off" command to tell the group of lighting devices 112a, 112b, 122 to turn off. The hub device 180 may default to "turning on" a subset of lighting devices. For example, the hub device 180 may send a synchronization message (e.g., via unicast or multicast) to the group of lighting devices 112a, 112b, 122 that includes an "on" command to tell the group of lighting devices 112a, 112b, 122 to turn on.

The hub device 180 may send a digital message after the synchronization message to control the group of synchronized lighting devices 112a, 112b, 122. The hub device 180 may receive a response to the synchronization message that indicates the state of each of the devices, or each of the devices that changed state in response to the synchronization message. The hub device 180 may send a digital message after the synchronization message to toggle the group of lighting devices 112a, 112b, 122. For example, after the hub device 180 toggles the on/off state of the lighting device 122 to the "off" state, the hub device 180 may send an "on" command or a toggle command to the group of lighting devices 112a, 112b, 122. Such a command may be sent after the synchronization message is sent, or after receiving a state update message in response to the synchronization message.

The hub device 180 may send a synchronization message and wait for an indication of a subsequent toggle event from the remote control device 116. After receiving the indication of the toggle event, the hub device 180 may determine whether the group of lighting devices 112a, 112b, 122 are in a consistent state. When the group of lighting devices 112a, 112b, 122 are in a consistent state (e.g., "on" or "off" state), the hub device 180 may send a toggle command, or an "on" or "off" command, to toggle the state of the group of lighting devices 112a, 112b, 122.

The lighting devices 112a, 112b, 122 that change an on/off state in response to an "on" command or an "off" command may send a state update message to the hub device 180 to indicate the change in on/off state. The hub device 180 may receive the state update message from the lighting devices 112a, 112b, 122 that change state in response to the received "on" command or the received "off" command. The lighting devices that fail to change the on/off state in response to the command from the hub device 180 may be unresponsive. For example, the hub device 180 may send an "off" command to the lighting devices 112a, 112b, 122 and the lighting device 122 may update the on/off state to the "off" state. The lighting device 122 may send a response message to the hub device 180 to indicate the change in state. The hub device 180 may store the updated state and/or confirm the state of the unresponsive devices. The hub device 180 may, alternatively, store the updated state of the lighting device 122 after sending the command. As the hub device 180 may be maintaining the on/off state of the lighting devices 112a, 112b, 122, the remote control device 116 may go to sleep after transmitting a message in response to the toggle event.

The remote control device 116 may receive an indication when the hub device 180 and/or other control devices are implemented in the load control system 100. The remote control device 116 may be associated with other controller devices (e.g., remote control device 150, occupancy sensor 160, daylight sensor 170, network device 190, etc.), or may be otherwise notified when the controller devices are associated with another device (e.g., a lighting device 112a, 112b, 122 or the hub device 180) in the load control system 100. The remote control device 116 may be associated with the hub device 180, or may be otherwise notified (e.g., via a message from the hub device 180, a notification of association from a lighting device 112a, 112b, 122 that associated with the hub device 180, etc.) when the hub device 180 is implemented into the system 100.

The remote control device 116 may provide feedback via the status indicator 117 in different feedback modes based information regarding the control devices to which the remote control device is associated. The decision on type of feedback provided by the status indicator 119 may be made at the time of association of the remote control device 116 and stored at the remote control device 116. The decision on the type of feedback provided by the status indicator 119 may be made dynamically. For example, the type of feedback displayed via the status indicator 119 may change depending on the information determined in response to a query message sent to the lighting devices 112a, 112b, 122, other load control devices, and/or the hub device 180. The query message may be sent in response to an actuation on the remote control device 116. The remote control device 116 may wake up in response to an actuation and ping associated lighting devices 112a, 112b, 122, other load control devices, or a hub device 180 to determine a status of the electrical loads controlled by the associated load control devices.

The decision on the type of feedback provided by the status indicator 119 may be made at the remote control device 116 or at another device. For example, the decision on the type of feedback provided by the status indicator 119 may be made at a master device, such as the hub device 180 or one of the lighting devices 112a, 112b, 122. The master device may query the load control devices for a given status, or maintain the status of the electrical loads locally based on feedback messages or messages being communicated for control of the electrical loads. When the remote control device 116 is being associated or awakens from a sleep state, a request may be sent to the master device for the type of feedback to be provided by the status indicator 119. The type of feedback may be selected by a user or by the master device based on predefined rules and sent to the remote control device 116. The remote control device 116 may then provide the type of feedback on the status indicator 119 that is received in the response.

As indicated above, the type of visual feedback may be user configurable. The network device 190 may configure the operation of the remote control device 116 (e.g., configure the feedback type used by the remote control device) without directly communicating with the remote control device 116. For example, the network device 190 may display different feedback types to a user. The network device 190 may receive a selection of a feedback type from the user and communicate the selected feedback type via RF signals 108 to a master device, such as the hub device 180 or another master device (e.g., one of the lighting devices 112a, 112b, 122). The user may select between simple feedback or advanced feedback for a given scenario (e.g., a number of associated devices, when the electrical loads are in sync our out of sync, when the remote control device 116 is associated with a master device or not associated with a master device, etc.), as described herein. The user may also select between different types of simple feedback or different types of advanced feedback for a given scenario (e.g., as will be described in greater detail below).

The user may choose between different intensity levels or colors to be provided via the status indicator 119 for different feedback types. The intensity levels or colors may correspond to different load control devices for which the feedback is being provided. For example, a different intensity level may be provided for the light source of the status indicator 119 when the feedback corresponds to light levels, volume levels, and/or fan speeds. A different color may be provided for the light source of the status indicator 119 when the feedback corresponds to light levels, volume levels, and/or fan speeds.

The master device may store the user-selected feedback type for being provided for the scenario in which the feedback type was selected (e.g., a number of associated devices, when the electrical loads are in sync our out of sync, when the remote control device 116 is associated with a master device or not associated with a master device, etc.). The remote control device 116 may retrieve the feedback type from the master device when the remote control device 116 next queries the master device. The remote control device 116 may store the feedback type in memory for future use when the corresponding scenario exists. The remote control device 116 may query for the feedback type each time the feedback is to be provided on the status indicator 119.

Since the network device 190 is configured to store the selected feedback type on the master device for later retrieval by the remote control device 116 (e.g., in response to an actuation of the actuation portion 117 and/or the rotation portion 118), the remote control device 116 does not need to provide a way for communicating directly with the network device 190. For example, the remote control device 116 does not need to wake up periodically to determine if the network device 190 is attempting to communicate with the remote control device, which could lead to increased battery consumption and reduced life of the battery of the remote control device. This method of configuring the operation of the remote control device 116 could be used to configure other operating parameters of the remote control device 116.

The remote control device 116 may operate to provide different types of feedback (e.g., advanced feedback or simple feedback) based on information about the associated devices. For example, the remote control device 116 may provide different feedback on the status indicator 119 when associated with a master device, such as the hub device 180 or other master device, than when not associated with the master device. The remote control device 116 may provide advanced feedback on the status indicator 119 when associated with the hub device 180 that is capable of providing the status of load control devices to the remote control device 116. The remote control device 116 may provide simple feedback on the status indicator 119 when not associated with the hub device 180.

The remote control device 116 may provide feedback via the status indicator 119 in different feedback modes based on whether the remote control device 116 is associated with the hub device 180 or another master device, such as one of the lighting devices 112a, 112b, 122, for example. The remote control device 116 may provide advanced feedback when associated with a master device and provide simple feedback when not associated with a master device. When the remote control device 116 is associated with a master lighting device, the remote control device 116 may provide advanced feedback on the status indicator 119 and display the state of the master lighting device as feedback on the status indicator 119. As the master device may synchronize the state of the lighting devices 112a, 112b, 122, the remote control device 116 may provide advanced feedback that indicates an intensity level of the synchronized group of lighting devices 112*a*, 112*b,* 122. In addition, the master device may collect and store the intensity levels of the group of lighting devices 112*a*, 112*b*, 122, and may decide the level to display for advanced feedback if the lighting devices are out of sync. When the remote control device 116 is not associated with a master device, the remote control device 116 may provide simple feedback that illuminates the entire status indicator 119 to different levels when raising or lowering intensity of lighting devices 112*a*, 112*b,* 122, or when the lighting devices 112*a*, 112*b*, 122 are on or off.

When the remote control device 116 is operating in the load control system 100 without other controller devices or the hub device 180, the remote control device 116 may trust that an internally stored on/off state matches that of the lighting devices 112*a*, 112*b*, 122. The remote control device 116 may send a toggle command or an on/off command in the next message transmitted in response to a toggle event to toggle the group of lighting devices 112*a*, 112*b*, 122.

Though the remote control device 116 may be operating in the load control system 100 with other controller devices, the other controller devices may not be associated with the group of lighting devices 112*a*, 112*b*, 122 that are associated with the remote control device 116. As the other controller devices may not be associated with the group of lighting devices 112*a*, 112*b*, 122, the other controller devices may be unable to toggle the on/off state of the lighting devices 112*a*, 112*b*, 122. The remote control device 116 may determine whether other controller devices are associated with the lighting devices 112*a*, 112*b*, 122 by querying the lighting devices 112*a*, 112*b*, 122 for associated devices. Each lighting device 112*a*, 112*b*, 122 may respond with the unique identifiers of devices associated with the device. The unique identifiers may indicate devices or device types (e.g., remote control devices, occupancy sensors, daylight sensors, network devices, hub devices, etc.) associated with the lighting devices 112*a*, 112*b*, 122.

Each controller device may be associated with a lighting device 112*a*, 112*b*, 122 by sending a unique group identifier to the lighting device 112*a*, 112*b*, 122 while the lighting device 112*a*, 112*b*, 122 is in an association mode. The group of associated devices may have stored thereon the unique group identifier of the controller device. Other controller devices may query the lighting devices 112*a*, 112*b*, 122 to determine whether they are in the group of devices that may be controlled by messages (e.g., unicast or multicast messages) sent to the group. For example, remote control device 116 may query the lighting devices 112*a*, 112*b*, 122 for the group identifiers of other controller devices. The lighting device 122 may respond with the group identifier for the remote control device 150 and/or the network device 190, which may be previously associated with the lighting device 122. As the lighting devices 112*a*, 112*b* may be unassociated with other controller devices, or other controller devices of a specific device type (e.g., devices capable of toggling on/off state), the remote control device 116 may keep track of the on/off state of the lighting devices 112*a*, 112*b* and toggle the lighting devices 112*a*, 112*b* by sending a toggle command or opposing on/off commands in the next message transmitted in response to a toggle event. The remote control device 116 may operate as otherwise described herein with regard to the lighting device 122, as the on/off state of the lighting device 122 may be out of sync with the lighting devices 112*a*, 112*b* due to the independent control of other controller devices.

The remote control device 116 may poll the associated lighting devices 112*a*, 112*b,* 122 for other associated controller devices after the expiration of a predetermined time interval. For example, the remote control device 116 may poll an associated lighting device 112*a*, 112*b*, 122 periodically for a predefined number of polling requests after associating with the lighting device 112*a*, 112*b*, 122. The polling requests may be overridden by an actuation on the remote control device. The remote control device 116 may identify the override of the polling requests and assume that the internal on/off state of the associated lighting devices 112*a*, 112*b*, 122 is correct.

Though the remote control device 116 and/or the hub device 180 may be described for synchronizing and/or toggling the lighting devices 112*a*, 112*b*, 122, other controller devices in the load control system 100 may be similarly implemented for synchronizing and/or toggling the lighting devices 112*a*, 112*b*, 122. For example, the toggle event may be identified by the occupancy sensor 160 detecting an occupancy or vacancy condition in the load control environment 100. The occupancy sensor 160 may transmit commands for synchronizing and/or toggling the lighting devices 112*a*, 112*b*, 122 in response to the toggle event, as described herein. The toggle event may be identified by the daylight sensor 170 detecting a daylight level above a predefined threshold in the load control environment 100. The daylight sensor 170 may transmit commands for synchronizing and/or toggling the lighting devices 112*a*, 112*b*, 122 in response to the toggle event, as described herein.

Figure 2A:
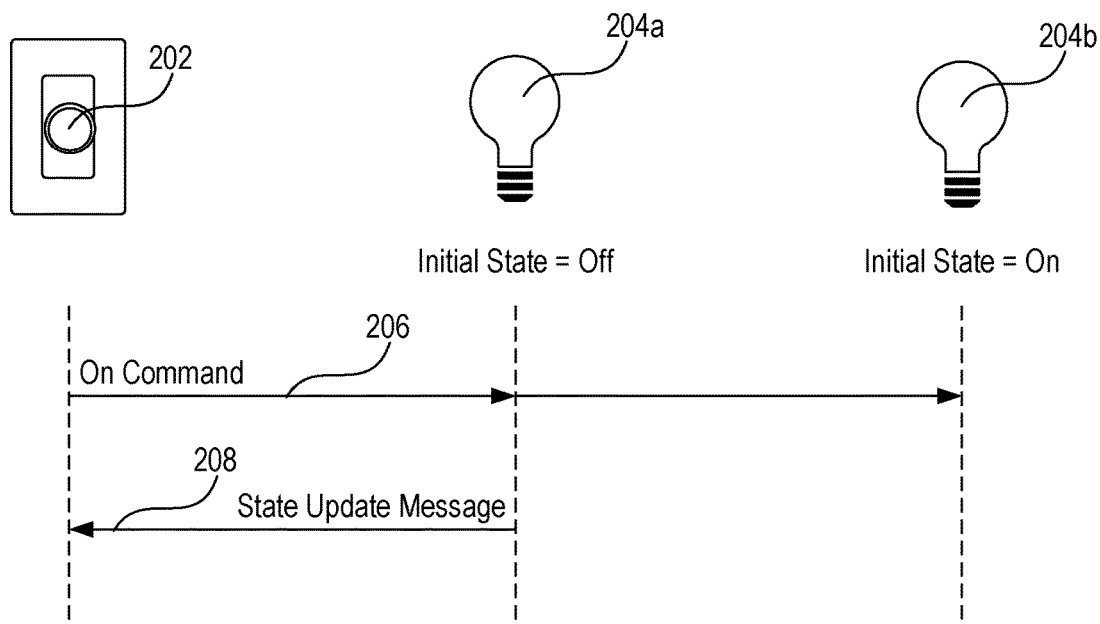
FIGS. 2A and 2B are system flow diagrams depicting example message flows for communicating digital messages between a remote control device and lighting devices in a load control system.
Figure 2B:
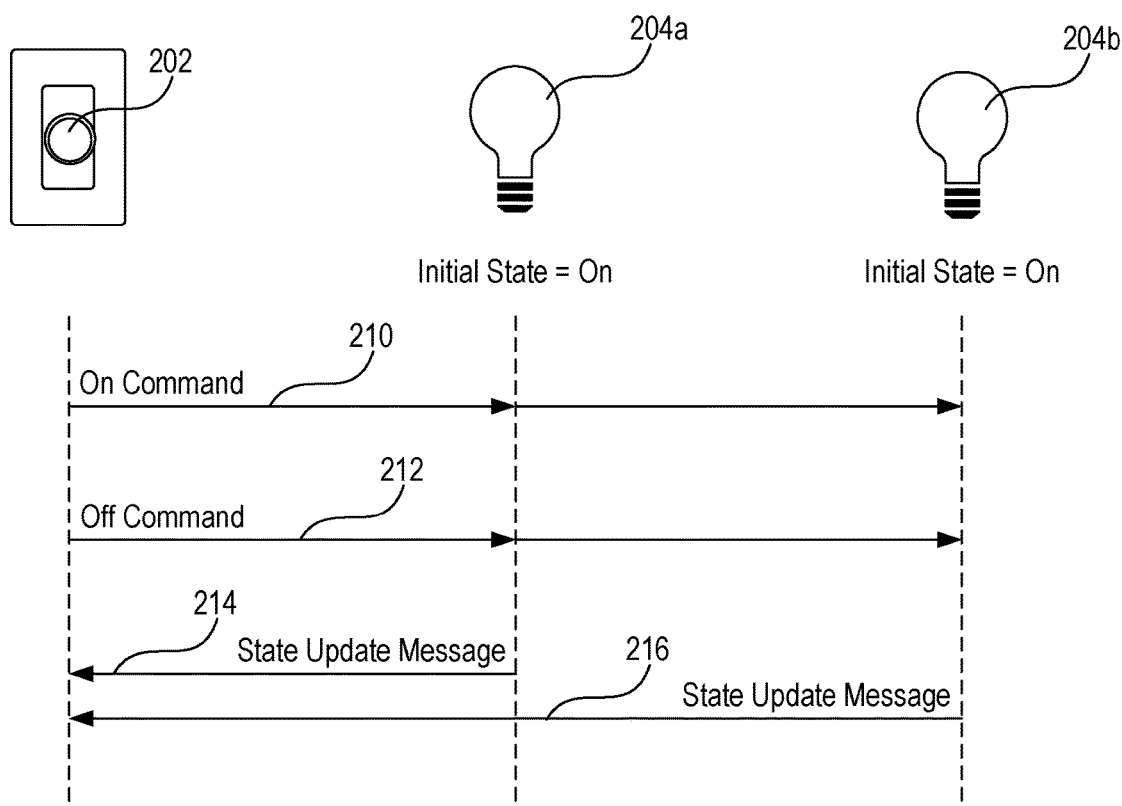

FIGS. 2A and 2B are system flow diagrams depicting example message flows for communicating digital messages between a remote control device 202 and lighting devices 204*a*, 204*b* in a load control system. As shown in FIG. 2A, the remote control device 202 may transmit digital messages to toggle the on/off state of the lighting devices 204*a*, 204*b*. The digital messages may be used to synchronize the lighting devices 204*a*, 204*b*, or control the lighting devices 204*a*, 204*b* when they are in sync.

The remote control device 202 may store of the state of the lighting devices 204*a*, 204*b*. The remote control device 202 may maintain the state of the lighting devices 204*a*, 204*b* while the remote control device 202 is awake. When the state of the lighting devices 204*a*, 204*b* are out of sync, the remote control device 202 may send a digital message (e.g., including a toggle command, an intensity level, color, etc.) to synchronize the state of the lighting devices 204*a*, 204*b*. After determining the lighting devices 204*a*, 204*b* are in sync, the remote control device 202 may change the internally stored state of the lighting devices 204*a*, 204*b* to reflect any change of state. For example, the remote control device may flip the internal state of the lighting devices 204*a*, 204*b* in response to transmission of a toggle command, and/or receipt of a status message. The remote control device 202 may send a default command after awakening from a sleep mode and, after determining and storing the current state of the lighting devices 204*a*, 204*b* thereon, flip the current state of each of the lighting devices 204*a*, 204*b* stored thereon after transmission of each subsequent toggle command while the remote control device 202 remains awake.

Prior to the remote control device 202 transmitting an initial message (e.g., after awakening from a sleep state), an initial state of the lighting devices 204*a*, 204*b* may be out of sync. For example, the lighting device 204*a* may be in an off state and the lighting device 204*b* may be in an on state. The remote control device 202 may identify a user interface event (e.g., actuation, rotation, finger swipe, etc.) as a toggle event and transmit a default toggle command, such as an on command 206, as an initial message (e.g., after awakening from a sleep state). The on command 206 may be a default command transmitted from the remote control device 202 or may be determined from the internally stored state of the lighting devices 204a, 204b. The on command 206 may be sent as a multicast message or individual unicast messages that are received by the lighting devices 204a, 204b. Though a toggle event and a toggle command are provided as examples, other user interface events and/or commands may be implemented. For example, a user interface event may be identified for increasing/decreasing an intensity level and a go-to-level command may be transmitted for increasing/ decreasing the intensity level. Additionally, though FIG. 2A illustrates an on command 206 being transmitted as the initial message for synchronization of the lighting devices 204a, 204b, the remote control device 202 may initially transmit an off command or another command.

The lighting devices that change in state after receiving the on command 206 may send a state update message to the remote control device 202. For example, as the lighting device 204a is in the off state, the lighting device 204a may turn to the on state in response to receiving the on command 206 and send a state update message 208 to the remote control device 202. The state update message may indicate the updated state of the lighting device 204a, or the updated state may be inferred from receipt of the state update message 208. As the remote control device 202 does not receive a state update message from the lighting device 204b, the remote control device 202 may assume that the lighting device 204b is already in the on state.

The remote control device 202 may operate as though the on command 206 is a synchronization message that synchronizes the lighting devices 204a, 204b. After transmitting the on command 206 and receiving the state update message 208, the remote control device 202 may identify user interface events (e.g., actuations, rotations, finger swipes, etc.) and transmit digital messages to control the lighting devices 204a, 204b in response to those user interface events. The remote control device 202 may continue to update the internally stored state of the lighting devices 204a, 204b as the state of the devices changes.

As shown in FIG. 2B, the remote control device 202 may transmit one or more digital messages that include default commands to lighting device 204a, 204b. For example, the remote control device 202 may transmit a default toggle command, such as an on command 210, to the lighting devices 204a, 204b as an initial command after a user interface event (e.g., after awakening from a sleep state in response to an actuation, rotation, finger swipe, etc.). As the lighting devices 204a, 204b may already be in the on state, the lighting devices 204a, 204b may be unresponsive to the on command 210. When the remote control device 202 fails to receive a state update message in response to the on command 210 after a predetermined period of time, or fails to receive a state update message from each associated lighting device 204a, 204b after a predetermined period of time, the remote control device 202 may transmit the opposite command or another command. For example, the remote control device 202 may transmit the off command 212 after the remote control device 202 fails to receive a state update message in response to the on command 210. The on command 210 and/or the off command 212 may be sent as a multicast message or individual unicast messages that are received by the lighting devices 204a, 204b.

The lighting devices that change in state after receiving the on command 210 or the off command 212 may send a state update message to the remote control device 202. As the lighting devices 204a, 204b are in an on state, the lighting devices 204a, 204b may change to an off state and respond to the off command 212 and transmit respective state update messages 214, 216. The state update message may indicate the updated state of the lighting devices 204a, 204b or the updated state may be inferred from receipt of the state update messages 214, 216.

After receiving the state update messages 214, 216, the remote control device 202 may identify user interface events (e.g., actuations, rotations, finger swipes, etc.) and transmit digital messages to control the lighting devices 204a, 204b in response to those user interface events. Though FIG. 2B illustrates an on command 210 being transmitted as the initial message from the remote control device 202, the remote control device 202 may initially transmit an off command or another command.

Figure 3A:
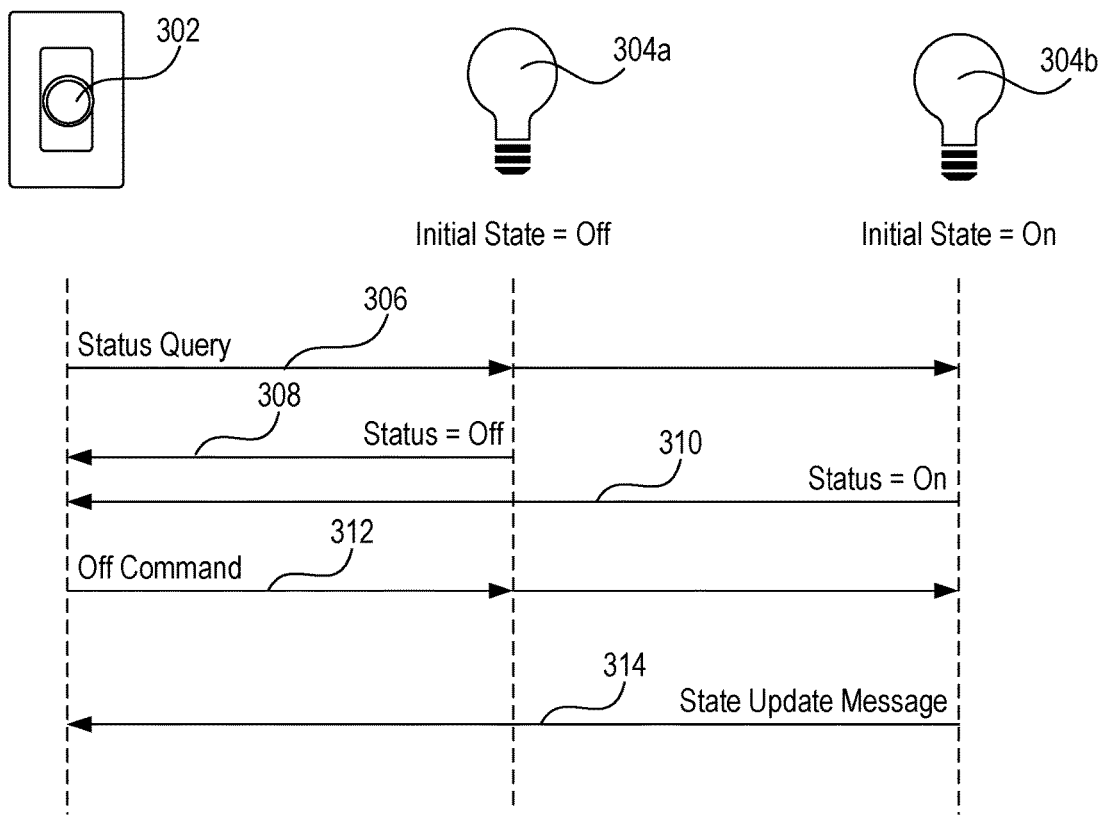
FIGS. 3A-3D are system flow diagrams depicting example message flows for querying for a current status of lighting devices and generating lighting control commands in response to the identified status.
Figure 3B:
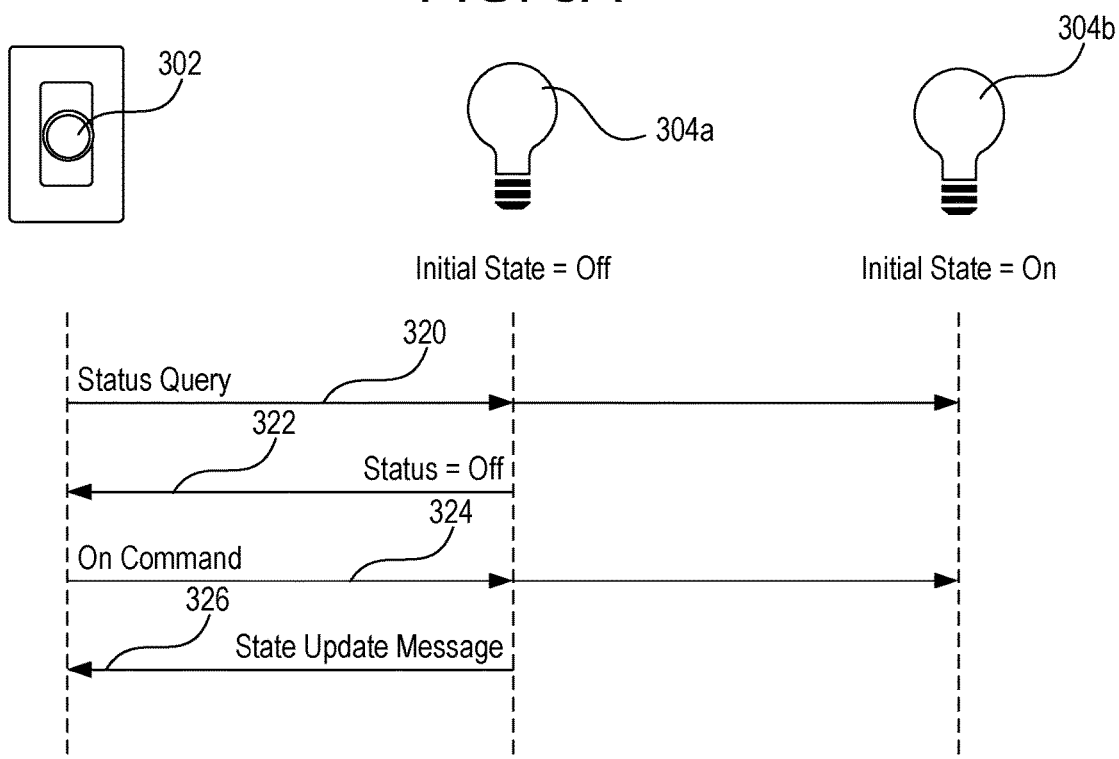
Figure 3C:
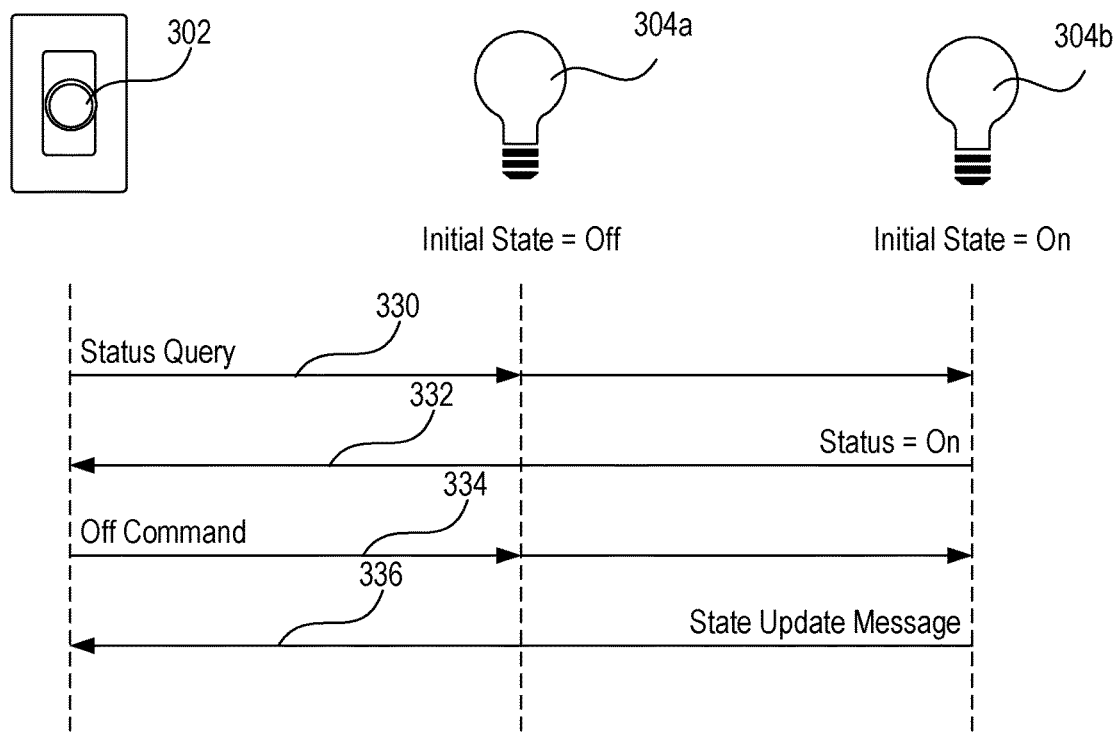

FIGS. 3A-3D are system flow diagrams depicting example message flows for generating lighting control commands in response to an actuation of an actuator (e.g., the actuation portion 117 and/or the rotation portion 118 of the remote control device 116) and/or a sensing circuit sensing an occupant near the remote control device 116 (e.g., a proximity sensing event). FIGS. 3A-3C depict example message flows for querying for a current status of lighting devices in response to an actuation of a toggle actuator (e.g., the actuation portion 117) and generating lighting control commands in response to the identified status. As shown in FIG. 3A, a remote control device 302 may transmit a status query message 306 for identifying the status of lighting devices, such as lighting devices 304a, 304b. The status query message 306 may be transmitted as an initial message (e.g., after awakening from a sleep state) after identifying a user interface event (e.g., actuation, rotation, finger swipe, etc.) and/or a proximity sensing event (e.g., a sensing circuit sensing an occupant near the remote control device 116). The status query message 306 may be sent as a multicast message or individual unicast messages that are received by the lighting devices 304a, 304b.

The remote control device 302 may receive a response to the status query message 306 from each of the lighting devices 304a, 304b that receive the status query message 306 and/or with which the remote control device 302 is associated. For example, the lighting device 304a may transmit a status message 308 in response to the status query message 306 that indicates that the lighting device 304a is in the off state. The lighting device 304b may transmit a status message 310 in response to the status query message 306 that indicates that the lighting device 304b is in the on state. The status messages may also, or alternatively, indicate an intensity, color, or other status of the lighting device from which the status message is transmitted.

If the remote control device 302 determines that any of the lighting devices 304a, 304b are in the on state, the remote control device 302 may be configured to transmit a default toggle command, such as the off command 312. The off command 312 may be sent as a multicast message or individual unicast messages that are received by the lighting devices 304a, 304b. Though an off command 312 may be transmitted as the default toggle command as shown in FIG. 3A, the remote control device 302 may transmit an on command or another default command in response to identifying a status of one or more of the lighting devices 304a, 304b.

The remote control device 302 may determine that the state of the lighting devices 304a, 304b is out of sync and may transmit a synchronization message to synchronize the state of the lighting devices 304a, 304b. For example, the remote control device 302 may send the off command 312 to synchronize the state of the lighting devices 304a, 304b.

The synchronization message may include a command to control the lighting device 304b to the state of the lighting device 304a, or vice versa. Though an off command 312 may be transmitted as the synchronization message, the remote control device 302 may transmit an on command or another command to perform synchronization.

The lighting device 304b may turn to the off state in response to receiving the off command 312 and send a state update message 314 to the remote control device 302. The state update message 316 may indicate the updated state of the lighting device 304b, or the updated state may be inferred from receipt the state update message 314 itself. As the lighting device 304a may already be in the off state, the lighting device 304a may be unresponsive to the off command 312. This may limit unnecessary network communications in the system. The remote control device 302 may continue to identify user interface events and/or proximity sensing events, and control the lighting devices 304a, 304b in response to the user interface events and/or proximity sensing events.

The remote control device 302 may determine the control instructions for being sent to the lighting devices 304a, 304b based on the status of one of the lighting devices 304a, 304b. For example, the remote control device 302 may determine the control instructions for being sent to the lighting devices 304a, 304b based on the status of a master lighting device or a lighting device that is first to respond to the status query message 306. The remote control device 302 may control the state of both of the lighting devices, 304a, 304b to respond to the status query message by sending a command to toggle the lighting devices, or may toggle the other lighting devices in order to synchronize the other devices with the state of the master lighting device or the first lighting device to respond.

The remote control device 302 may respond to the status of the first lighting device 304a, 304b to respond to a status query message. As shown in FIG. 3B a status query message 320 may be sent as a unicast message to each lighting device 304a, 304b, or as a multicast message. The lighting device 304a may be the first device to receive the status query message 320 and/or from which a status message 322 is received in response. The status message 322 may indicate the status of the lighting device 304a, which may cause the remote control device 302 to send the opposite command (e.g., the on command 324). The on command 324 may be sent as a unicast or multicast message. As the lighting device 304a is updated, the status update message 326 may be received at the remote control device 302.

As shown in FIG. 3C a status query message 330 may be sent as a unicast message to each lighting device 304a, 304b, or as a multicast message. The lighting device 304b may be the first device to receive the status query message 330 and/or from which a status message 332 is received in response. The status message 332 may indicate the status of the lighting device 304b, which may cause the remote control device 302 to send the opposite command (e.g., the off command 334). The off command 334 may be sent as a unicast or multicast message. As the lighting device 304b is updated, the status update message 336 may be received at the remote control device 302. The examples shown in FIGS. 3B and 3C may be implemented to synchronize the lighting devices 304a, 304b more quickly, as the remote control device 302 may respond to the status of the first device from which a response is received.

Though not shown in FIG. 3B, the remote control device 302 may scan for lighting devices 304a, 304b in a preferred state (e.g., on/off state, lighting intensity, color, etc.). The remote control device 302 may send the status query message as a unicast message to each of the lighting devices 304a, 304b or as a multicast message to both lighting devices 304a, 304b. The remote control device 302 may continue to send a status query message to each of the lighting devices 304a, 304b until one of the lighting devices returns a non-preferred state. For example, remote control device 302 may send the status query message 306 to the lighting device 304a and receive the status message 308 prior to sending a status query message to the lighting device 304. The remote control device 302 may stop scanning for lighting devices when the remote control device 302 receives a status message from a lighting device that identifies the lighting device as being in a non-preferred state (e.g., state other than the preferred on/off state, lighting intensity, color, etc.), or when the remote control device 302 has scanned each lighting device.

The remote control device 302 may transmit a status query message that requests a response from lighting devices in a particular state. For example, as shown in FIG. 3B, the remote control device 302 may transmit a status query message 320 that requests a response from lighting devices in the off state. The status query message 320 may be transmitted as an initial message (e.g., after awakening from a sleep state) after identifying a user interface event (e.g., actuation, rotation, finger swipe, etc.) and/or a proximity sensing event (e.g., a sensing circuit sensing an occupant near the remote control device 116). The status query message 320 may be a multicast message or individual unicast messages by the lighting devices 304a, 304b with which the remote control device 302 may be associated.

As the lighting device 304a is in the off state, the lighting device 304a may respond with a status message 322 that indicates that the lighting device 304a is in the off state. The status message 322 may identify that the lighting device 304a is in the off state, or the transmission of the status message 322 itself may indicate that the lighting device 304a is in the off state. As the lighting device 304b is in the on state, the lighting device 304b may be unresponsive to the status query message 320.

The remote control device 302 may receive a response to the status query message 320 from the lighting device 304a and determine that at least one lighting device is in the off state. If the remote control device 302 determines that any of the lighting devices 304a, 304b are in the off state, the remote control device 302 may be configured to transmit a default toggle message, such as the on command 324. The on command 324 may be sent as a multicast message or individual unicast messages that are received by the lighting devices 304a, 304b.

The remote control device 302 may receive a response to the status query message 320 from the lighting device 304a and identify that a response has not been received from the lighting device 304b. The remote control device 302 may assume, based on the response from the lighting device 304a and the lack of a response from the lighting device 304b, that the lighting devices 304a, 304b are out of sync. The remote control device 302 may determine control instructions for being sent to the lighting devices 304a, 304b based on the responses and/or lack of responses from the lighting devices 304a, 304b. For example, the remote control device 302 may transmit the on command 324 to change the state of the lighting device 304a. The lighting device 304a may turn on and transmit a state update message 326 to the remote control device 302.

The remote control device 302 may transmit a status query message 320, 330 that requests a response from lighting devices in another state, such as the on state, for example. The status query message 320, 330 may be transmitted as an initial message (e.g., after awakening from a sleep state) after identifying a user interface event (e.g., actuation, rotation, finger swipe, etc.) and/or a proximity sensing event (e.g., a sensing circuit sensing an occupant near the remote control device 116). The status query message 320, 330 may be a multicast message or individual unicast messages received by the lighting devices 304a, 304b with which the remote control device 302 may be associated.

As shown in FIG. 3C, as the lighting device 304b is in the on state, the lighting device 304b may respond with a status message 332 that indicates that the lighting device 304b is in the on state. The status message 332 may identify that the lighting device 304b is in the on state, or the transmission of the status message 332 itself may indicate that the lighting device 304b is in the on state. As the lighting device 304a is in the off state, the lighting device 304a may be unresponsive to the status query message 330.

The remote control device 302 may receive a response to the status query message 330 from the lighting device 304b and determine that at least one lighting device is in the on state. If the remote control device 302 determines that any of the lighting devices 304a, 304b are in the on state, the remote control device 302 may be configured to transmit a default toggle message, such as the off command 334. The off command 334 may be sent as a multicast message or individual unicast messages that are received by the lighting devices 304a, 304b.

The remote control device 302 may receive a response to the status query message 330 from the lighting device 304b and identify that a response has not been received from the lighting device 304a. The remote control device 302 may assume, based on the response from the lighting device 304b and the lack of a response from the lighting device 304a, that the lighting devices 304a, 304b are out of sync. The remote control device 302 may determine control instructions for being sent to the lighting devices 304a, 304b based on the responses and/or lack of responses from the lighting devices 304a, 304b. For example, the remote control device 302 may transmit an off command 336 to change the state of the lighting device 304b. The lighting device 304b may turn on and transmit a state update message 336 to the remote control device 302.

The control instructions in the off command 322 and the on command 332 may be default commands that are sent when lighting devices are out of sync, or the control instructions may be determined dynamically based on the response or lack of response to the status query messages 320, 330. Though an off command 322 and an on command 332 are provided as examples, other control instructions may be provided for synchronization, such as an intensity level, a color, etc.

Figure 3D:
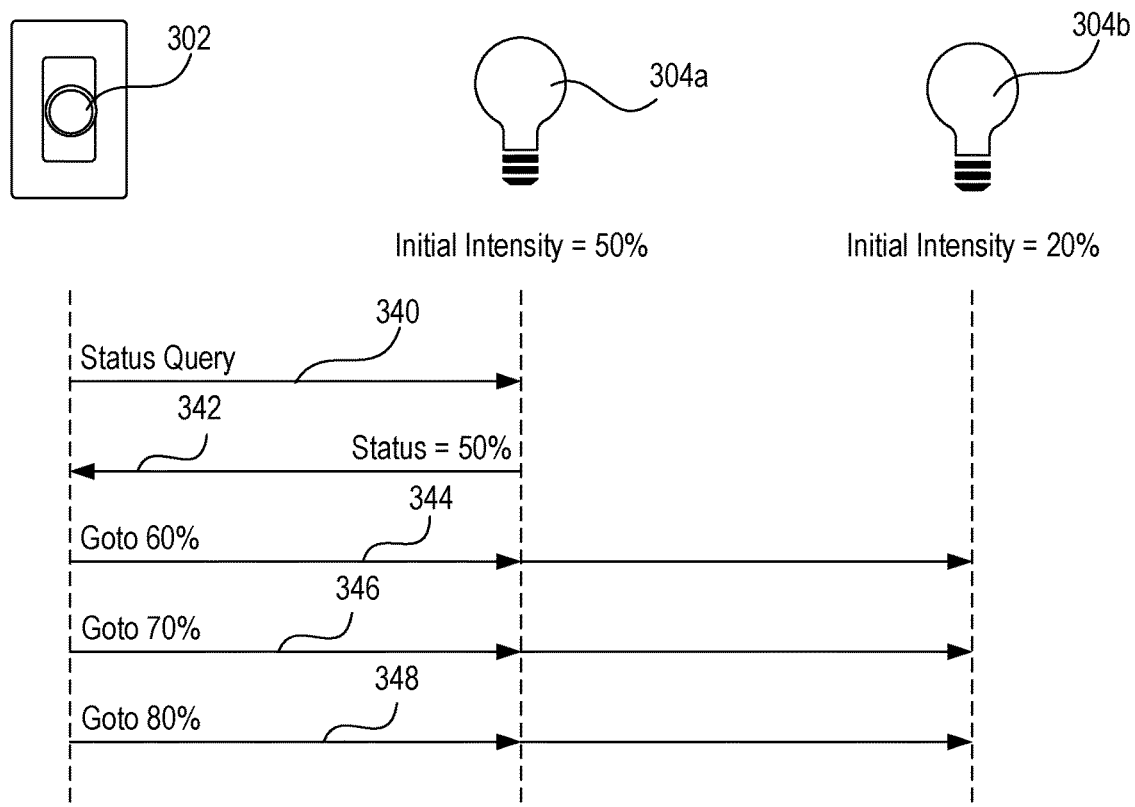

FIG. 3D depicts an example message flow for querying for a current status (e.g., intensity levels) of lighting devices in response to an actuation of an intensity adjustment actuator (e.g., the rotation portion 118) and generating lighting control commands in response to the identified status. As shown in FIG. 3D, a remote control device 302 may transmit a status query message 340 for identifying the intensity level of lighting devices, such as lighting devices 304a, 304b. The status query message 340 may be transmitted as an initial message (e.g., after awakening from a sleep state) after identifying a user interface event (e.g., actuation, rotation, finger swipe, etc.) and/or a proximity sensing event (e.g., a sensing circuit sensing an occupant near the remote control device 116). The status query message 340 may be sent as a multicast message or individual unicast messages that are received by the lighting devices 304a, 304b.

The remote control device 302 may determine the control instructions for being sent to the lighting devices 304a, 304b based on the status of one of the lighting devices 304a, 304b. For example, the remote control device 302 may determine the control instructions for being sent to the lighting devices 304a, 304b based on the status of a first lighting device to respond to the status query message 306 (e.g., lighting device 304a as shown in FIG. 3D). The remote control device 302 may control the intensity levels of both of the lighting devices 304a, 304b by sending a command to go to the state of the master lighting device or the first lighting device to respond, or may toggle the other lighting devices in order to synchronize the other devices with the state of the master lighting device or the first lighting device to respond.

Figure 4A:
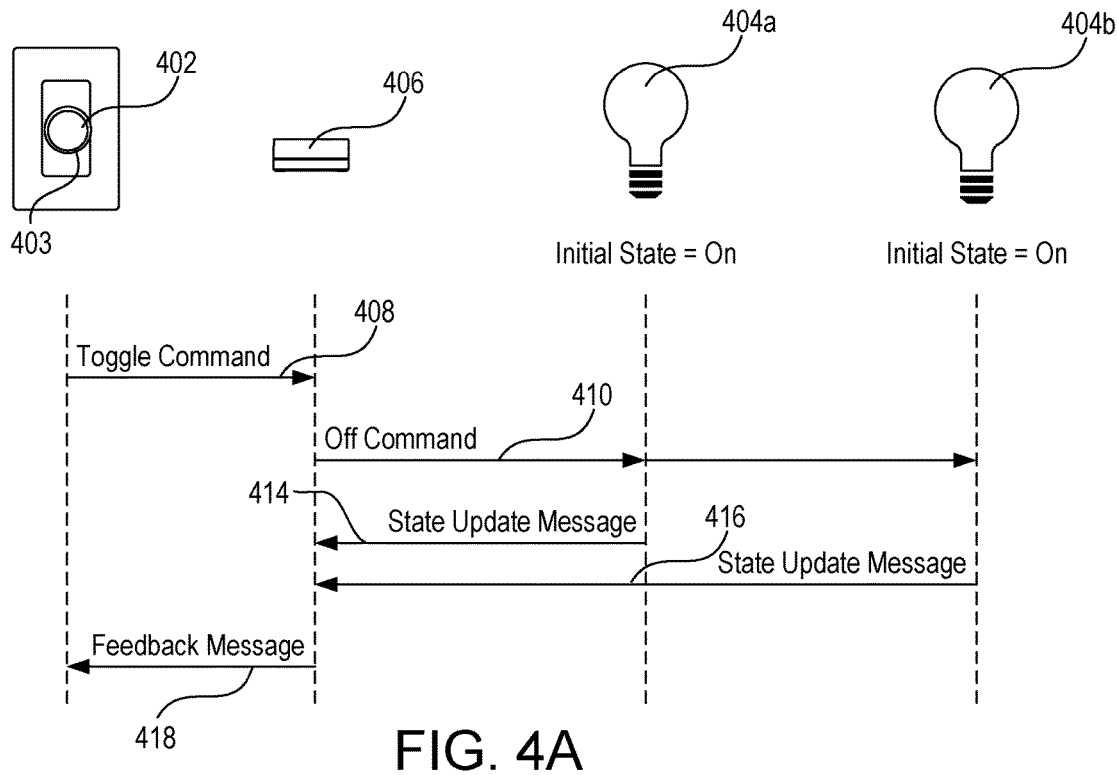
FIGS. 4A and 4B are system flow diagrams depicting example message flows for communicating digital messages in a load control system that implements a hub device.
Figure 4B:
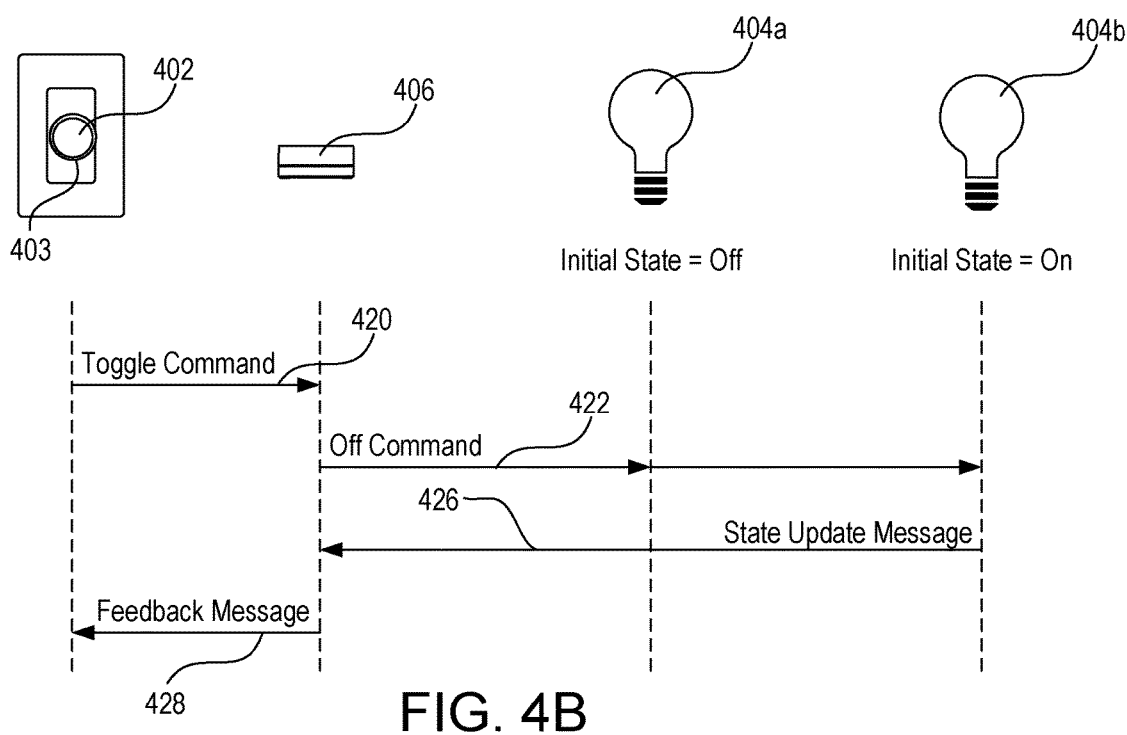

FIGS. 4A and 4B are system flow diagrams depicting example message flows for communicating digital messages in a load control system that implements a hub device 406 as a master device. Though the hub device 406 may be implemented as the master device, another master device may be similarly implemented, such as one of the lighting devices 404a, 404b, for example. A remote control device 402 may be in communication with the hub device 406 for transmitting commands in response to user interface events and/or receiving feedback. As shown in FIG. 4A, the remote control device 402 may identify a user interface event (e.g., actuation, rotation, finger swipe, etc.) that triggers a toggle command 408, though other commands may also be communicated. The hub device 406 may receive the toggle command 408 and determine the control instructions for being sent to lighting devices 404a, 404b that are associated with the remote control device 402 for performing load control.

The hub device 406 may operate as a master device that maintains the current state of the lighting devices 404a, 404b and transmits a command for performing control based on the current state of the lighting devices 404a, 404b. For example, in response to the toggle command 408, the hub device 406 may identify that the lighting devices 404a, 404b are both in the on state and send an off command 410 to change the state of the lighting devices 404a, 404b. The off command 410 may be sent as a multicast message or individual unicast messages to the lighting devices 404a, 404b.

The lighting devices 404a, 404b may send respective state update messages 414, 416 to the hub device 406 to indicate a change of state in response to the off command 410 and/or the off command 412. The hub device 406 may store the updated state of the lighting devices 404a, 404b for future reference for generating control instructions and/or providing feedback to the remote control device 402. The hub device 406 may send a feedback message 418 to the remote control device 402 to identify the updated state of the lighting devices 404a, 404b. The remote control device 402 may provide feedback to a user on the status indicator 403 to indicate the updated state of the lighting devices 404a, 404b indicated in the feedback message 418.

As shown in FIG. 4B, the remote control device 402 may identify a user interface event that triggers a toggle command 420 that is transmitted to the hub device 406, though other commands may also be communicated. In response to the toggle command 408, the hub device 406 may determine that the state of the lighting devices 404a, 404b are out of sync and synchronize the lighting devices 404a, 404b. The hub device 406 may identify that the lighting device 404a is in an off state and the lighting device 404b is in an on state and may transmit a synchronization message to the lighting devices 404a, 404b. The synchronization message may include a default toggle command, such as an off command 422 or an on command, when the lighting devices 404a, 404b are determined to be out of sync. The hub device may also, or alternatively, generate other lighting control instructions dynamically when the lighting devices 404a, 404b are determined to be out of sync. The off command 422 may be sent as a multicast message or individual unicast messages to the lighting devices 404a, 404b.

The lighting device 404b may send a state update message 426 to the hub device 406 to indicate a change of state in response to the off command 422 and/or the off command 424. As the lighting device 404a may already be in the off state, the lighting device 404a may omit sending a state update message to prevent additional traffic from being communicated in the load control system. The hub device 406 may store the updated state of the lighting device 404b for future reference for generating control instructions and/or providing feedback to the remote control device 402. The hub device 406 may send a feedback message 428 to the remote control device 402 to identify the updated state of the lighting devices 404a, 404b. The remote control device 402 may provide feedback to a user on the status indicator 403 to indicate the updated state of the lighting devices 404a, 404b indicated in the feedback message 428.

Figure 5A:
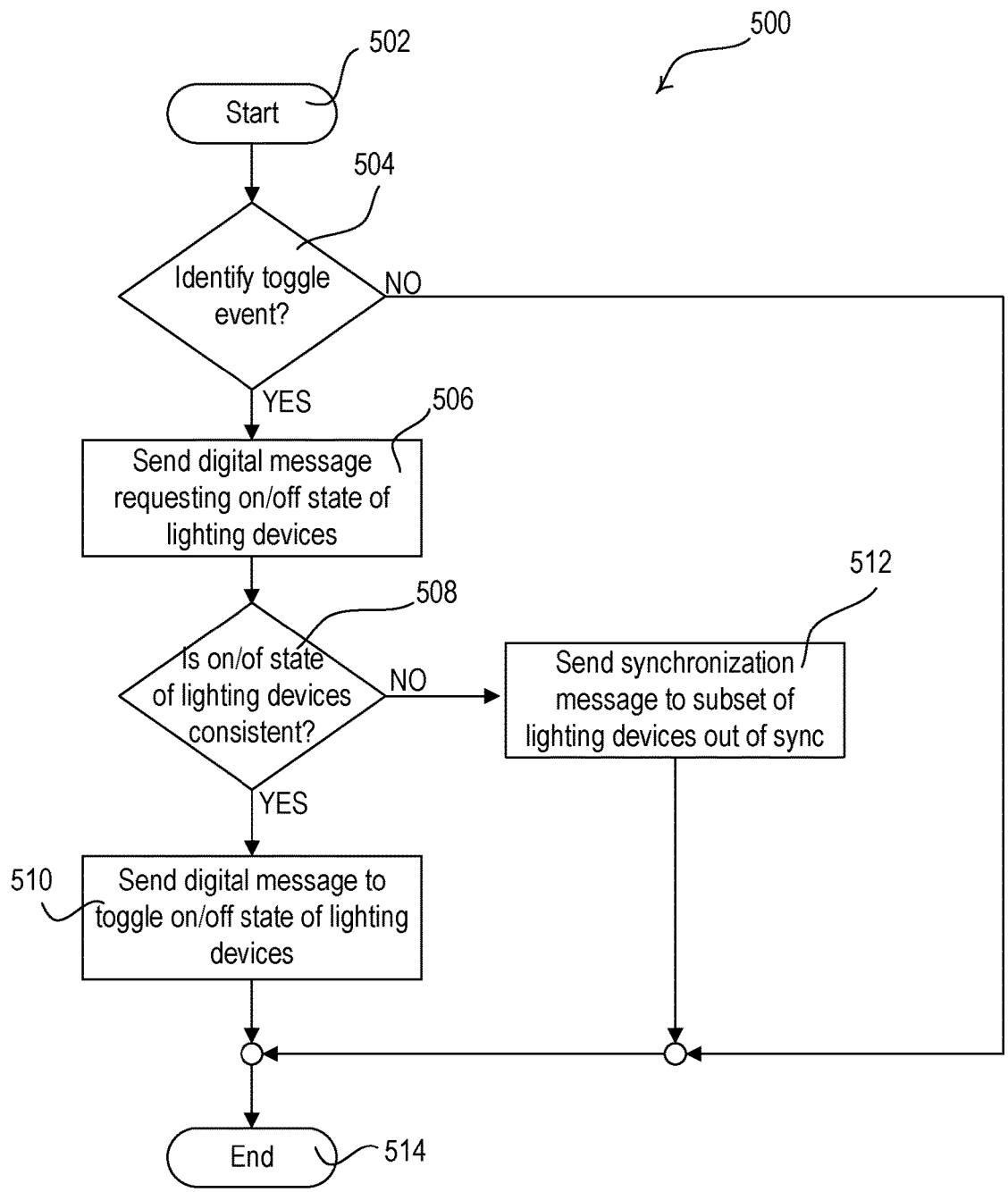
FIG. 5A is a flowchart depicting an example method for synchronizing and/or toggling lighting devices in a load control system.

FIG. 5A is a flowchart depicting an example method 500 for controlling (e.g., synchronizing and/or toggling) lighting devices in a load control system. The method 500 may be performed at one or more devices in the load control system. For example, the method 500, or portions thereof, may be performed at a remote control device, another controller device, a hub device, a master device, and/or another computing device. The method 500 may be performed by a remote control device (e.g., the remote control device 116) to query for a current status of lighting devices in response to an actuation of a toggle actuator (e.g., the actuation portion 117 of the remote control device 116) and generate lighting control commands in response to the identified status (e.g., the identified statuses of all lighting devices as shown in FIG. 3A).

As shown in FIG. 5A, the method 500 may be executed periodically and/or in response to an actuation of an actuator (e.g., the actuation portion 117) at 502. At 504, a determination may be made as to whether a toggle event is identified. A toggle event may be identified at a remote control device upon actuation of a portion of and/or a button on the remote control device (e.g., the actuation portion 117 of the remote control device 116), or performing another toggle event at the remote control device. The toggle event may be detected at the remote control device or another device as described herein. If a toggle event is unidentified, at 504, the method 500 may end, at 514.

If a toggle event is identified, at 504, a digital message may be sent, at 506, to a group or all of lighting devices requesting a current on/off state. The request may be sent as a multicast message, or individual unicast messages, to each of the lighting devices. The lighting devices may return the current on/off state, which may be stored locally thereon.

At 508, a determination may be made as to whether the on/off state of the lighting devices is consistent. If the on/off state of the group of lighting devices is consistent, a digital message may be sent, at 510, to toggle the on/off state of the group of lighting devices. The digital message may include the toggle command, or an "on" command or "off" command, to instruct the lighting devices to toggle the local on/off state. The "on" command may be sent in response to an "off" state at the lighting devices. An "off" command may be sent in response to an "on" state at the lighting devices. The digital message for toggling the on/off state of the lighting devices may be sent as a multicast command to the group of lighting devices, or as individual unicast messages to each of the lighting devices.

If the on/off state across the group of lighting devices is determined to be inconsistent at 508, a synchronization message may be sent to a subset of the lighting devices that are out of sync with the others at 510. The synchronization message may be sent as a multicast message that indicates the on/off state of the lighting devices identified for responding to the command. For example, the synchronization message may instruct the lighting devices that are in the "on" state to turn "off." The synchronization message may instruct the lighting devices that are in the "off" state to turn "on." The synchronization message may be sent as a unicast message to each of the lighting devices to be synchronized. The command for changing the on/off state of the lighting devices that are out of sync may be an "on" command, an "off" command, or a toggle command (e.g., where the command is sent in a unicast message or in a multicast message identifying the types of devices to respond). A determination may be made as to the subset of lighting devices (e.g., lighting devices in the "on" state or lighting devices in the "off" state) for being toggled for synchronization. The synchronization message may be sent to the subset of lighting devices having the lesser number of devices for which the on/off state is to be changed. A default setting may be configured at the device configured to send the synchronization message for "turning off" or "turning on" a subset of lighting devices with the synchronization message. After synchronizing the on/off state of the group of lighting devices at 510, the method 500 may exit at 514.

If the on/off state across the group of lighting devices is determined to be consistent at 508, a digital message may be sent, at 512, to toggle the group of synchronized lighting devices, before the method 500 exits at 514. After the method 500 exits at 514, the remote control device, or other battery-powered device, may enter a sleep mode. The identification of a toggle event at 504 may cause the remote control device, or other battery-powered device, to awake from a sleep mode or continue to stay awake for a period of time.

Figure 5B:
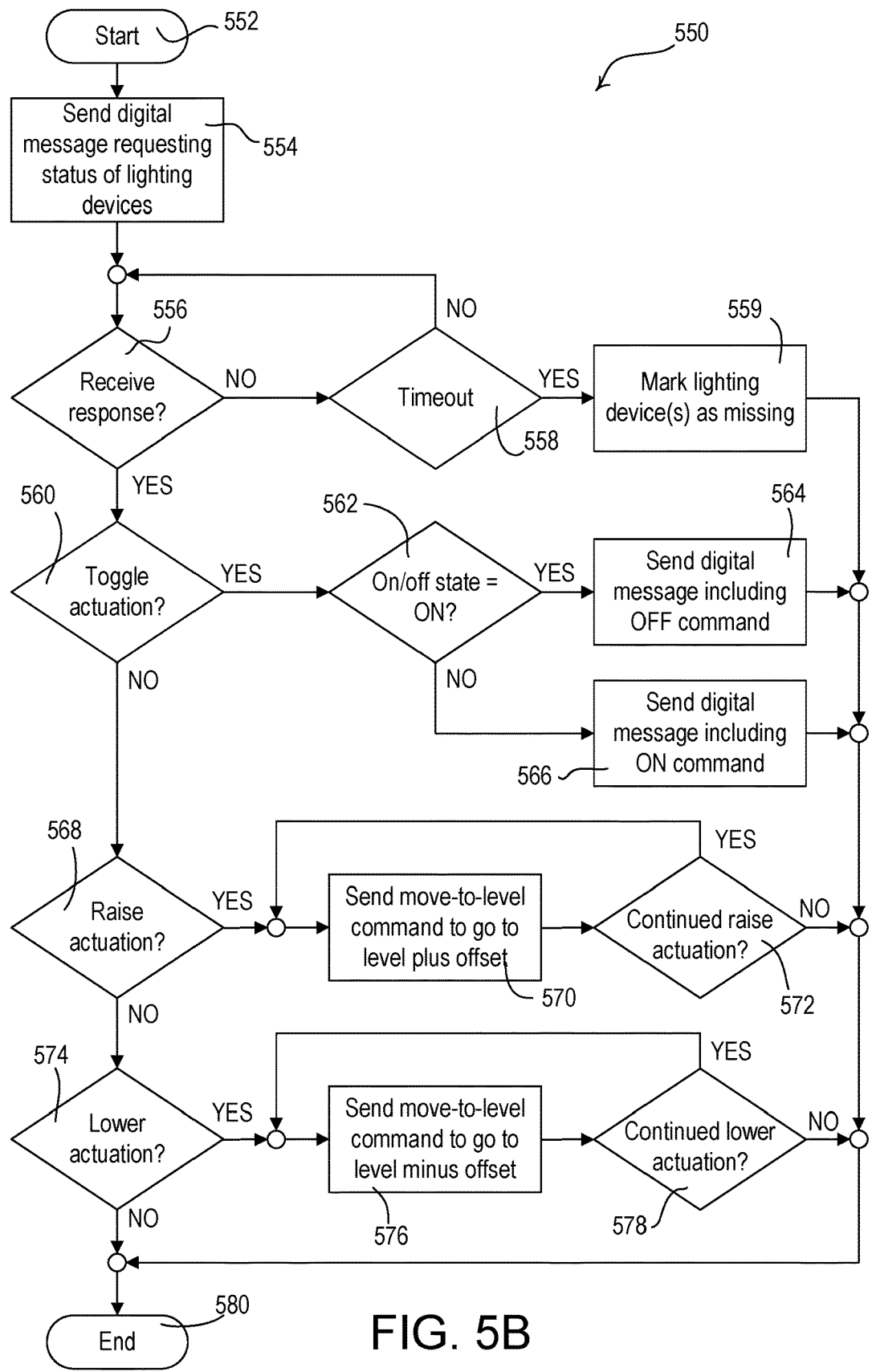
FIG. 5B is a flowchart depicting an example method for synchronizing and/or toggling lighting devices in a load control system.

FIG. 5B is a flowchart depicting an example method 550 for controlling (e.g., synchronizing, toggling, and/or adjusting the intensity of) lighting devices in a load control system. The method 550 may be performed at one or more devices in the load control system. For example, the method 550, or portions thereof, may be performed at a remote control device, another controller device, a hub device, a master device, and/or another computing device. The method 550 may be performed by a remote control device (e.g., the remote control device 116) to query for a current status of lighting devices in response to an actuation of an actuator (e.g., the actuation portion 117 and/or the rotation portion 118 of the remote control device 116) and generating lighting control commands in response to the identified status. For example, the remote control device 116 may be configured to generate a lighting control command in response to the identified on/off state of the first lighting device from which the remote control device receives a response (e.g., as shown in FIGS. 3B and 3C) or in response to the identified lighting intensity of the first lighting device from which the remote control device receives a response (e.g., as shown in FIG. 3D).

As shown in FIG. 5B, the method 550 may be executed periodically and/or in response to an actuation of an actuator (e.g., the actuation portion 117 or the rotation portion 118) at 552. At 554, a digital message (e.g., query message) may be sent to a group or all of lighting devices requesting a current status of the lighting devices. The query message may be sent as a multicast message, or individual unicast messages, to each of the lighting devices. The lighting devices may return the current on/off state, which may be stored locally thereon. If a timeout is reached at 558 before a response to the query message is received at 556, one or more of the lighting devices may be marked as "missing" at 559. For example, the status indicator 119 may be illuminated (e.g., blinked or controlled to provide an animation) at 559. The method 550 may end at 580.

When a response to the query message is received at 556 (e.g., the first response to the query messages is received), a determination may be made, at 560, as to whether a toggle actuation (e.g., a toggle event) has occurred. A toggle actuation may be identified at a remote control device upon actuation of a portion of and/or a button on the remote control device (e.g., the actuation portion 117 of the remote control device 116), or performing another toggle event at the remote control device. The toggle actuation may be detected at the remote control device or another device as described herein. If a toggle actuation is identified at 560 and the on/off state included in the response to the query is the on state at 562, a digital message including an "off" command may be sent at 564, and the method may end at 580. If the on/off state included in the response to the query is the off state at 562, a digital message including an "on" command may be sent at 566, and the method may end at 580. The digital message including "on" and "off" commands may be sent as a multicast command to the group of lighting devices, or as individual unicast messages to each of the lighting devices.

If a toggle event is not identified at 560, a determination may be made, at 568, as to whether a raise actuation has occurred. A raise actuation may be identified at a remote control device upon actuation of a portion of and/or an intensity adjustment actuator on the remote control device (e.g., the rotation portion 118 of the remote control device 116), or performing another actuation of an intensity adjustment actuator at the remote control device. The raise actuation (e.g., a clockwise rotation of the rotation portion 118) may be detected at the remote control device or another device as described herein. If a raise actuation is identified at 568, a digital message including a "move-to-level" command may be sent at 570. The digital message including "move-to-off" command may be sent as a multicast command to the group of lighting devices, or as individual unicast messages to each of the lighting devices. The "move-to-level" command may cause all of the lighting devices to go to the intensity level included in the response to the query plus an offset that may be dependent upon the amount of rotation of the rotation portion 118. The intensity level that was transmitted to the lighting devices in the "move-to-level" command (e.g., the intensity level included in the response to the query plus the offset) may be stored at the present intensity level of the lighting devices at 570. In addition, the status indicator 119 may be illuminated, at 570, to indicate the present intensity level of the lighting devices.

If the raise actuation is a continued raise actuation at 572, another digital message including a "move-to-level" command may be sent at 570. The "move-to-level" command may cause all of the lighting devices to go to the present intensity level plus an offset that may be dependent upon the amount of continued rotation of the rotation portion 118. The present intensity level of the lighting devices may be updated again and the status indicator 119 may be illuminated to indicate the present intensity level (e.g., to track the present intensity level) at 570. If the raise actuation is not a continued raise actuation at 572 (e.g., when the rotation of the rotation portion 118 has ended), the method 550 may end at 580.

If a raise event is not identified at 568, a determination may be made, at 574, as to whether a lower actuation has occurred. A lower actuation may be identified at a remote control device upon actuation of a portion of and/or an intensity adjustment actuator on the remote control device (e.g., the rotation portion 118 of the remote control device 116), or performing another actuation of an intensity adjustment actuator at the remote control device. The lower actuation (e.g., a counterclockwise rotation of the rotation portion 118) may be detected at the remote control device or another device as described herein. If a lower actuation is identified at 574, a digital message including a "move-to-level" command may be sent at 576. The digital message including "move-to-off" command may be sent as a multicast command to the group of lighting devices, or as individual unicast messages to each of the lighting devices. The "move-to-level" command may cause all of the lighting devices to go to the intensity level included in the response to the query minus an offset that may be dependent upon the amount of rotation of the rotation portion 118. The intensity level that was transmitted to the lighting devices in the "move-to-level" command (e.g., the intensity level included in the response to the query minus the offset) may be stored at the present intensity level of the lighting devices at 576. In addition, the status indicator 119 may be illuminated, at 576, to indicate the present intensity level of the lighting devices.

If the lower actuation is a continued lower actuation at 578, another digital message including a "move-to-level" command may be sent at 570. The "move-to-level" command may cause all of the lighting devices to go to the present intensity level minus an offset that may be dependent upon the amount of continued rotation of the rotation portion 118. The present intensity level of the lighting devices may be updated again and the status indicator 119 may be illuminated to indicate the present intensity level (e.g., to track the present intensity level) at 576. If the lower actuation is not a continued lower actuation at 578 (e.g., when the rotation of the rotation portion 118 has ended), the method 550 may end at 580.

Figure 6:
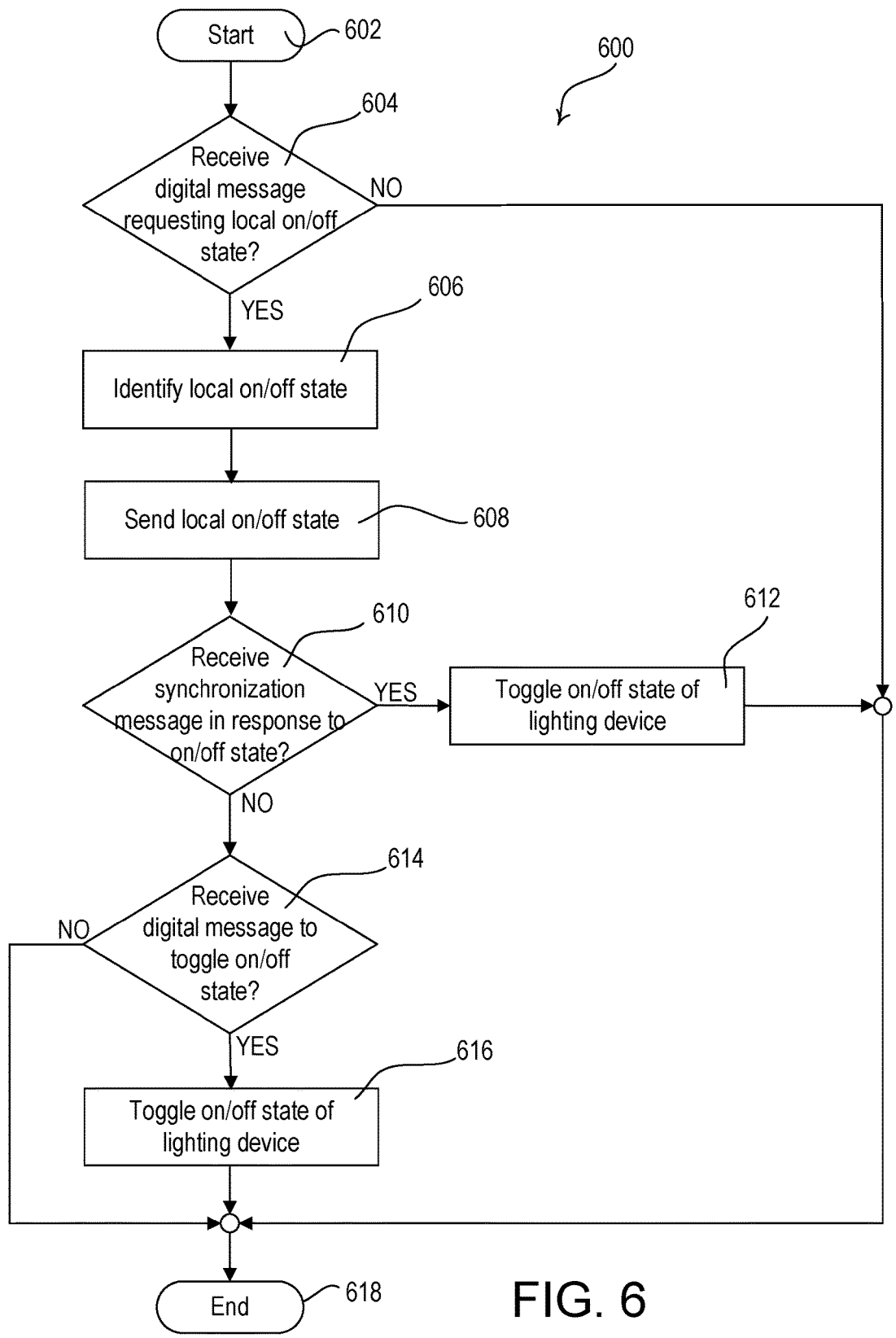
FIG. 6 is a flowchart depicting an example method for synchronizing and/or toggling lighting devices in a load control system.

FIG. 6 is a flowchart depicting an example method 600 for controlling (e.g., synchronizing and/or toggling) lighting devices in a load control system. The method 600 may be performed at one or more devices in the load control system. For example, the method 600, or portions thereof, may be performed at one or more lighting devices, a hub device, a master device, and/or other load control devices. The method 600 may be performed by a lighting device (e.g., the lighting devices 112a, 112b, 122) to respond to queries for a current status and to control an on/off state in response to commands (e.g., as shown in FIGS. 3A-3C).

As shown in FIG. 6, the method 600 may be executed periodically and/or in response to receiving a digital message at 602. At 604, a determination may be made as to whether a digital message has been received requesting a local on/off state of a lighting device. The request for the local on/off state may be received from a controller device, such as a remote control device, or a hub device. If a digital message is unreceived, at 604, the method may proceed to

614. If a digital message is received, at 604, the local on/off state of a lighting device may be identified, at 606. At 608, the local on/off state may be sent in response to the request.

At 610, a determination may be made as to whether a synchronization message has been received. The synchronization message may be received from a controller device, such as a remote control device, or a hub device in response to the local on/off state of the lighting device. If the synchronization message is received, at 610, the on/off state of the lighting device may be toggled, at 612, and the method 600 may end at 618. The synchronization message may include a toggle command, an "on" command, or an "off" command that instruct the lighting device to toggle the local on/off state.

If the synchronization message is not received, at 610, a determination may be made, at 614, as to whether a digital message has been received to toggle a local on/off state of the lighting device. If the digital message has been received, at 614, to toggle the local on/off state of the lighting device, the on/off state of the lighting load may be toggled, at 616, and the method may end at 618. If the digital message has not been received, at 614, to toggle the local on/off state of the lighting device, the method 600 may end at 618.

Figure 7:
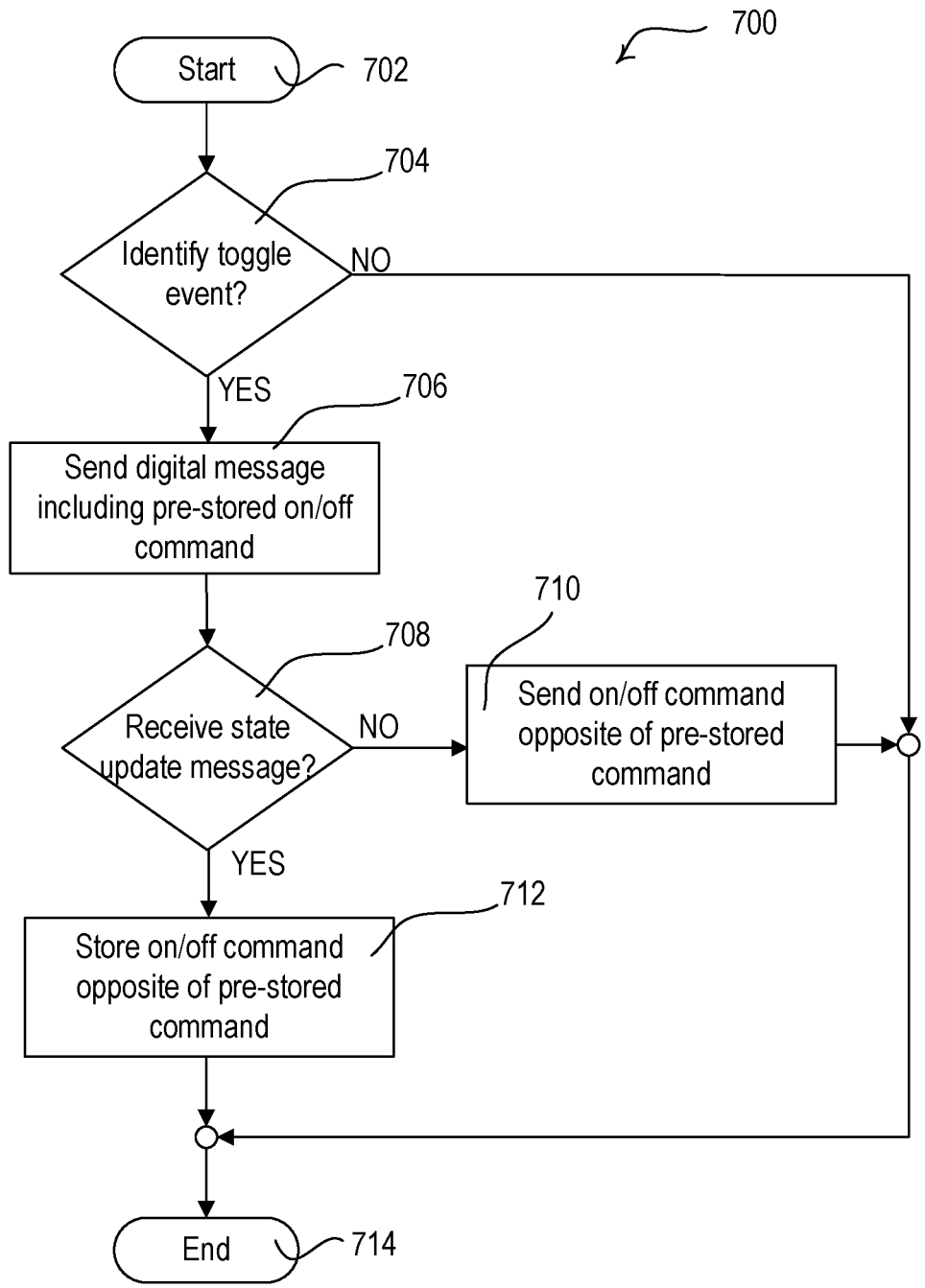
FIG. 7 is a flowchart depicting an example method for synchronizing and/or toggling lighting devices in a load control system.

FIG. 7 is a flowchart depicting an example method 700 for controlling (e.g., synchronizing and/or toggling) lighting devices in a load control system. The method 700 may be performed at one or more devices in the load control system. For example, the method 700, or portions thereof, may be performed at a remote control device, another controller device, a hub device, a master device, and/or another computing device. The method 700 may be performed by a remote control device (e.g., the remote control device 116) to generate lighting control commands in response to an actuation of a toggle actuator (e.g., the actuation portion 117 of the remote control device 116) using a pre-stored on/off state (e.g., as shown in FIGS. 2A and 2B).

As shown in FIG. 7, the method 700 may be executed periodically and/or in response to an actuation of an actuator (e.g., the actuation portion 117) at 702. At 704, a determination may be made as to whether a toggle event is identified. The toggle event may be detected at the remote control device or another device as described herein. If a toggle event is unidentified, at 704, the method 700 may end, at 714. The toggle event may cause a device, such as a battery-powered remote control device or other battery powered device, to awaken from a sleep mode. The device may enter the sleep mode after a predefined period of time has expired without receiving a toggle event or other user event on the device.

If a toggle event is identified, at 704, a digital message may be sent to a group of lighting devices, at 706. The digital message may be sent as a multicast message, or individual unicast messages, to each of the lighting devices. The digital message may include an "on" command or an "off" command. The "on" command or the "off" command may be a pre-stored command stored at the sending device. For example, a next state command (e.g., "on" command or "off" command) may be maintained in storage at a controller device for being sent in response to the identification of the next toggle event.

At 708, a determination may be made as to whether a state update message has been received from the lighting devices. A state update message may be received from lighting devices that update an on/off state in response to an "on" command or an "off" command. The state update message may be received in response to the command sent at 706, or a subsequent polling request. Polling requests for the current on/off state may be sent in intervals a predefined period of time after the command is sent at 706. If a state update message is unreceived at 708 (e.g., after a predefined period of time), an opposite on/off command than the pre-stored command may be sent, at 710. For example, if the pre-stored command sent at 706 was an "on" command, an "off" command may be sent at 710, or vice versa. The opposite on/off command may be sent at 710 to cause the on/off state of the lighting devices to be toggled, as the on/off state of the lighting devices may go unchanged in response to the previous digital message sent at 706. As a state update message failed to be received at 708, the lighting devices may already be in the state indicated in the command. The method 700 may end at 714.

If a state update message is received at 708 (e.g., within a predefined period of time), it may be determined that the lighting devices have been toggled. The pre-stored on/off command sent at 706 may act as a synchronization message to change the on/off state of a subset of the lighting devices, while other lighting devices may already be in the state indicated in the command. In another example, the digital message sent at 706 may toggle the entire group of lighting devices. As the lighting devices in the group have changed in on/off state in response to the pre-stored command, another on/off command may be generated and pre-stored at 712, and the method may end at 714. The pre-stored command may be flipped from the prior on/off command sent to at least a subset of the lighting devices. The pre-stored command may be the opposite on/off command of the pre-stored command sent at 706. The pre-stored command may be the same command sent at 706 (e.g., when the opposite on/off command has already been sent at 710). The pre-stored command may be stored in anticipation of the lighting devices remaining in the same on/off state until the next command sent from the device. In an example, a device, such as a battery-powered remote control device or other battery powered device, may pre-store the on/off command prior to entering a sleep mode and send the pre-stored command upon identifying a toggle event, at 704.

Figure 8:
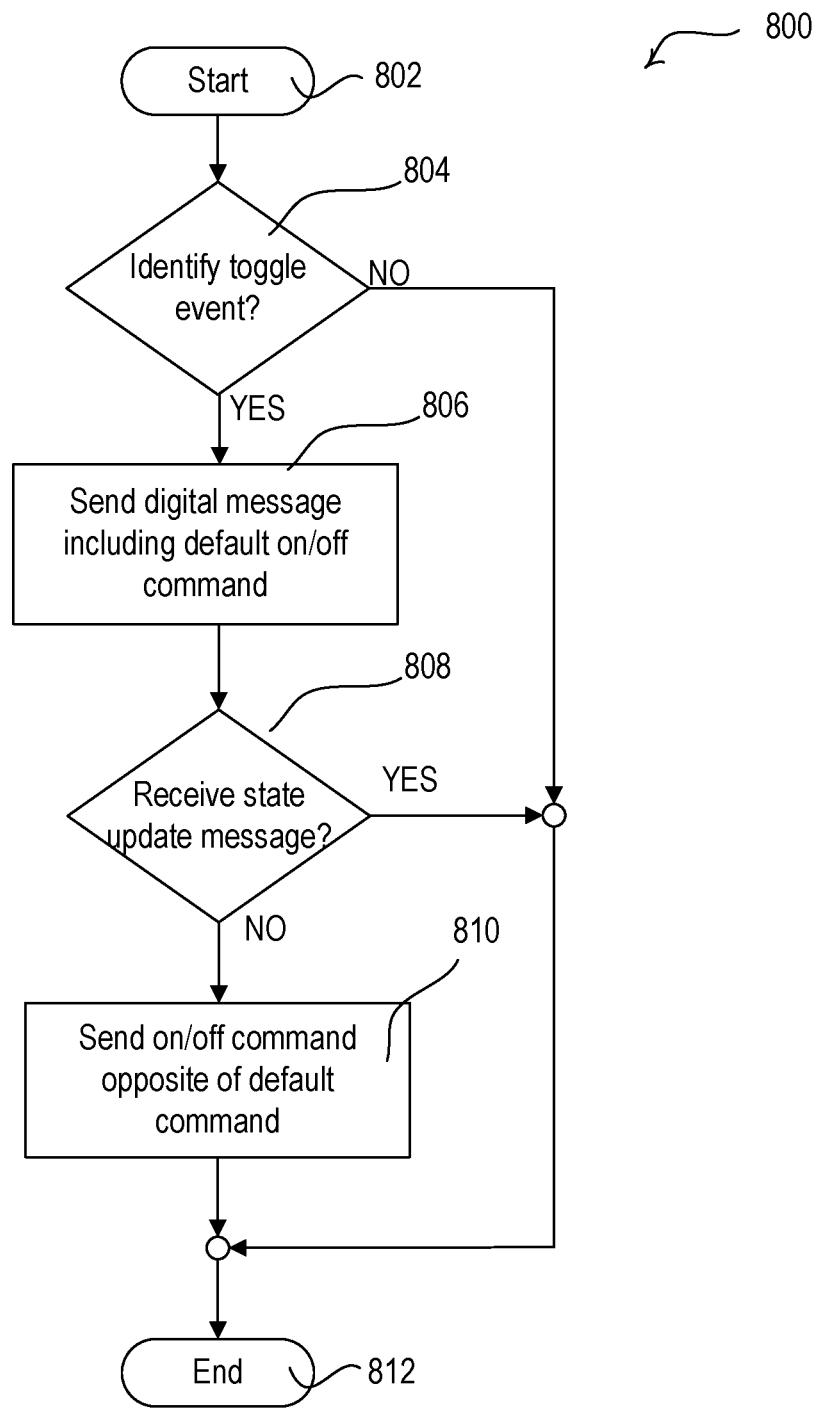
FIG. 8 is a flowchart depicting an example method for synchronizing and/or toggling lighting devices in a load control system

FIG. 8 is a flowchart depicting an example method 800 for controlling (e.g., synchronizing and/or toggling) lighting devices in a load control system. The method 800 may be performed at one or more devices in the load control system. For example, the method 800, or portions thereof, may be performed at a remote control device, another controller device, a hub device, and/or another computing device. The method 800 may be performed by a remote control device (e.g., the remote control device 116) to generate lighting control commands in response to an actuation of a toggle actuator (e.g., the actuation portion 117 of the remote control device 116) using a default on/off state (e.g., as shown in FIGS. 2A and 2B).

As shown in FIG. 8, the method 800 may be executed periodically and/or in response to an actuation of an actuator (e.g., the actuation portion 117) at 802. At 804, a determination may be made as to whether a toggle event is identified. The toggle event may be detected at the remote control device or another device as described herein. If a toggle event is unidentified (e.g., after a predefined period of time), at 804, the method 800 may end, at 812. The toggle event may cause a device, such as a battery-powered remote control device or other battery powered device, to awaken from a sleep mode. The device may enter the sleep mode after a predefined period of time has expired without receiving a toggle event or other user event on the device.

If a toggle event is identified, at 804, a digital message may be sent to a group of lighting devices, at 806. The digital message may be sent as a multicast message, or individual unicast messages, to each of the lighting devices. The digital message may include an "on" command or an "off" command. The command may be a default "on" command or a default "off" command that may be sent in response to each identification of a toggle event. For example, a default state command (e.g., "on" command or "off" command) may be maintained in storage for being sent in response to the identification of the each toggle event (e.g., upon awakening from a sleep mode).

At 808, a determination may be made as to whether a state update message has been received from the lighting devices. A state update message may be received from lighting devices that update an on/off state in response to an "on" command or an "off" command. The state update message may be received in response to the command sent at 806, or a subsequent polling request. Polling requests for the current on/off state may be sent in intervals a predefined period of time after the command is sent at 806. If a state update message is unreceived at 808 (e.g., after a predefined period of time), an opposite on/off command than the default command may be sent, at 810, and the method 800 may end at 812. For example, if the default command sent at 806 was an "on" command, an "off" command may be sent at 810, or vice versa. The opposite on/off command may be sent at 810 to cause a change to the on/off state of the lighting devices, as the on/off state of the lighting devices may go unchanged in response to the previous digital message sent at 806. As a state update message failed to be received at 808, the lighting devices may already be in the state indicated in the command. If a state update message is received at 808 (e.g., within a predefined period of time), the method 800 may end at 812. If a toggle event is not identified at 804, the device may enter the sleep mode and the method 800 may end at 812.

Figure 9:
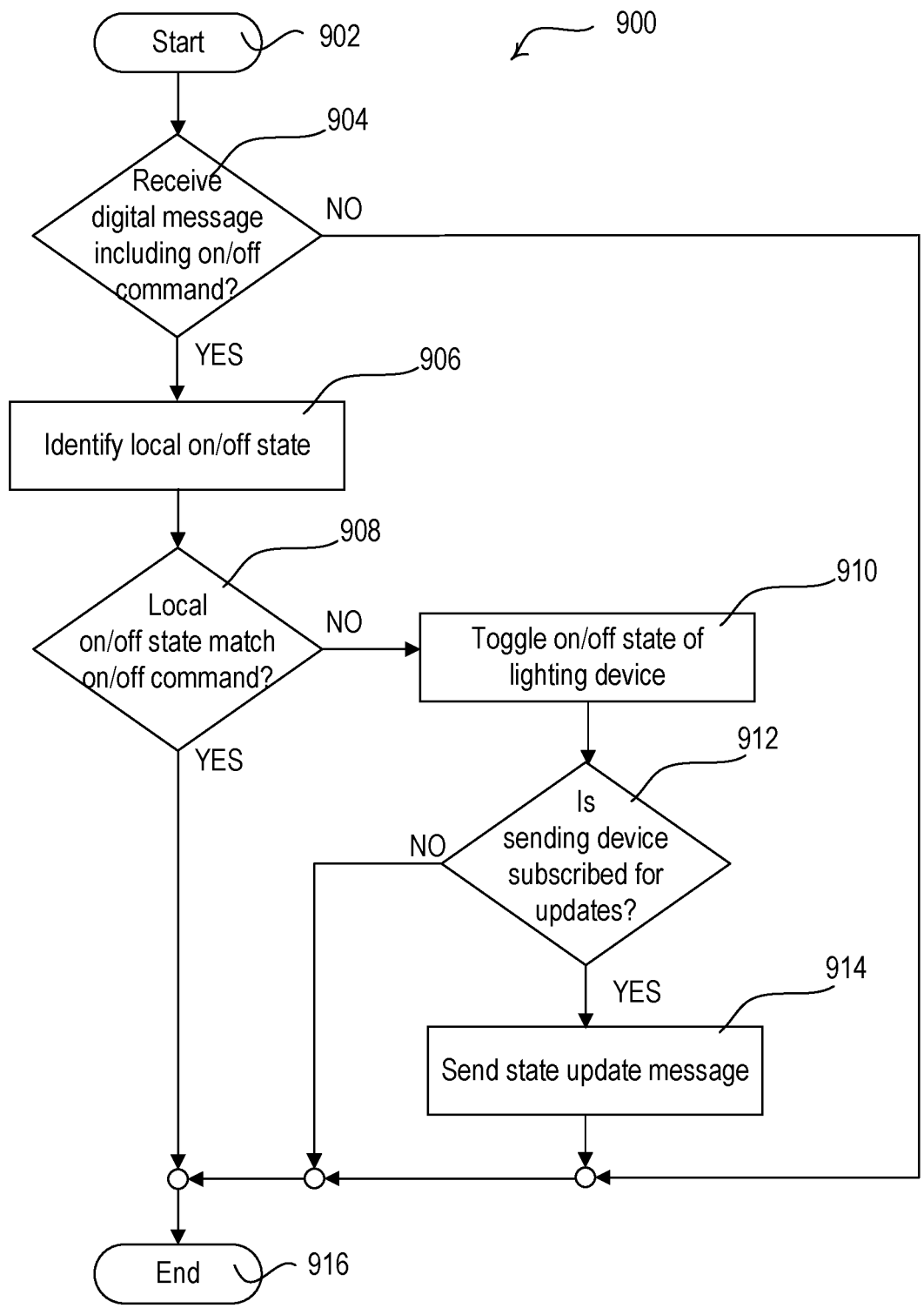
FIG. 9 is a flowchart depicting an example method for toggling lighting devices and/or sending state update messages in a load control system.

FIG. 9 is a flowchart depicting an example method 900 for controlling (e.g., synchronizing and toggling) lighting devices and/or sending state update messages in a load control system. The method 900 may be performed at one or more devices in the load control system. For example, the method 900, or portions thereof, may be performed at one or more lighting devices, a hub device, and/or other load control devices. The method 900 may be performed by a lighting device (e.g., the lighting devices 112a, 112b, 122) for controlling an on/off state in response to commands and sending status update messages (e.g., as shown in FIGS. 2A-2B).

As shown in FIG. 9, the method 900 may be executed periodically and/or in response to receiving a digital message at 902. At 904, a determination may be made as to whether a digital message has been received that includes an on/off command (e.g., an "on" command or an "off" command) for a lighting device. The on/off command may be received from a control device, such as a remote control device, or a hub device. If a digital message is unreceived, at 904, the method may end at 916. If a digital message is received, at 904, the local on/off state of a lighting device may be identified, at 906. At 908, the local on/off state may be compared to the on/off command to determine whether the local on/off state matches the state indicated in the on/off command. If the local on/off state matches the state indicated in the on/off command, the method 900 may end at 916. If the local on/off state fails to match the state indicated in the on/off command, the on/off state at the lighting device may be toggled, at 910.

At 912, a determination may be made as to whether the sending device from which the digital message was received at 904 is subscribed for receiving state update messages. The lighting device may have stored a list of identifiers of the devices that are subscribed for receiving state update messages. If the sending device is subscribed for state update messages, a state update message may be sent (e.g., via unicast messages), at 914, to the device from which the digital message was received at 904. The state update message may be sent, at 914, in response to a polling request, or without receiving the polling request. The method 900 may end at 916.

Figure 10:
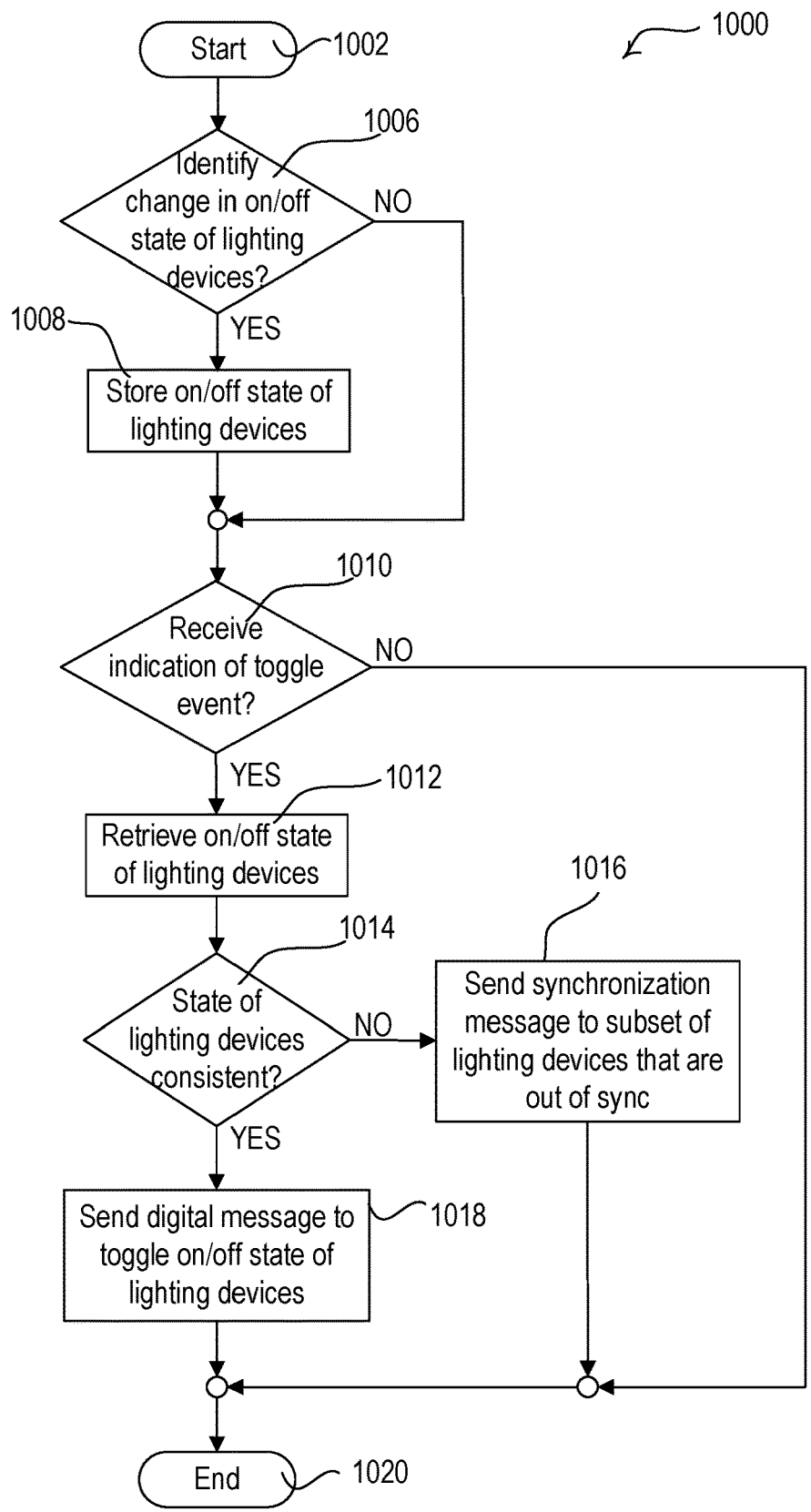
FIG. 10 is a flowchart depicting an example method for synchronizing and/or toggling lighting devices in a load control system.

FIG. 10 is a flowchart depicting an example method 1000 for synchronizing and/or toggling lighting devices in a load control system. The method 1000 may be performed at one or more devices in the load control system. For example, the method 1000, or portions thereof, may be performed at a hub device and/or another master device. The other master device may be a remote control device, a lighting device, another control device, and/or another computing device.

As shown in FIG. 10, the method 1000 may be executed periodically and/or in response to receiving a digital message at 1002. At 1006, a determination may be made as to whether there has been a change in the on/off state of the lighting devices. A change in state may be identified, at 1006, when a digital message is sent between control devices (e.g., such as a remote control device and a lighting device). The digital message may be relayed through the hub device or other master device. The hub device or other master device may listen for the digital messages otherwise communicated in the load control system (e.g., directly between control devices or otherwise communicated). The hub device or other master device may be subscribed to and/or receive state update messages from lighting devices that change an on/off state, which may enable updated on/off states to be identified from associated devices recognized by the hub device or other master device and unassociated devices that may be unrecognized by the hub device or other master device. The hub device or other master device may also query the lighting devices for their current on/off state or determine the current on/off state by listening to messages communicated between control devices in the load control system. The query message may be sent as a multicast message, or individual unicast messages, to each of the lighting devices.

If a change in the on/off state of a lighting device is identified, at 1006, the updated on/off state may be maintained, at 1008. A subset (e.g., one or more) of the lighting devices may be toggled. The toggling on the subset of lighting devices may be performed by a control device that is uncommon to the group of lighting devices capable of being controlled by a common control device. The hub device or other master device may have stored thereon the associated control devices for the group of lighting devices and/or the associated control devices for a subset of the lighting devices. For example, a group of lighting devices may be associated with a common remote control device, while a subset of the group may be associated with another remote control device or a network device. The subset of lighting devices may be toggled out of sync with the other lighting devices in the group. The hub device or other master device may maintain the on/off state of each of the lighting devices in the group and may know the devices that are out of sync.

At 1010, a determination may be made as to whether an indication of a toggle event is received. A control device, such as a remote control device, may identify a toggle event and may send a digital message to the hub device or other master device. The digital message may include a toggle command, an "on" command, an "off" command, or another indication of a toggle event. If an indication of a toggle event is unreceived, at 1010, the method 1000 may end, at 1020.

If an indication of a toggle event is received, at 1010, an on/off state of the lighting devices may be identified (e.g., retrieved from memory) at 1012. The hub device or other master device may perform a lookup in memory of the on/off state of each of the lighting devices associated with the control device from which the indication of the toggle event is received. At 1014, a determination may be made as to whether the on/off state of the lighting devices is consistent. If the on/off state of the group of lighting devices is consistent, a digital message may be sent, at 1018, to toggle the on/off state of the group of lighting devices, and the method 1000 may end at 1020. The digital message may include the toggle command, or an "on" command or "off" command, to instruct the lighting devices associated with the control device from which the indication of the toggle event was received to toggle the local on/off state. The "on" command may be sent in response to an "off" state at the lighting devices. An "off" command may be sent in response to an "on" state at the lighting devices. The digital message for toggling the on/off state of the lighting devices may be sent as a multicast command to the group of lighting devices, or as individual unicast messages to each of the lighting devices.

If the on/off state across the group of lighting devices is determined to be inconsistent, at 1014, a synchronization message may be sent at 1016 to a subset of the lighting devices that are out of sync with the others, and the method 1000 may end at 1020. The synchronization message may be sent as a multicast message that indicates the on/off state of the lighting devices identified for responding to the command. For example, the synchronization message may instruct the lighting devices that are in the "on" state to turn "off." The synchronization message may instruct the lighting devices that are in the "off" state to turn "on." The synchronization message may be sent as a unicast message to each of the lighting devices to be synchronized. The hub device or other master device may send the unicast message to each of the lighting devices associated with the control device from which the indication of a toggle event was received and that has an on/off state that is determined to be out of sync. The command for changing the on/off state of the lighting devices that are out of sync may be an "on" command, an "off" command, or a toggle command (e.g., where the command is sent in a unicast message or in a multicast message identifying the types of devices to respond).

A determination may be made by the hub device or other master device as to the subset of lighting devices (e.g., lighting devices in the "on" state or lighting devices in the "off" state) for being toggled for synchronization. The synchronization message may be sent to the subset of lighting devices having the lesser number of devices for which the on/off state is to be changed. A default setting may be configured at the device configured to send the synchronization message for "turning off" or "turning on" a subset of lighting devices with the synchronization message.

The response to the synchronization message may be a state update message. The lighting devices that change an on/off state in response to an "on" command or an "off" command may send a state update message to the hub device or other master device to indicate the change in on/off state. The hub device or other master device may be subscribed to receiving state update messages at the associated lighting devices. The hub device or other master device may receive the state update message from the lighting devices that change state in response to the received "on" command or the received "off" command. The lighting devices that fail to change the on/off state in response to the command from the hub device or other master device may be unresponsive. The hub device or other master device may store the updated state and/or confirm the state of the unresponsive devices. The hub device or other master device may, alternatively, store the updated state of the lighting device after sending the command.

FIGS. 11A-11D show front views of a remote control device 1102 with a status indicator 1103 that may be illuminated to provide the feedback described herein. As shown in FIG. 11A, the remote control device 1102 may be configured to provide the feedback after the remote control device 1102 has been activated. For example, the remote control device 1102 may be configured to provide the feedback upon detecting a user near the control device and/or upon a user interface event being detected on a user interface of the remote control device 1102. The user interface event may be an actuation of an actuation portion 1104 or a rotation of a rotation portion 1106. The feedback may indicate that the remote control device 1102 is transmitting wireless communication signals (e.g., RF signals) in response to the activation. The remote control device 1102 may keep the status indicator 1103 illuminated for the duration of the event that triggered the feedback (e.g., while the rotation portion 1106 is being rotated). The remote control device 1102 may be configured to continue to illuminate the status indicator 1103 for a few seconds (e.g., 1-2 seconds) after the event, and then turn off the status indicator 1103 to conserve battery life.

The status indicator 1103 may be unlit (e.g., as shown in FIG. 11A) to provide feedback that the load control devices associated therewith are off. The LEDs in the status indicator 1103 may be turned on to a full intensity (e.g., as shown in FIG. 11B) when the load control devices associated therewith are on or a user interface event is detected. For example, the load control devices may be turned on in response to a toggle event recognized by actuating the actuation portion 1104 or rotating the rotation portion 1106. The LEDs in the status indicator 1103 may be turned on to a full intensity to reflect the level of intensity of the loads controlled by a load control device. For example, the status indicator 1103 may reflect a high-end dimming level for lights, a fully-open or fully-closed position for shades, a full volume level for audio devices, a full speed for a fan, etc. When the actuation portion 1104 is pressed, the status indicator 1103 may blink between the two states shown in FIGS. 11A and 11B to provide feedback that the actuation portion 1104 was pressed and the remote control device 1102 is working.

The status indicator 1103 may be illuminated to provide the feedback in different manners (e.g., different intensities and/or colors) when the rotation portion 1106 is being rotated. For example, as shown in FIG. 11A, the status indicator 1103 may be fully illuminated to and maintained at a maximum light bar intensity $L_{LB-MAX}$ (e.g., 100%) when the rotation portion 1106 is being rotated clockwise or counterclockwise (e.g., to increase or decrease the intensity of lighting loads, shade levels, fan speed, volume, etc.) to provide simple feedback. As another example shown in FIG. 11C, for example, the status indicator 1103 may be illuminated to a first mid-level light bar intensity $L_{LB-MID1}$ (e.g., 80%) that is less than the maximum light bar intensity $L_{LB-MAX}$ when the rotation portion 1106 is being rotated clockwise (e.g., to raise the intensity of lighting load loads, shade levels, fan speed, volume, etc.) to provide simple feedback that the rotation portion 1106 is being rotated. As shown in FIG. 11D, for example, the status indicator 1103 may be illuminated to a second mid-level light bar intensity $L_{LB\text{-}MID2}$ (e.g., 40%) that is less than the first mid-level light bar intensity $L_{LB\text{-}MID1}$ (and thus less than the maximum light bar intensity $L_{LB\text{-}MAX}$) when the rotation portion 1106 is being rotated counterclockwise (e.g., to lower the intensity of the lighting loads, shade level, volume, etc.) to provide simple feedback that the rotation portion 1106 is being rotated.

Similarly, the status indicator 1103 may be illuminated with different colors to indicate different user inputs and/or the status of electrical loads or load control devices. For example, the status indicator 1103 may be illuminated with different colors to indicate that the intensity of a lighting load is being raised or lowered, a shade level is being raised or lowered, and/or a volume level is being raised or lowered. The status indicator 1103 may be illuminated with a red color when a lighting intensity is being raised and with a blue color when the lighting intensity is being lowered.

Figure 12:
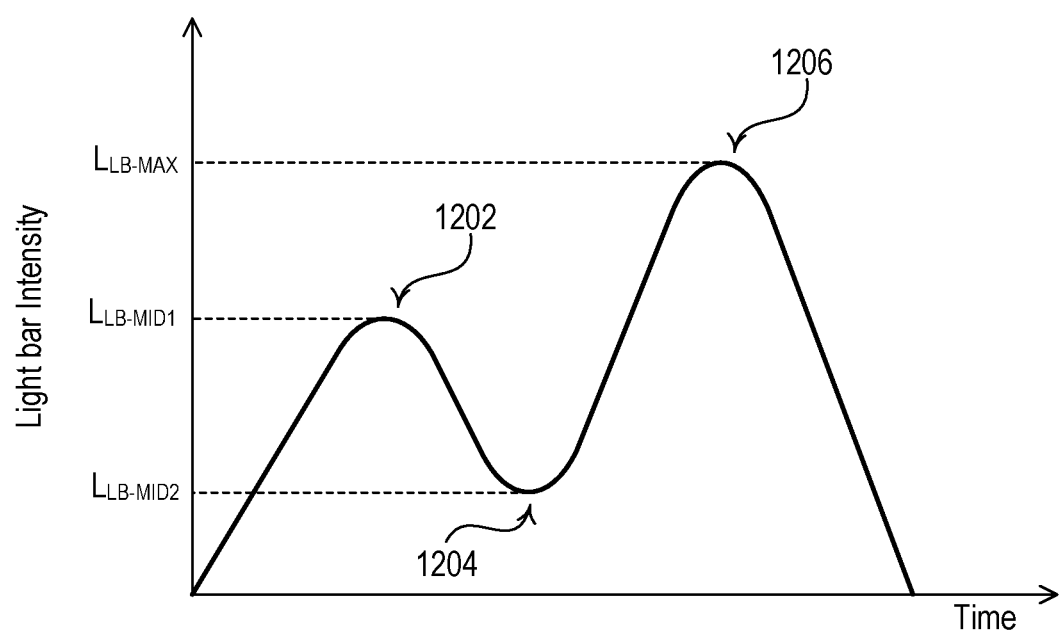
FIG. 12 is a graph that shows an example plot of the intensity of the status indicator in order to generate an animation.

The status indicator 1103 may be illuminated in response to an actuation of the actuation portion 1104 to indicate that an electric load is being toggled on or off. For example, the status indicator 1103 may be illuminated to display an animation (e.g., a heartbeat animation) when a lighting load is being toggled on or off to provide simple feedback that the actuation portion 1104 has been actuated. FIG. 12 shows an example plot of the intensity of the status indicator 1103 with respect to time in order to generate the animation. For example, the intensity of the status indicator 1103 may be quickly increased to a first intensity 1202 (e.g., the first mid-level light bar intensity $L_{LB\text{-}MID1}$ as shown in FIG. 11C), quickly decreased to a second intensity 1204 (e.g., the second mid-level light bar intensity $L_{LB\text{-}MID2}$ as shown in FIG. 11D), quickly increased to a third intensity 1206 (e.g., the maximum light bar intensity $L_{LB\text{-}MAX}$ as shown in FIG. 11B), and then quickly turned off. When the remote control device 1102 is operating in a spin-to-off mode, the status indicator 1103 may be illuminated to display an animation (e.g., the heartbeat animation described herein) when the intensity of the lighting load has reached a minimum intensity and is being turned off.

The status indicator 1103 may be illuminated to further indicate an amount of power being supplied to an electrical load. For example, instead of illuminating the entire light bar of the status indicator 1103, the remote control device 1102 may illuminate a portion of the status indicator 1103, and adjust the length of the illuminated portion in accordance with control applied by a user. For example, when the light bar of the status indicator 1103 is configured to have a circular shape, the illuminated portion may expand or contract around the circumference of the light bar in response to user interface events and/or adjustments in the status of electrical loads. The remote control device 1102 may adjust the intensity of the LED that is illuminating an end point of the illuminated portion of the status indicator 1103 to provide adjustment of the end point of the illuminated portion as is described in greater detail herein.

The remote control device 1102 may be configured to illuminate multiple portions of the status indicator 1103 to provide feedback. The multiple portions may be illuminated to provide different forms of animation on the status indicator 1103. For example, as shown in FIG. 13, segments of the status indicator 1103 (e.g., having one or more LEDs to illuminate each segment) may be illuminated for predefined periods of time at each illumination configuration and the animation may change from one illumination configuration to the next at a constant rate when the rotation portion 1106 is being rotated (e.g., for simple feedback). The segments may be illuminated to indicate the direction of the rotation of the rotation portion 1106, or the change in status of the electrical load. The segments may be illuminated from left to right through the illumination configurations shown in FIG. 13 (e.g., such that the segments move in an upwards direction from the bottom to the top of the status indicator 1103) to show an increase in the intensity of lighting loads, shade levels, volume, etc. The animation may repeat as long as the rotation portion 1106 is rotating. The segments may be illuminated from right to left through the illumination configurations shown in FIG. 13 (e.g., such that the segments move in a downward direction from the top to the bottom of the status indicator 1103) to show a decrease in the intensity of lighting loads, shade levels, fan speed, volume, etc. The segments may iterate in a predefined sequence to display an animation and the sequence may be repeated to indicate the rotation of the rotation portion 1106 and/or the continued change in status of the electrical load. Though a certain number of segments are shown, another number of segments and/or colors may be illuminated.

FIG. 14 shows another example animation that may be displayed via the status indicator 1103 of the remote control device 1102. As shown in FIG. 14, a single segment of the status indicator 1103 (e.g., having one or more LEDs to illuminate the segment) may be illuminated for predefined periods of time at each illumination configuration and the animation may change from one illumination configuration to the next at a constant rate when the rotation portion 1106 is being rotated (e.g., for simple feedback). The single segment may be illuminated in a clockwise or counterclockwise direction to indicate the direction of the rotation of the rotation portion 1106 or the change in the status of the electrical load. The single segment may be illuminated in a clockwise motion to show an increase in the intensity of lighting loads, shade levels, fan speed, volume, etc. (e.g., while rotating the rotation portion 1106 clockwise to increase the intensity). The single segment may be illuminated in a counterclockwise motion to show a decrease in the intensity of lighting loads, shade levels, fan speed, volume, etc. (e.g., while rotating the rotation portion 1106 counterclockwise to decrease the intensity). The single segment may iterate in a predefined sequence to display an animation and the sequence may be repeated to indicate the rotation of the rotation portion 1106 and/or the continued change in status of the electrical load. Though a single segment is shown, another number of segments and/or colors may be illuminated.

A single segment of the status indicator 1103 may be illuminated as shown in FIG. 14 to provide simple feedback in response to an actuation of the actuation portion 1104. For example, the single segment of the status indicator 1103 may be illuminated for predefined periods of time at each illumination configuration shown in FIG. 14 and the animation may change from one illumination configuration to the next at a rate that increases with respect to time in response to an actuation of the actuation portion 1104 to turn on an electrical load (e.g., such as a ceiling fan) and at a rate that decreases with respect to time in response to an actuation of the actuation portion 1104 to turn off the electrical load.

FIG. 15 shows another example animation that may be displayed via the status indicator 1103 of the remote control device 1102. As shown in FIG. 15, segments of the status indicator 1103 including one or more LEDs may be illuminated from the left side of the status indicator 1103 to the right side of the status indicator 1103, or vice versa. The segments of the status indicator 1103 may be illuminated from side to side in response to a rotation of the rotation portion 1106, an actuation of the actuation potion 1104, and/or the status of an electrical load. For example, the segments of the status indicator 1103 may be illuminated from the left side to the right side to provide simple feedback to indicate an actuation of the actuation portion 1104 to play a song, or that the song is currently playing, on an audio device. The segments may also, or alternatively, be illuminated from the left side to the right side to indicate a fan speed (e.g., side to side illumination increases in speed as fan speed increases, and decreases as fan speed decreases).

The animation shown in FIG. 15 may begin as a single segment on the left or right side of the status indicator 1103. The single segment may be illuminated for a predefined period of time and split into two segments that move to the opposing side of the status indicator 1103. Each pair of segments may be illuminated together for a predefined period of time before the next segment is illuminated. The two segments may then come together as a single segment on the opposite side of the status indicator 1103. The animation shown in FIG. 15 may repeat a few times until the remote control device 1102 times out and turns off the status indicator 1103. The animation may also repeat so long as the status of the electrical load remains the same, or until the actuation portion 1104 is actuated or the rotation portion 1106 stops rotating. Though a certain number of segments are shown, another number of segments and/or colors may be illuminated.

FIG. 16 shows another example animation that may be displayed via the status indicator 1103 of the remote control device 1102. As shown in FIG. 15, segments of the status indicator 1103 including one or more LEDs may be illuminated on the left side and the right side of the status indicator 1103. The segments on the left and right side of the status indicator 1103 may be illuminated together for a period of time and then turn off for a period of time. The animation shown in FIG. 16 may repeat a few times until the remote control device 1102 times out and turns off the status indicator 1103. The animation may also be repeated until a user interface event is received on the remote control device 1102, or a change in status is identified at an electrical load controlled by the remote control device 1102. For example, the remote control device 1102 may provide the animation shown in FIG. 16 on the status indicator 1103 to provide simple feedback in response to an actuation of the actuation potion 1104 to pause the music being played by an audio device. Though a certain number of segments are shown, another number of segments and/or colors may be illuminated.

The remote control device 1102 may be configured to illuminate different portions of the status indicator 1103 to provide advanced feedback, for example, of the intensity of electrical loads controlled by the remote control device 1102.

Figure 17:
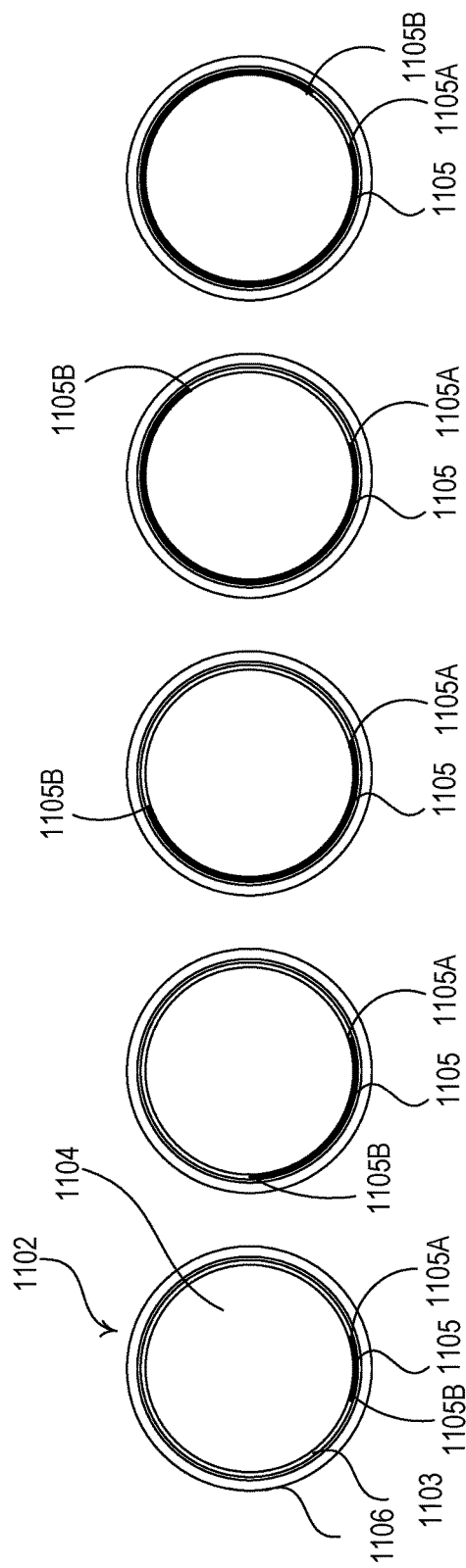

FIG. 17 shows a front view of the remote control device 1102 when the status indicator 1103 is illuminated to expand and contract in one direction to provide feedback (e.g., advanced feedback) that indicates the intensity of an electrical load. For example, the sequence shown in FIG. 17 may be used to illustrate an intensity level of a lighting load or of the volume of an audio device as the intensity level increases (e.g., moving from left to right through the illumination configurations shown in FIG. 17) or decreases (e.g., moving from right to left through the illumination configurations shown in FIG. 17).

The remote control device 1102 may include a plurality of light sources (e.g., LEDs) configured to illuminate the status indicator 1103. In response to an actuation of the remote control device 1102 to adjust the intensity level of the lighting load or the volume of the audio device, the remote control device 1102 may illuminate a subset of the light sources such that a portion 1105 of the status indicator 1103 is illuminated to indicate the intensity level corresponding to the actuation. The illuminated portion 1105 may begin at a starting point 1105A (e.g., at the bottom of the status indicator 1103 as shown in FIG. 17) and end at an end point 1105B (e.g., along the circumference of the status indicator 1103). The length and/or intensity of the illuminated portion 1105 may be indicative of the intensity level of a lighting load or of a volume of an audio device. The subset of light sources may be illuminated uniformly to a common intensity. Alternatively, the subset of light sources may be illuminated to different intensities. For example, the remote control device 1102 may illuminate the end point 1105B of the illuminated portion 1105 of the status indicator 1103 to a higher intensity than the rest of the illuminated portion and may decrease the intensity of the illuminated portion towards the starting point 1105A. For example, the illuminated portion 1105 of the status indicator 1103 may display a gradient from the brightest intensity at the end point 1105B to the dimmest intensity at the starting point 1105A. This way, a user may still receive feedback based on the length of the illuminated portion, but less battery power may be consumed to provide the feedback. Alternatively, the dimmest intensity may be between the end point 1105B and the starting point 1105A.

To illustrate, the remote control device 1102 may be configured to increase the length of the illuminated portion 1105 (e.g., cause the end point 1105B of the illuminated portion to move in a clockwise direction as shown in FIG. 17) when the intensity level of the lighting load or of the volume of the audio device is being raised. The remote control device 1102 may be configured to decrease the length of the illuminated portion 1105 (e.g., cause the end point 1105B of the illuminate portion to move in a counterclockwise direction as shown in FIG. 17) when the intensity level of the lighting load or of the volume of the audio device is being lowered. This way, the illuminated portion 1105 may expand and contract as the intensity level of the lighting load or of the volume of the audio device is adjusted.

The illuminated portion 1105 may increase and decrease in size gradually or step between predefined segments that indicate a given intensity level. For example, the status indicator 1103 may step between illuminated segments to indicate that the present intensity of a lighting load is approximately 30%, approximately 60%, and approximately 90%, though the status indicator may be illuminated at any number of steps having a difference that is equivalent or inequivalent. When the lighting load or the volume is at a full intensity level (e.g., approximately full intensity level), the entire status indicator 1103 may be illuminated. When the remote control device 1102 is configured to control multiple lighting loads or audio devices, and set respective intensity levels of the multiple loads to different values, the remote control device 1102 may be configured to illuminate the status indicator 1103 to indicate an average of the respective intensity levels of the loads, to indicate the intensity level of a lighting load or audio device nearest to the remote control device 1102, and/or the like.

In some examples, the remote control device 1102 may be configured to adjust the intensity of the light source illuminating the end point 1105B of the illuminated portion 1105 to provide fine-tune adjustment of the position of the end point 1105B. For example, the remote control device 1102 may adjust the intensity of the light source that illuminates the end point 1105B between 1% and 100% to provide fine-tune adjustment of the position of the end point 1105B. To illustrate, the remote control device 1102 may illuminate the status indicator 1103 to a length that indicates the intensity level of the lighting load or of the volume of the audio device controlled by the remote control device 1102 is at approximately 30%. At that point, the intensity of the light source illuminating the end point 1105B may be set at 1%. As the intensity level of the lighting load or of the volume of the audio device is further adjusted toward 40%, the remote control device 1102 may adjust the intensity of the end point 1105B between 1% and 100% with finer granularity to correspond to respective intermediate intensity levels that are between 30% and 40%. After the intensity level of the lighting load or of the volume of the audio device reaches 40%, the remote control device 1102 may illuminate an additional light source (e.g., to 1% intensity) to cause the length of the illuminated portion 1105 to expand. The remote control device 1102 may then adjust the intensity of the additional light source that is now illuminating the end point 1105B between 1% and 100% as the intensity of the lighting load is being tuned towards a next level (e.g., 50%).

The remote control device 1102 may be configured to indicate a last-known intensity of the lighting load or of the volume of the audio device upon receiving a user interface event to turn on the lighting load or audio device, respectively. For example, before the lighting load or audio device was turned off, the remote control device 1102 may store the intensity level in a memory of the remote control device 1102 while quickly decreasing the length of the illuminated portion 1105 from the end point 1105B to the starting point 1105A. Subsequently, when the remote control device 1102 is actuated to turn the lighting load or audio device back on, the remote control device 1102 may illuminate the status indicator 1103 to quickly increase the length of the illuminated portion 1105 to correspond to the previously stored intensity level.

In the examples described herein, the display of the illuminated portion 1105 may be obstructed by a user's fingers that are manipulating the remote control device 1102. For instance, as the user rotates the rotation portion 1106 of the remote control device 1102 to adjust the intensity level of the lighting load or of the volume of the audio device, the user's hand may block the leading edge (e.g., the end point 1105B) of the illuminated portion 1105. As a result, the user may not be able to determine whether the illuminated portion is expanding and contracting in response to the rotational movement of the rotation portion 1106, and whether the intensity level of the electrical load is being adjusted properly.

The remote control device 1102 may control the manner in which the status indicator 1103 is illuminated to reduce the likelihood that a user's action may interfere with the feedback indication. For example, the remote control device 1102 may be configured to cause the end point 1105B of the illuminated portion 1105 (e.g., as shown in FIG. 17) to move at a faster or slower angular speed than that of the rotation portion 1106 when the rotation portion is rotated. To illustrate, a user may, within a unit of time, rotate the rotation portion 1106 by x degrees in order to adjust the intensity (e.g., raise or lower) of the lighting load or of the volume of the audio device. In response, the remote control device 1102 may, within the same unit of time, cause the end point 1105B of the illuminated portion 1105 to move by x+y or x−y degrees (e.g., in clockwise or counterclockwise direction) such that the leading edge of the illuminated portion 1105 represented by the end point 1105B may move faster than (e.g., ahead of) or slower than (e.g., lagging behind) the user's hand. This way, despite obstruction by a user's hand, the user may still notice changes in the illuminated portion 1105 to know that control is being applied properly.

When the end point 1105B of the illuminated portion 1105 is configured to move faster than (e.g., ahead of) the rotation portion 1106, the remote control device 1102 may scale the full intensity range of the lighting load or of the volume of the audio device over less than a 360-degree rotation of the rotation portion 1106 so that the illuminated portion 1105 may expand or contract over the entire circumference of status indicator 1103 as the intensity level of the lighting load or of the volume of the audio device is being adjusted between the low-end and high-end of an intensity range. For example, the remote control device 1102 may be configured to scale the full intensity range of the lighting load or of the volume of the audio device over a 210-degree rotation of the rotation portion 1106, such that when a rotational movement of the rotation portion 1106 reaches 210 degrees, the illuminated portion 1105 may cover the entire circumference of the status indicator 1103 (e.g., 360 degrees) to indicate that the intensity level of the lighting load or of the volume of the audio device has reached a maximum intensity. Such a technique may also reduce the amount of rotation used to adjust the intensity level of the lighting load or of the volume of the audio device between the low-end and the high-end. For example, the user may be able to adjust the intensity level over a greater range with less wrist movement.

The remote control device 1102 may be configured to illuminate a portion of the status indicator 1103 and cause the length of the illuminated portion 1105 to expand and contract (e.g., simultaneously from both end points 1105A, 1105B of the illuminated portion 1105) to indicate the intensity level of the lighting load or of the volume of an audio device. The illuminated portion may be illuminated uniformly to a common intensity. Alternatively, different sections of the illuminated portion may be illuminated to different intensities. For example, the end point 1105B of the illuminated portion of the status indicator 1105 may be illuminated to a higher intensity than the rest of the illuminated portion and the intensity of the illuminated portion 1105 may be decreased towards the starting point 1105A. This way, a user may still receive feedback based on the length of the illuminated portion, but less battery power may be consumed to provide the feedback.

Figure 18:
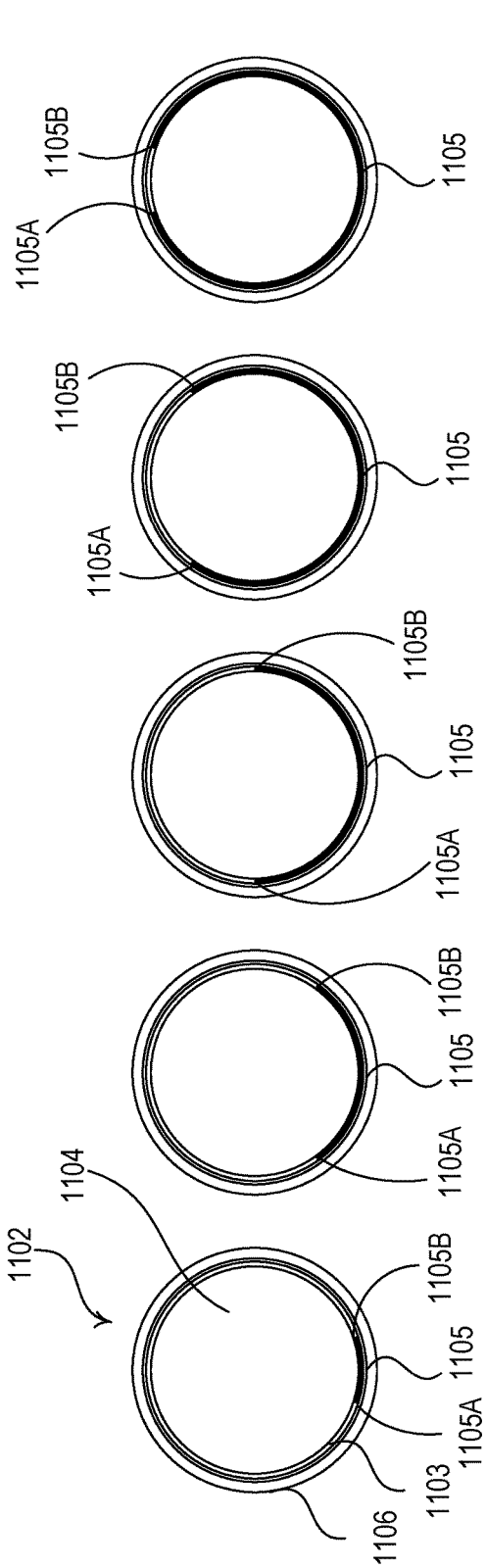

FIG. 18 shows example front views of the remote control device 1102 when an illuminated portion 1105 of the status indicator 1103 is controlled to expand and contract from both end points 1105A, 1105B of the illuminated portion 1105 to provide feedback (e.g., advanced feedback) that indicates the intensity of an electrical load. For example, the sequence shown in FIG. 18 may be used to illustrate an intensity level of a lighting load or of the volume of an audio device as the intensity level increases (e.g., moving from left to right through the illumination configurations shown in FIG. 18) or decreases (e.g., moving from right to left through the illumination configurations shown in FIG. 18).

As shown in FIG. 18, when an intensity adjustment actuator of the remote control device 1102 (e.g., the rotation portion 1106) is actuated to adjust the intensity levels of the lighting devices, the status indicator 1103 may be illuminated to provide advanced feedback that indicates the intensity level to which the remote control device is controlling the lighting devices. When the remote control device 1102 is manipulated to raise the intensity level of the lighting load or the volume (e.g., via a rotation of the rotation portion 1106), the remote control device 1102 may cause end points 1105A, 1105B of the illuminated portion 1105 to move (e.g., simultaneously) in respective clockwise and counterclockwise directions such that the length of the illuminated portion 1105 is extended to indicate that the intensity level is being raised. Similarly, when the remote control device 1102 is manipulated to lower the intensity level of the lighting load or of the volume of an audio device (e.g., via a rotation of the rotation portion 1106), the remote control device 1102 may cause end points 1105A, 1105B of the illuminated portion 1105 to move (e.g., simultaneously) in respective counterclockwise and clockwise directions such that the length of the illuminated portion 1105 is shortened to indicate that the intensity level is being lowered.

The illuminated portion 1105 may increase and decrease in size gradually or step between predefined segments that indicate a given intensity level. For example, the status indicator 1103 may step between illuminated segments to indicate that the present intensity of a lighting load is approximately 30%, approximately 60%, and approximately 90%, though the status indicator may be illuminated at any number of steps having a difference that is equivalent or inequivalent. When the electrical load is at a full intensity level (e.g., approximately full lighting intensity or full volume level), the end points 1105A, 1105B may meet at the top of the status indicator 1103, such that the status indicator 1103 is fully illuminated. The amount and/or speed of movement at end points 1105A, 1105B may be the same or may be different. The illuminated portion 1105 may be centered around a vertical axis of the remote control device 1102 when the control device is installed. As such, the illuminated portion 1105 may provide multiple intensity indications (e.g., on both the left half and the right half of the status indicator 1103). Using such a mechanism, the likelihood of a user's hand obstructing the feedback indication may be reduced.

In the example shown in FIG. 18, when the remote control device 1102 is actuated (e.g., via the actuation portion 1104) to turn the electrical load on or off, the status indicator 1103 may be illuminated to provide advanced feedback that indicates the intensity level to which the lighting devices are being turned on or from which the lighting devices are being turned off. When the actuation portion 1104 of the remote control device 1102 is actuated to turn the electrical load on, the status indicator 1103 may be illuminated (e.g., as an animation) to quickly increase the length of the illuminated portion 1105 (e.g., from both end points 1105A, 1105B) to correspond to a last-known intensity level of the electrical load before the electrical load was turned off. The remote control device 1102 may be configured to store the last-known intensity level of a lighting load or of a volume of an audio device in memory before the lighting load or audio device is turned off. When the actuation portion 1104 of the remote control device 1102 is actuated to turn an electrical load off, the status indicator 1103 may be controlled (e.g., as an animation) to quickly decrease the length of the illuminated portion 1105 (e.g., from both end points 1105A, 1105B toward the center of the illuminated portion 1105) to indicate that the electrical load is being turned off. Prior to decreasing the length of the illuminated portion 1105, the control device 1102 may be configured to store the intensity level of a lighting load or of a volume of an audio device in memory.

Figure 19:
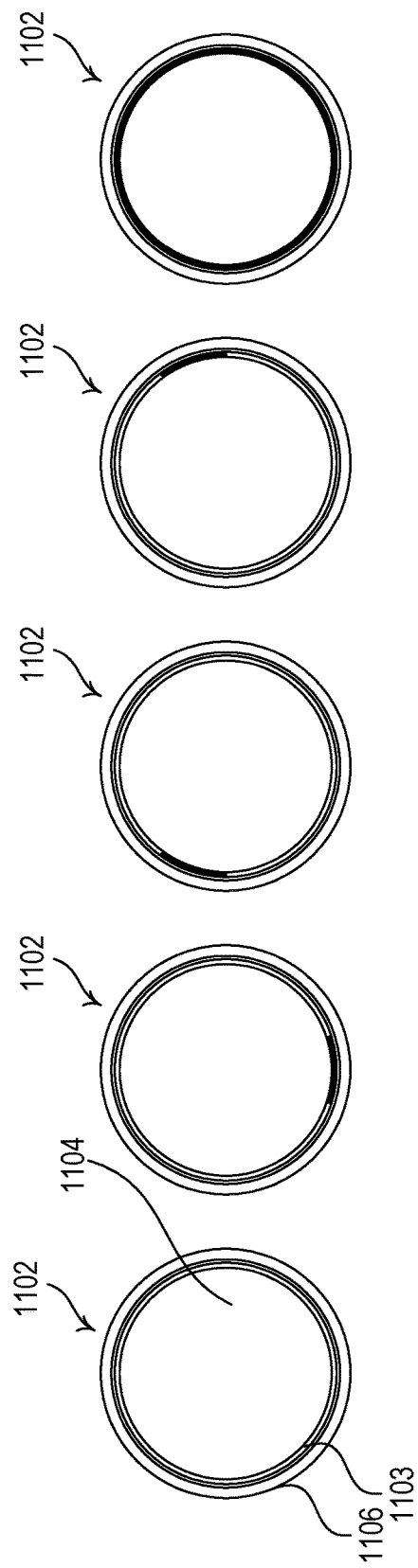

FIG. 19 shows a front view of the remote control device 1102 when the status indicator 1103 is illuminated to provide feedback (e.g., advanced feedback) that indicates different settings for electrical loads. For example, the illuminations shown in FIG. 19 may be used to illustrate different fan speeds for a motor load (such as a ceiling fan), presets for electrical loads (e.g., preset intensity levels for lighting loads), and selected scenes (e.g., presets including multiple electrical loads) of a load control system.

In response to an actuation of the actuation portion 1104 or a rotation of the rotation portion 1106, the remote control device 1102 may turn on a fan or initiate a first preset. The remote control device 1102 may illuminate a segment of the status indicator 1103 (e.g., at the bottom of the remote control device 1102) to indicate a first fan speed or first preset. In response to another actuation of the actuation portion 1104 or a rotation of the rotation portion 1106 (e.g., for a predefined distance or period of time), the remote control device 1102 may adjust the fan speed or preset. The remote control device 1102 may illuminate another segment of the status indicator 1103 (e.g., a next segment in a clockwise motion) to indicate a second fan speed or second preset. Different segments may continue to be illuminated in a clockwise manner as the fan speed increases or as presets change. Different segments may be illuminated in a counterclockwise manner as the fan speed decreases or as presets change (e.g., by actuating the actuation portion 1104 or rotating the rotation portion 1106 counterclockwise). When the fan speed is set to full, the last segment of the status indicator 1103 may be illuminated, or the entire status indicator 1103 may be illuminated, as shown in FIG. 19.

Figure 20:
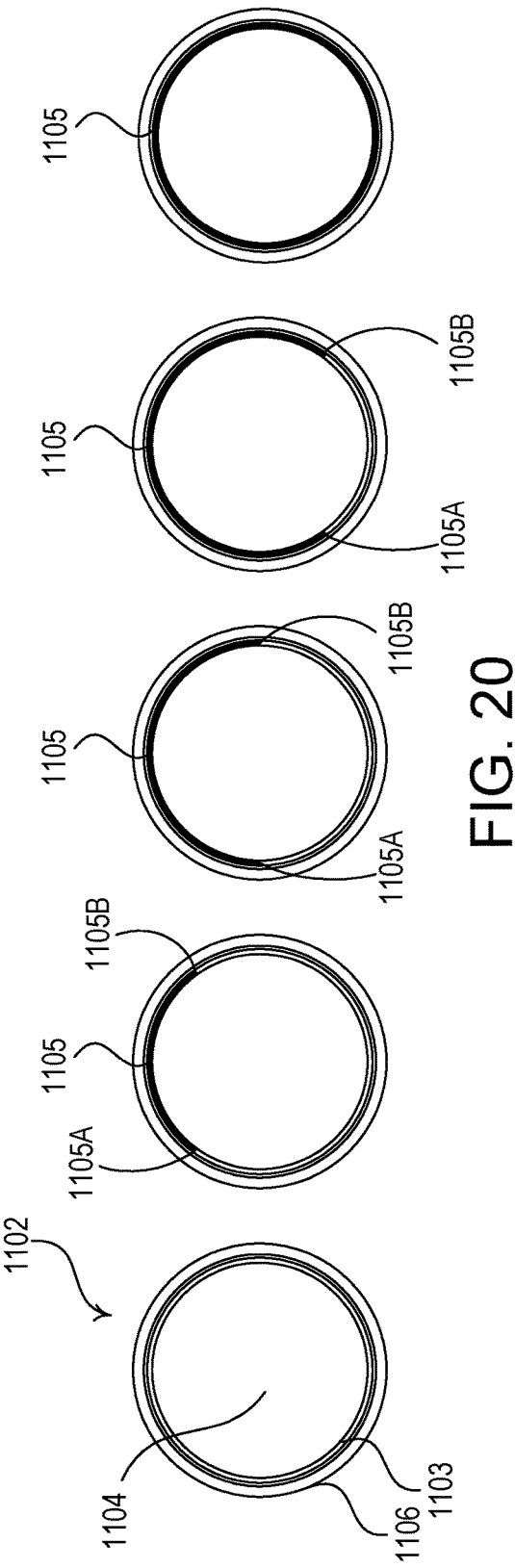

FIG. 20 shows a front view of the remote control device 1102 when the status indicator 1103 is illuminated to provide feedback (e.g., advanced feedback) that indicates different shade positions for a motorized window treatment. In response to an actuation of the actuation portion 1104 or a rotation of the rotation portion 1106, the remote control device 1102 may raise or lower a shade position for a motorized window treatment. The remote control device 1102 may illuminate a portion of the status indicator 1103 (e.g., from the top of the remote control device 1102) to indicate the shade position. As shown in FIG. 20, the fully open position may be indicated by unilluminating the status indicator 1103. As the shade position is lowered, the status indicator 1103 may be illuminated to indicate the position of the shade.

As shown in FIG. 20, when the remote control device 1102 is manipulate to lower the shade position of the motorized window treatment (e.g., via a rotation of the rotation portion 1106), the remote control device 1102 may cause end points 1105A, 1105B of the illuminated portion 1105 to move (e.g., simultaneously) in respective counterclockwise and clockwise directions such that the length of the illuminated portion 1105 is extended to indicate that the shade position is being lowered. Similarly, when the remote control device 1102 is manipulated to raise the shade position of the motorized window treatment (e.g., via a rotation of the rotation portion 1106), the remote control device 1102 may cause end points 1105A, 1105B of the illuminated portion 1105 to move (e.g., simultaneously) in respective clockwise and counterclockwise directions such that the length of the illuminated portion 1105 is shortened to indicate that the shade position is being raised.

The illuminated portion 1105 may increase and decrease in size gradually or step between predefined segments that indicate a given shade position. For example, the status indicator 1103 may step between illuminated segments to indicate that the shade position of a motorized window treatment is approximately 30% closed, approximately 60% closed, and approximately 90% closed, though the status indicator may be illuminated at any number of steps having a difference that is equivalent or inequivalent. When the shade position is fully closed, the end points 1105A, 1105B may meet at the bottom of the status indicator 1103, such that the status indicator 1103 is fully illuminated. The amount and/or speed of movement at end points 1105A, 1105B may be the same or may be different. The illuminated portion 1105 may be centered around a vertical axis of the remote control device 1102 when the remote control device 1102 is installed. As such, the illuminated portion 1105 may provide multiple shade position indications (e.g., on both the left half and the right half of the status indicator 1103). Using such a mechanism, the likelihood of a user's hand obstructing the feedback indication may be reduced.

In the example shown in FIG. 20, when the remote control device 1102 is actuated (e.g., via the actuation portion 1104), the status indicator 1103 may be illuminated to quickly increase the length of the illuminated portion 1105 (e.g., from both end points 1105A, 1105B) to correspond to a last-known shade position. The remote control device 1102 may be configured to store the last-known shade position.

Figure 21:
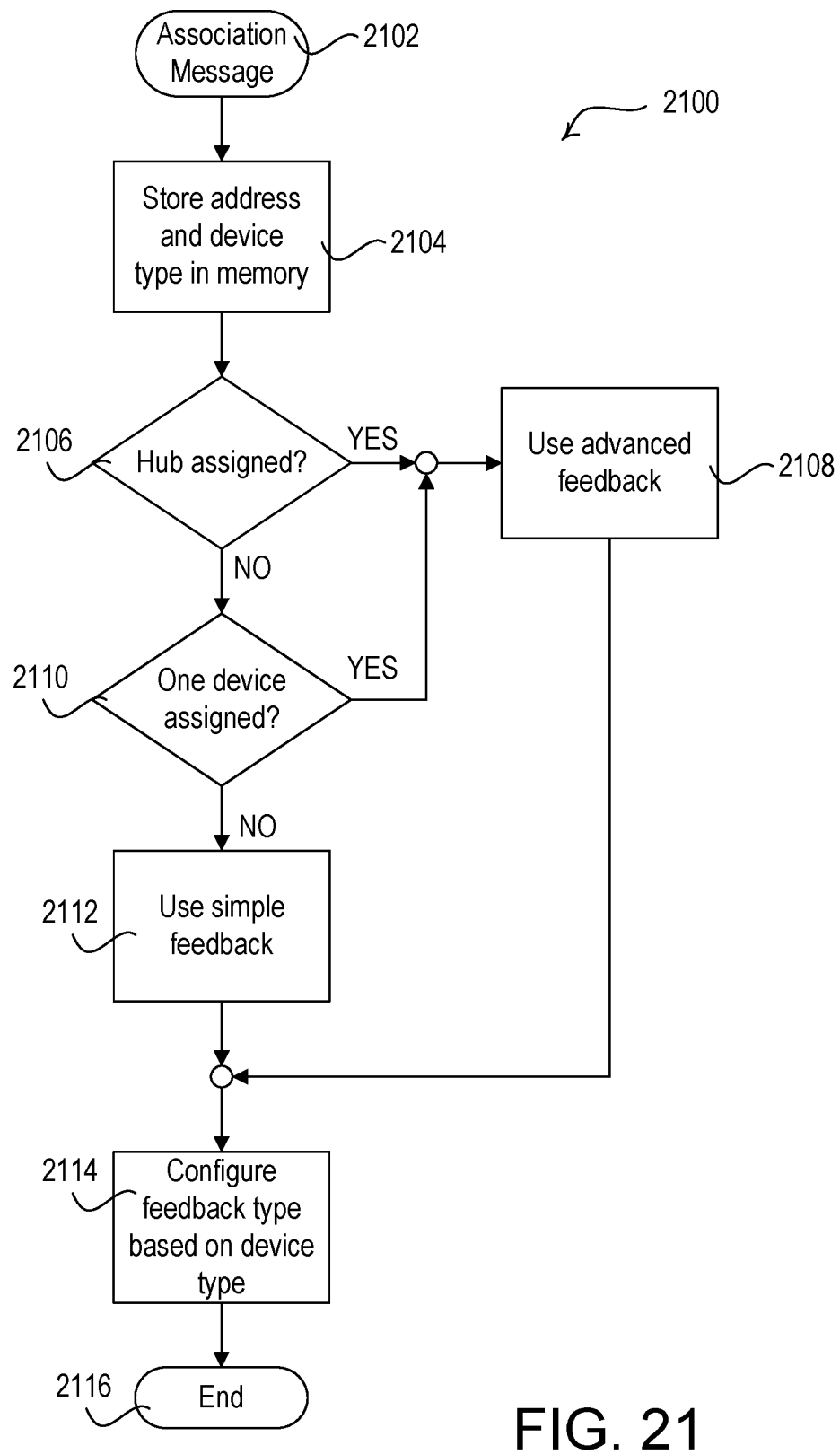
FIG. 21 is a flowchart depicting an example method for determining the type of feedback to be provided on a status indicator of a remote control device.

FIG. 21 is a flowchart depicting an example method 2100 for determining the type of feedback to be provided on a status indicator of a remote control. The method 2100 may be performed at one or more devices in the load control system during an association procedure for associating the remote control device with another device. For example, the method 2100, or portions thereof, may be performed at a remote control device, another controller device, a hub device, and/or another computing device.

As shown in FIG. 21, the method 2100 may begin at 2102. At 2102, an association message may be received. The association message may comprise information about devices in the system, such as association information that indicates the address and/or device type of the device or devices being associated with the remote control device. The addresses and device types in the association message may be stored in memory, at 2104, for associating the remote control device with the device or devices indicated in the association message. At 2106, a determination may be made as to whether a hub device is assigned to the remote control device. The determination at 2106 may be made based on the association information stored in memory. If a hub device is assigned to the remote control device, advanced feedback may be implemented at 2108 for the status indicator of the remote control device to indicate the status of one or more electrical loads or load control devices. The hub device may give the remote control device access to the status of the electrical loads or load control devices.

At 2110, a determination may be made as to whether one load control device is assigned to the remote control device for being controlled by the remote control device. The determination at 2110 may be made based on the association information stored in memory. If one load control device is assigned to the remote control device, advanced feedback may be implemented at 2108 for the status indicator of the remote control device to indicate the status of the load control device or the electrical load controlled thereby. The status of a single load control device may be more easily indicated to a user than multiple load control devices. If multiple load control devices are assigned to the remote control device for being controlled thereby and the remote control device is not assigned to a hub device, simple feedback may be implemented at 2112 for the status indicator of the remote control device to indicate responses to user interface events on the remote control device.

The feedback type may be configured, at 2114, based on the type of device or devices (e.g., lighting devices, temperature control devices, motorized window treatments, fans, audio devices, etc.) being controlled by the remote control device. Different device types may correspond to different types of simple feedback or advanced feedback, as there may be multiple types of simple feedback and/or multiple types of advanced feedback that may be provided by the status indicator on the remote control device. For example, the feedback type for lighting devices may be different than the feedback type for motorized window treatments or ceiling fans. Different types of devices may use the same feedback types, while others may not. For example, the intensity level of lighting devices and the intensity level of the volume for an audio device may be indicated using the same feedback type. The feedback type may be configured based on the device type or types indicated in the association information stored in memory. At 2116, the method 2100 may end.

Figure 22:
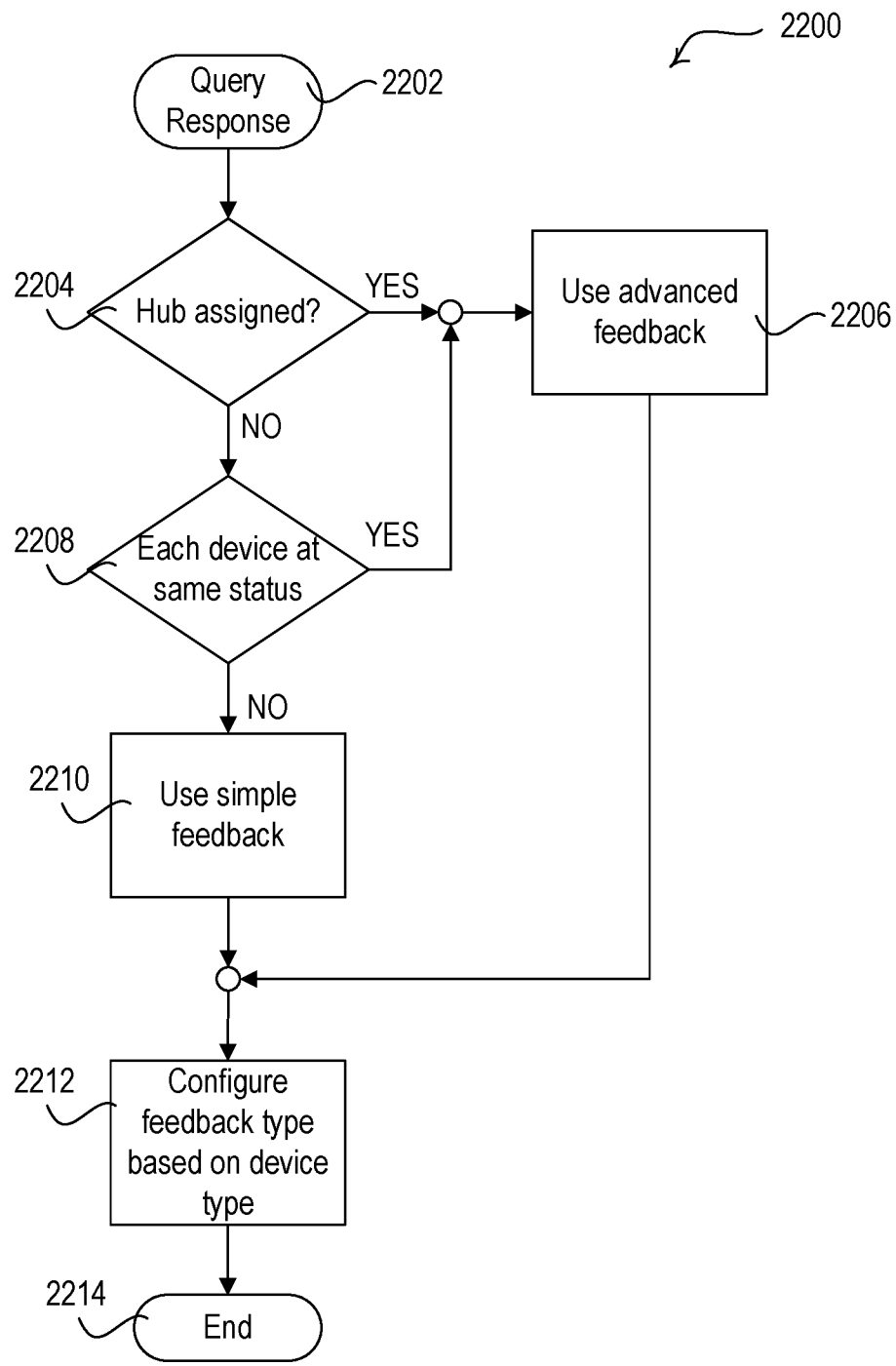
FIG. 22 is another flowchart depicting an example method for determining the type of feedback to be provided on a status indicator of a remote control device.

FIG. 22 is a flowchart depicting an example method 2200 for determining the type of feedback to provide on a status indicator of a remote control device. The method 2200 may be performed on demand at one or more devices in the load control system to obtain feedback information at any time during operation of the remote control device. For example, the method 2200, or portions thereof, may be performed at a remote control device, another controller device, a hub device, and/or another computing device.

As shown in FIG. 22, the method 2200 may begin at 2202. At 2202, a query response may be received for device information about devices in the system, such as status information associated with an electrical load or a load control device. The query response may be a status message received in response to a status query message for status information or a command for controlling the electrical load via the load control device. The query may be transmitted in response to the remote control device awakening from a sleep mode, after a predefined period of time, or in response to detection of a user interface event to control an electrical load. The query response or responses may include device information, which may indicate the number of devices associated with the remote control device, an identifier of the associated devices, the device types of the associated devices, and/or the status of the associated devices. The query response may be received from a hub device, a load control device, or another device in the load control system.

At 2204, a determination may be made as to whether a hub device is assigned to the remote control device. The determination at 2106 may be made based on the association information stored in memory and/or other device information in the query responses received at 2202. If a hub device is assigned to the remote control device, advanced feedback may be implemented at 2206 for the status indicator of the remote control device to indicate the status of one or more electrical loads or load control devices. The hub device may give the remote control device access to the status of the electrical loads or load control devices.

At 2208, a determination may be made as to whether the status of each load or load control device being controlled by a remote control device is the same. For example, a determination may be made as to whether each lighting load is being controlled at the same intensity level. The determination at 2208 may be made based on the query response received at 2202. If the status of each device is the same, the remote control device may implement advanced feedback to indicate the status of the electrical loads or load control devices. If the status of each load or load control device being controlled by the remote control device is determined, at 2208, to be different, simple feedback may be implemented at 2210 for the status indicator of the remote control device to indicate responses to user interface events on the remote control device.

At 2212, the feedback type may be configured based on the type of device or devices (e.g., lighting devices, temperature control devices, motorized window treatments, fans, audio devices, etc.) being controlled by the remote control device. Different device types may correspond to different types of simple feedback or advanced feedback, as there may be multiple types of simple feedback and/or multiple types of advanced feedback that may be provided by the status indicator on the remote control device. For example, the feedback type for lighting devices may be different than the feedback type for motorized window treatments or ceiling fans. Different types of devices may use the same feedback types, while others may not. For example, the intensity level of lighting devices and the intensity level of the volume for an audio device may be indicated using the same feedback type. The feedback type may be configured based on the device type or types indicated in the association information stored in memory or based on other device information in the query responses received at 2202. At 2214, the method 2200 may end.

Figure 23:
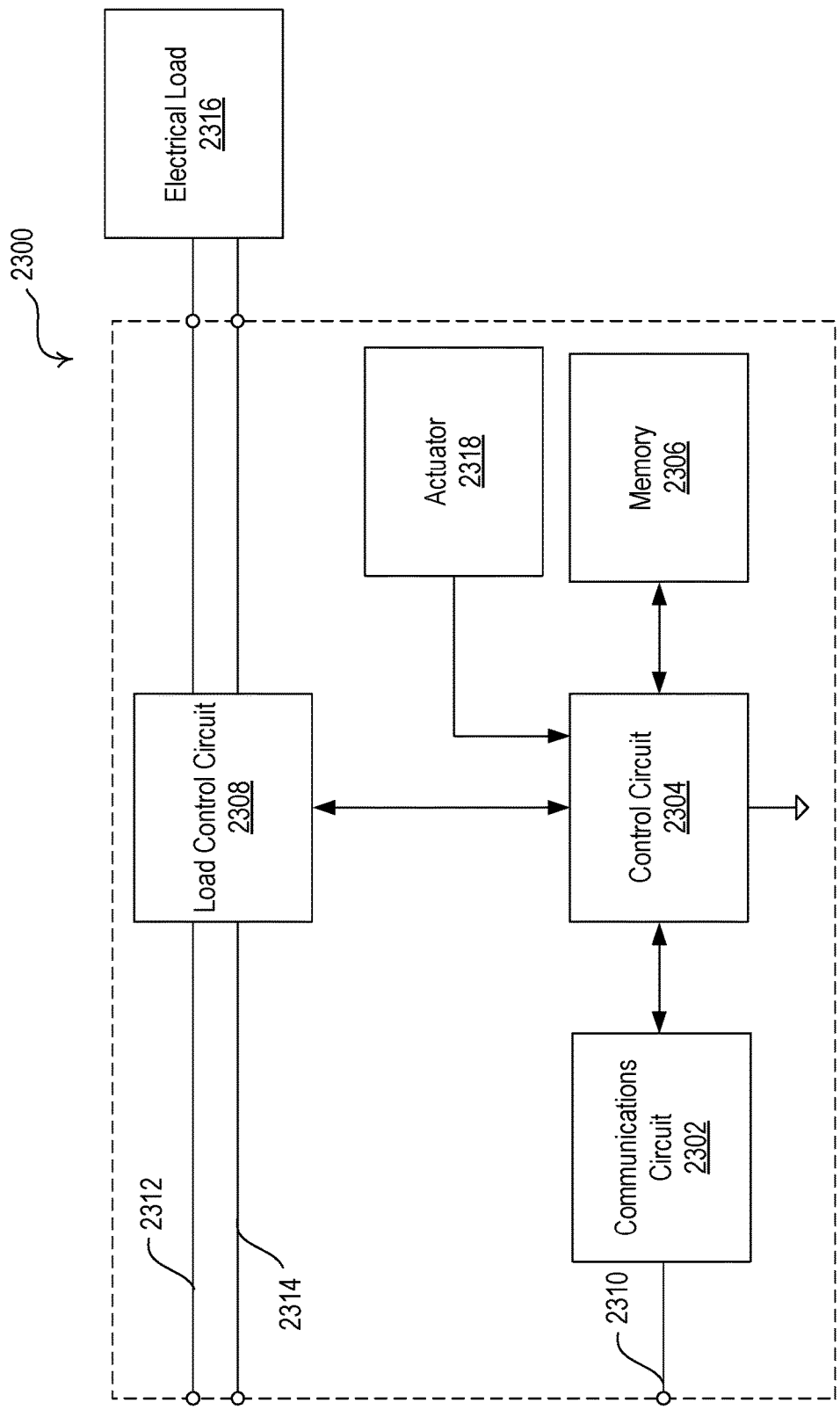
FIG. 23 is a block diagram of an example load control device.

FIG. 23 is a block diagram illustrating an example load control device, e.g., a load control device 2300, as described herein. The load control device 2300 may be a dimmer switch, an electronic switch, a lighting device (e.g., a light bulb, an electronic ballast for lamps, an LED driver for LED light sources, etc.), an AC plug-in load control device for controlling a plugged electrical load, a controllable electrical receptacle, a temperature control device (e.g., a thermostat), a motor drive unit for a motorized window treatment, a motor drive unit for a fan (e.g., ceiling fan), an audio device (e.g., a controllable speaker or playback device), an appliance, a security camera device, or other load control device. The load control device 2300 may include a communications circuit 2302. The communications circuit 2302 may include a receiver, an RF transceiver, or other communications module capable of performing wired and/or wireless communications via communications link 2310. The communications circuit 2302 may be in communication with a control circuit 2304. The control circuit 2304 may include one or more general purpose processors, special purpose processors, conventional processors, digital signal processors (DSPs), microprocessors, integrated circuits, a programmable logic device (PLD), application specific integrated circuits (ASICs), or the like. The control circuit 2304 may perform signal coding, data processing, power control, input/output processing, or any other functionality that enables the load control device 2300 to perform as described herein.

The control circuit 2304 may store information in and/or retrieve information from the memory 2306. For example, the memory 2306 may maintain a registry of associated control devices and/or control configuration instructions. The memory 2306 may include a non-removable memory and/or a removable memory. The load control circuit 2308 may receive instructions from the control circuit 2304 and may control the electrical load 2316 based on the received instructions. The load control circuit 2308 may send status feedback to the control circuit 2304 regarding the status of the electrical load 2316. The load control circuit 2308 may receive power via the hot connection 2312 and the neutral connection 2314 and may provide an amount of power to the electrical load 2316. The electrical load 2316 may include any type of electrical load.

The control circuit 2304 may be in communication with an actuator 2318 (e.g., one or more buttons) that may be actuated by a user to communicate user selections to the control circuit 2304. For example, the actuator 2318 may be actuated to put the control circuit 2304 in an association mode and/or communicate association messages from the load control device 2300.

Figure 24:
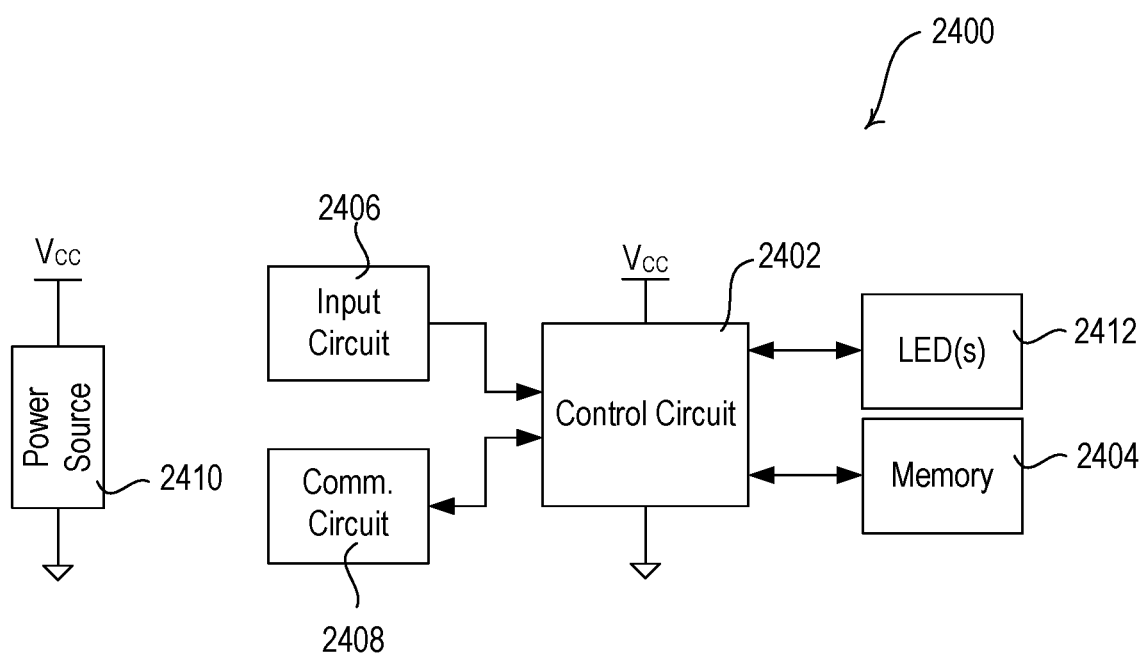
FIG. 24 is a block diagram of an example controller device.

FIG. 24 is a block diagram illustrating an example controller device 2400 as described herein. The controller device 2400 may be a remote control device, an occupancy sensor, a daylight sensor, a window sensor, a temperature sensor, and/or the like. The controller device 2400 may include a control circuit 2402 for controlling the functionality of the controller device 2400. The control circuit 2402 may include one or more general purpose processors, special purpose processors, conventional processors, digital signal processors (DSPs), microprocessors, integrated circuits, a programmable logic device (PLD), application specific integrated circuits (ASICs), or the like. The control circuit 2402 may perform signal coding, data processing, power control, input/output processing, and/or any other functionality that enables the controller device 2400 to perform as described herein.

The control circuit 2402 may store information in and/or retrieve information from the memory 2404. The memory 2404 may include a non-removable memory and/or a removable memory, as described herein.

The controller device 2400 may include one or more light sources, such as one or more LEDs 2412, for providing feedback to a user. The one or more LEDs 2412 may be included in a status indicator and may be controlled by the control circuit 2402. The control circuit 2402 may control the LEDs 2412 as described herein to provide feedback to the user.

The controller device 2400 may include a communications circuit 2408 for transmitting and/or receiving information. The communications circuit 2408 may transmit and/or receive information via wired and/or wireless communications. The communications circuit 2408 may include a transmitter, an RF transceiver, or other circuit capable of performing wired and/or wireless communications. The communications circuit 2408 may be in communication with control circuit 2402 for transmitting and/or receiving information.

The control circuit 2402 may also be in communication with an input circuit 2406. The input circuit 2406 may include an actuator (e.g., one or more buttons), a rotating or sliding portion, or a sensor circuit (e.g., an occupancy sensor circuit, a daylight sensor circuit, or a temperature sensor circuit) for receiving input that may be sent to a device for controlling an electrical load. The input circuit 2406 may also comprise a proximity sensing circuit for sensing an occupant in the vicinity of the controller device 2400. For example, the controller device 2402 may receive input from the input circuit 2406 to put the control circuit 2402 in an association mode and/or communicate association messages from the controller device 2400. The control circuit 2402 may receive information from the input circuit 2406 (e.g. an indication that a button has been actuated, a rotation portion has been rotated, or information has been sensed) and/or an indication of a proximity sensing event. The input circuit 2406 may be actuated as an on/off event. Each of the modules within the controller device 2400 may be powered by a power source 2410.

Figure 25:
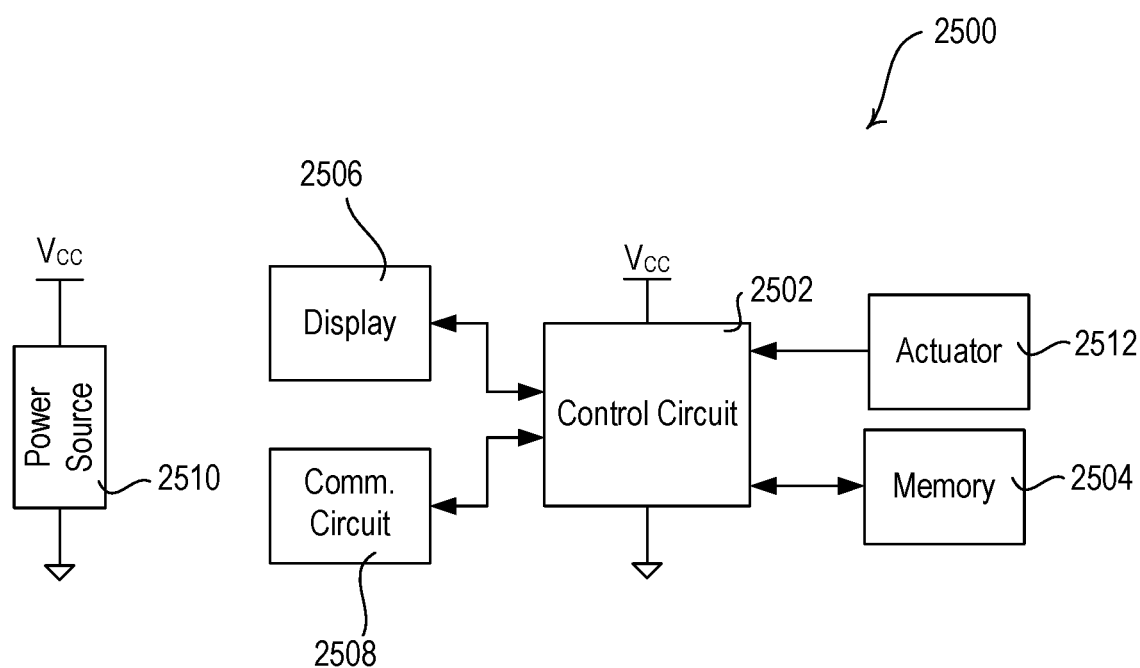
FIG. 25 is a block diagram of an example network device.

FIG. 25 is a block diagram illustrating an example network device 2500 as described herein. The network device 2500 may include the network device 190, for example. The network device 2500 may include a control circuit 2502 for controlling the functionality of the network device 2500. The control circuit 2502 may include one or more general purpose processors, special purpose processors, conventional processors, digital signal processors (DSPs), microprocessors, integrated circuits, a programmable logic device (PLD), application specific integrated circuits (ASICs), or the like. The control circuit 2502 may perform signal coding, data processing, power control, input/output processing, or any other functionality that enables the network device 2500 to perform as described herein. The control circuit 2502 may store information in and/or retrieve information from the memory 2504. The memory 2504 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 2500 may include a communications circuit 2508 for transmitting and/or receiving information. The communications circuit 2508 may perform wireless and/or wired communications. The communications circuit 2508 may include an RF transceiver or other circuit capable of performing wireless communications via an antenna. Communications circuit 2508 may be in communication with control circuit 2502 for transmitting and/or receiving information.

The control circuit 2502 may also be in communication with a display 2506 for providing information to a user. The control circuit 2502 and/or the display 2506 may generate GUIs for being displayed on the network device 2500. The display 2506 and the control circuit 2502 may be in two-way communication, as the display 2506 may include a touch screen module capable of receiving information from a user and providing such information to the control circuit 2502. The network device may also include an actuator 2512 (e.g., one or more buttons) that may be actuated by a user to communicate user selections to the control circuit 2502.

Each of the modules within the network device 2500 may be powered by a power source 2510. The power source 2510 may include an AC power supply or DC power supply, for example. The power source 2510 may generate a supply voltage $V_{CC}$ for powering the modules within the network device 2500.

Figure 26:
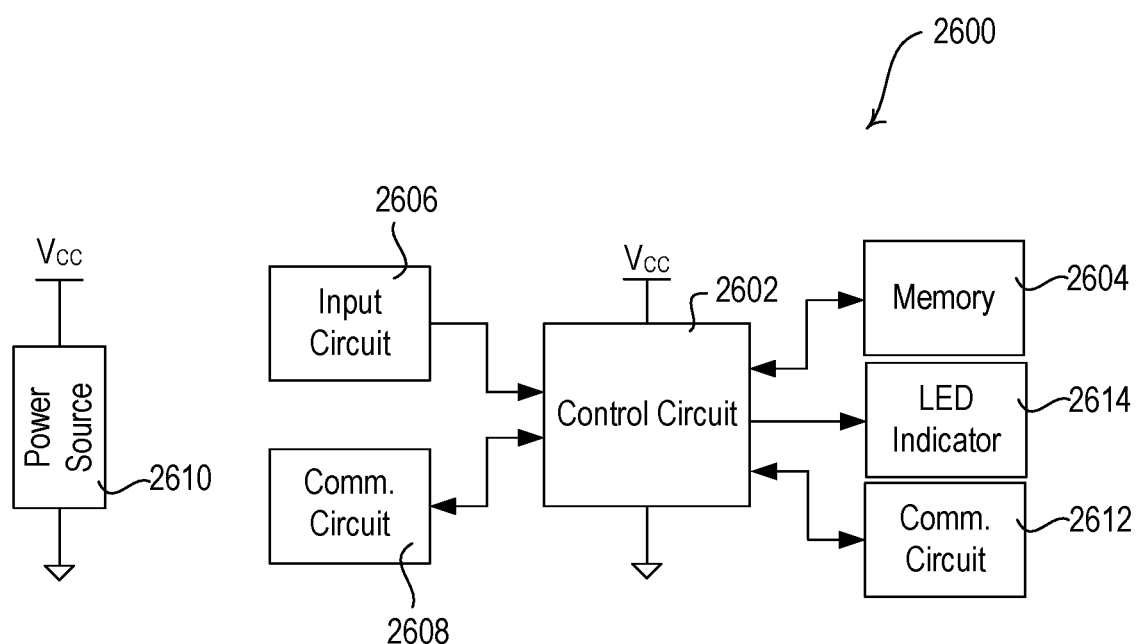
FIG. 26 is a block diagram of an example hub device.

FIG. 26 is a block diagram illustrating an example hub device 2600 as described herein. The hub device 2600 may include a control circuit 2602 for controlling the functionality of the hub device 2600. The control circuit 2602 may include one or more general purpose processors, special purpose processors, conventional processors, digital signal processors (DSPs), microprocessors, integrated circuits, a programmable logic device (PLD), application specific integrated circuits (ASICs), or the like. The control circuit 2602 may perform signal coding, data processing, power control, input/output processing, or any other functionality that enables the hub device 2600 to perform as described herein. The control circuit 2602 may store information in and/or retrieve information from the memory 2604. The memory 2604 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The hub device 2600 may include a communications circuit 2608 for transmitting and/or receiving information. The communications circuit 2608 may perform wireless and/or wired communications. The hub device 2600 may also, or alternatively, include a communications circuit 2612 for transmitting and/or receiving information. The communications circuit 2612 may perform wireless and/or wired communications. Communications circuits 2608 and 2612 may be in communication with control circuit 2602. The communications circuits 2608 and 2612 may include RF transceivers or other communications modules capable of performing wireless communications via an antenna. The communications circuit 2608 and communications circuit 2612 may be capable of performing communications via the same communication channels or different communication channels. For example, the communications circuit 2608 may be capable of communicating (e.g., with a network device, over a network, etc.) via a wireless communication channel (e.g., BLUETOOTH®, near field communication (NFC), WI-FI®, WIMAX®, cellular, etc.) and the communications circuit 2612 may be capable of communicating (e.g., with control devices and/or other devices in the load control system) via another wireless communication channel (e.g., WI-FI® or a proprietary communication channel, such as CLEAR CONNECT™).

The control circuit 2602 may be in communication with an LED indicator 2614 for providing indications to a user. The control circuit 2602 may be in communication with an actuator 2606 (e.g., one or more buttons) that may be actuated by a user to communicate user selections to the control circuit 2602. For example, the actuator 2606 may be actuated to put the control circuit 2602 in an association mode and/or communicate association messages from the hub device 2600.

Each of the modules within the hub device 2600 may be powered by a power source 2610. The power source 2610 may include an AC power supply or DC power supply, for example. The power source 2610 may generate a supply voltage $V_{CC}$ for powering the modules within the hub device 2600.

Although features and elements are described herein in particular combinations, each feature or element can be used alone or in any combination with the other features and elements. For example, the functionality described herein may be described as being performed by a control device, such as a remote control device or a lighting device, but may be similarly performed by a hub device or a network device. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A remote control device comprising:
    a status indicator configured to be illuminated by three or more light sources; and
    a control circuit configured to:
        receive device information regarding one or more devices that are responsive to the remote control device, wherein the device information comprises at least one of an address or a device type of each of the one or more devices;

select, based on the device information, a feedback type of a plurality of feedback types to be provided via the status indicator, wherein the plurality of feedback types comprise at least one simple feedback type that is provided in response to a user interface event on the remote control device and at least one advanced feedback type provided in response to a status of one or more load control devices; and provide feedback according to the selected feedback type via the status indicator by illumination of one or more of the three or more light sources, wherein the control circuit is configured to provide a different illumination configuration of the three or more light sources for different feedback types.

2. The remote control device of claim 1, wherein the control circuit is configured to:

when the one or more load control devices include multiple load control devices, determine whether the status of the multiple load control devices is in sync;

select the at least one advanced feedback type to be provided via the status indicator when the multiple load control devices are in sync; and select the at least one simple feedback type to be provided via the status indicator when the multiple load control devices are out of sync.

3. The remote control device of claim 1, wherein the device information comprises association information for associating the one or more devices with the remote control device, wherein the association information comprises the at least one of the address or the device type of each of the one or more devices.

4. The remote control device of claim 1, wherein the control circuit is further configured to:

determine, based on the device information, whether a hub device is associated with the remote control device; and select one of the at least one simple feedback type or the at least one advanced feedback type to be provided via the status indicator based on whether the hub device is associated with the remote control device.

5. The remote control device of claim 4, wherein the control circuit is configured to select the at least one simple feedback type to be provided via the status indicator when the hub device is unassociated with the remote control device, and wherein the control circuit is configured to select the at least one advanced feedback type to be provided via the status indicator when the hub device is associated with the remote control device.

6. The remote control device of claim 1, wherein the control circuit is configured to determine, based on the device information, a number of load control devices associated with the remote control device, wherein the control circuit is configured to select the at least one simple feedback type to be provided via the status indicator when more than one load control device is associated with the remote control device, and wherein the control circuit is configured to select the at least one advanced feedback type to be provided via the status indicator when one load control device is associated with the remote control device.

7. The remote control device of claim 1, wherein the at least one simple feedback type comprises a plurality of types of simple feedback, wherein the at least one advanced feedback type comprises a plurality of types of advanced feedback, and wherein the control circuit is further configured to select, based on the device type of each load control device of the one or more devices in the device information, the feedback type from the plurality of types of simple feedback or the plurality of types of advanced feedback that corresponds to each load control device of the one or more devices in the association information.

8. The remote control device of claim 1, wherein the remote control device further comprises a user interface, wherein the remote control device further comprises a communications circuit, and wherein the control circuit is further configured to:

detect the user interface event via the user interface; and send, via the communications circuit, a command configured to control one or more electrical loads in response to the user interface event.

9. The remote control device of claim 8, wherein the control circuit is further configured to:

receive, via the communications circuit, at least one status message that indicates an updated status of the one or more electrical loads; and update the feedback provided via the status indicator based on the updated status of the one or more electrical loads.

10. The remote control device of claim 9, wherein the control circuit is further configured to:

awaken from a sleep state;

send, via the communications circuit, a status query message to the hub device or the one or more load control devices; and receive, via the communications circuit, the at least one status message in response to the status query message.

11. The remote control device of claim 10, wherein the control circuit is configured to:

determine whether the command is configured for performing absolute control of multiple load control devices or for performing relative control of a single load control device;

select the at least one advanced feedback type to be provided via the status indicator when the command is configured for performing absolute control; and select the at least one simple feedback type to be provided via the status indicator when the command is configured for performing relative control.

12. The remote control device of claim 1, wherein the one or more devices comprise at least one of a lighting device, a temperature control device, a motorized window treatment, a fan, or an audio device.

13. The remote control device of claim 1, wherein the control circuit is configured to receive a user selection of the feedback type of the plurality of feedback types to be provided via the status indicator for a corresponding scenario, and wherein the feedback type is selected based on the user selection.

14. A method for providing feedback, via a status indicator on a remote control device, the status indicator configured to be illuminated by three or more light source sources, the method comprising:

receiving device information regarding one or more devices that are responsive to the remote control device, wherein the device information comprises at least one of an address or a device type of each of the one or more devices;

selecting, based on the device information, a feedback type of a plurality of feedback types to be provided via the status indicator, wherein the plurality of feedback types comprise at least one simple feedback type that is provided in response to a user interface event on the remote control device and at least one advanced feedback type provided in response to a status of one or more load control devices; and providing the feedback according to the selected feedback type via the status indicator by illuminating one or more of the three or more light sources, wherein a different illumination configuration of the three or more light sources is provided for different feedback types.

15. The method of claim 14, the method further comprising when the one or more load control devices include multiple load control devices, determining whether the status of the multiple load control devices is in sync, wherein the at least one advanced feedback type is selected to be provided via the status indicator when the multiple load control devices are in sync, and wherein the at least one simple feedback type is selected to be provided via the status indicator when the multiple load control devices are out of sync.

16. The method of claim 14, wherein the device information comprises association information for associating the one or more devices with the remote control device, wherein the association information comprises the at least one of the address or the device type of each of the one or more devices.

17. The method of claim 14, the method further comprising determining, based on the device information, whether a hub device is associated with the remote control device, wherein one of the at least one simple feedback type or the at least one advanced feedback type are selected to be provided via the status indicator based on whether the hub device is associated with the remote control device.

18. The method of claim 17, wherein the at least one simple feedback type is selected to be provided via the status indicator when the hub device is unassociated with the remote control device, and wherein the at least one advanced feedback type is selected to be provided via the status indicator when the hub device is associated with the remote control device.

19. The method of claim 14, further comprising determining, based on the device information, a number of load control devices associated with the remote control device, wherein the at least one simple feedback type is selected to be provided via the status indicator when more than one load control device is associated with the remote control device, and wherein the at least one advanced feedback type is selected to be provided via the status indicator when one load control device is associated with the remote control device.

20. The method of claim 14, wherein the at least one simple feedback type comprises a plurality of types of simple feedback, wherein the at least one advanced feedback type comprises a plurality of types of advanced feedback, and wherein the feedback type is selected from the plurality of types of simple feedback or the plurality of types of advanced feedback based on the device type corresponding to each load control device of the one or more devices in the device information.

21. The method of claim 14, the method further comprising:
detecting a user interface event on the remote control device; and
sending a command configured to control one or more electrical loads in response to the user interface event.

22. The method of claim 21, the method further comprising:
receiving at least one status message that indicates an updated status of the one or more electrical loads; and
updating the feedback provided via the status indicator based on the updated status of the one or more electrical loads.

23. The method of claim 22, the method further comprising:
awakening from a sleep state;
sending a status query message to the hub device or the one or more load control devices; and
receiving the at least one status message in response to the status query message.

24. The method of claim 21, the method further comprising determining whether the command is configured for performing absolute control of multiple load control devices or for performing relative control of a single load control device, wherein the at least one advanced feedback type is selected to be provided via the status indicator when the command is configured for performing absolute control, and wherein the at least one simple feedback type is selected to be provided via the status indicator when the command is configured for performing relative control.

25. The method of claim 14, wherein the one or more devices comprise at least one of a lighting device, a temperature control device, a motorized window treatment, a fan, or an audio device.

26. The method of claim 14, further comprising receiving a user selection of the feedback type of the plurality of feedback types to be provided via the status indicator for a corresponding scenario, and wherein the feedback type is selected based on the user selection.

* * * * *